US011125993B2

(12) United States Patent
Pennell et al.

(10) Patent No.: US 11,125,993 B2
(45) Date of Patent: Sep. 21, 2021

(54) OPTICAL HYPERFOCAL REFLECTIVE SYSTEMS AND METHODS, AND AUGMENTED REALITY AND/OR VIRTUAL REALITY DISPLAYS INCORPORATING SAME

(71) Applicant: Facebook Technologies, LLC, Menlo Park, CA (US)

(72) Inventors: Brennon Pennell, Ashford (GB); James Leighton, Canvey (GB); Adrian Stannard, St Leonards-On-Sea (GB); Louahab Noui, Hartfield (GB); Iain Wright, Tunbridge Wells (GB); Lawrence Hoar, Maidstone (GB)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 204 days.

(21) Appl. No.: 16/214,142

(22) Filed: Dec. 10, 2018

(65) Prior Publication Data
US 2020/0183152 A1    Jun. 11, 2020

(51) Int. Cl.
*G02B 27/14*    (2006.01)
*G09G 5/00*    (2006.01)
(Continued)

(52) U.S. Cl.
CPC ......... *G02B 27/0075* (2013.01); *G02B 6/005* (2013.01); *G02B 6/0055* (2013.01);
(Continued)

(58) Field of Classification Search
CPC .. G02B 27/0075; G02B 6/005; G02B 6/0055; G02B 27/0172; G02B 27/141; G02B 2027/0127
(Continued)

(56) References Cited

U.S. PATENT DOCUMENTS 3,121,992 A    2/1964    Fritz et al.
4,220,400 A    9/1980    Vizenor
(Continued)

FOREIGN PATENT DOCUMENTS

EP    0785457 A2    7/1997
EP    1798592 A2    6/2007
(Continued)

OTHER PUBLICATIONS

Office Action dated Mar. 15, 2018, issued on U.S. Appl. No. 15/206,111, filed Jul. 8, 2016, assigned to Daqri LLC.
(Continued)

*Primary Examiner* — William Choi
(74) *Attorney, Agent, or Firm* — Amin, Turocy & Watson, LLP

(57) ABSTRACT

Optical hyperfocal reflective systems and methods are provided. One such optical hyperfocal reflective system has an optical substrate; an optical input coupling portion configured to input couple a collimated display image to the optical substrate; and an optical hyperfocal output coupling portion integrated with said optical substrate. The optical output coupling portion includes at least one hyperfocal reflective view port formed from a discrete optical hyperfocal reflector spot integrated with the optical substrate. The discrete optical hyperfocal reflector spot is sized to form a reflected discrete optical spot beam with a diameter at a target area such that a view of a discrete virtual display image portion, as seen by a lens-detector system locatable at the target area, is hyperfocused.

20 Claims, 34 Drawing Sheets
(1 of 34 Drawing Sheet(s) Filed in Color)

(51) Int. Cl.
    *G02B 27/00* (2006.01)
    *F21V 8/00* (2006.01)
    *G02B 27/01* (2006.01)

(52) U.S. Cl.
    CPC ....... *G02B 27/0172* (2013.01); *G02B 27/141* (2013.01); *G02B 2027/0127* (2013.01)

(58) Field of Classification Search
    USPC .................................. 359/630, 633; 345/7–9
    See application file for complete search history.

(56) References Cited

U.S. PATENT DOCUMENTS

| | | | |
|---|---|---|---|
| 4,232,943 | A | 11/1980 | Rogers |
| 4,545,646 | A | 10/1985 | Chern et al. |
| 4,767,186 | A | 8/1988 | Bradley, Jr. et al. |
| 4,968,117 | A | 11/1990 | Chern et al. |
| 5,050,946 | A | 9/1991 | Hathaway et al. |
| 5,076,664 | A | 12/1991 | Migozzi |
| 5,202,950 | A | 4/1993 | Arego et al. |
| 5,253,637 | A | 10/1993 | Maiden |
| 5,535,025 | A | 7/1996 | Hegg |
| 5,848,119 | A | 12/1998 | Akira et al. |
| 5,886,822 | A | 3/1999 | Spitzer |
| 5,896,438 | A | 4/1999 | Akira et al. |
| 5,959,726 | A | 9/1999 | Riley et al. |
| 5,991,085 | A | 11/1999 | Rallison et al. |
| 6,057,966 | A | 5/2000 | Carroll et al. |
| 6,157,291 | A | 12/2000 | Kuenster et al. |
| 6,204,974 | B1 | 3/2001 | Spitzer |
| 6,222,677 | B1 | 4/2001 | Budd et al. |
| 6,236,511 | B1 | 5/2001 | Brown |
| 6,262,019 | B1 | 7/2001 | Keller et al. |
| 6,288,846 | B1 | 9/2001 | Stoner, Jr. |
| 6,353,503 | B1 | 3/2002 | Spitzer et al. |
| 6,563,648 | B2 | 5/2003 | Gleckman et al. |
| 6,577,311 | B1 | 6/2003 | Crosby et al. |
| 6,607,286 | B2 | 8/2003 | West et al. |
| 6,671,100 | B1 | 12/2003 | McRuer |
| 6,714,174 | B2 | 3/2004 | Suyama et al. |
| 6,829,095 | B2 | 12/2004 | Amitai |
| 6,926,420 | B2 | 8/2005 | Sung |
| 7,059,728 | B2 | 6/2006 | Alasaarela |
| 7,079,318 | B2 | 7/2006 | Shikama et al. |
| 7,209,097 | B2 | 4/2007 | Suyama et al. |
| 7,336,244 | B2 | 2/2008 | Suyama et al. |
| 7,418,202 | B2 | 8/2008 | Biernath et al. |
| 7,446,943 | B2 | 11/2008 | Takagi et al. |
| 7,506,987 | B2 | 3/2009 | Nilsen |
| 7,513,674 | B1 | 4/2009 | Donahue |
| 7,576,916 | B2 | 8/2009 | Amitai |
| 7,639,208 | B1 | 12/2009 | Ha et al. |
| 7,656,585 | B1 | 2/2010 | Powell et al. |
| 7,686,497 | B2 | 3/2010 | Kropac et al. |
| 7,688,347 | B2 | 3/2010 | Dolgoff |
| 7,703,931 | B2 | 4/2010 | Nilsen |
| 7,710,655 | B2 | 5/2010 | Freeman et al. |
| 7,876,489 | B2 | 1/2011 | Gandhi et al. |
| 7,936,519 | B2 | 5/2011 | Mukawa et al. |
| 7,944,616 | B2 | 5/2011 | Mukawa |
| 7,991,257 | B1 | 8/2011 | Coleman |
| 8,384,999 | B1 | 2/2013 | Crosby et al. |
| 8,964,292 | B1 | 2/2015 | Marason et al. |
| 8,988,463 | B2 | 3/2015 | Stone Perez et al. |
| 9,252,015 | B2 | 2/2016 | Wu et al. |
| 9,720,232 | B2 | 8/2017 | Gao |
| 10,007,115 | B2 | 6/2018 | Greenhalgh et al. |
| 10,191,993 | B2 | 1/2019 | Ross et al. |
| 10,481,678 | B2 | 11/2019 | Crispin |
| 10,488,666 | B2 | 11/2019 | Leighton et al. |
| 10,623,722 | B2 | 4/2020 | Markovsky et al. |
| 10,649,209 | B2 | 5/2020 | Leighton et al. |
| 10,795,434 | B2 | 10/2020 | Crispin |
| 2001/0021239 | A1 | 9/2001 | Itoga et al. |
| 2001/0033440 | A1 | 10/2001 | Togino |
| 2002/0021461 | A1 | 2/2002 | Ono et al. |
| 2002/0070904 | A1 | 6/2002 | Okuyama |
| 2003/0169397 | A1 | 9/2003 | Reichow |
| 2003/0184868 | A1 | 10/2003 | Geist |
| 2005/0094292 | A1 | 5/2005 | Cahall |
| 2006/0119794 | A1 | 6/2006 | Hillis et al. |
| 2006/0132914 | A1 | 6/2006 | Weiss et al. |
| 2007/0008624 | A1 | 1/2007 | Hirayama |
| 2007/0177275 | A1 | 8/2007 | McGuire, Jr. |
| 2009/0051879 | A1 | 2/2009 | Vitale et al. |
| 2009/0167651 | A1 | 7/2009 | Minano et al. |
| 2010/0103078 | A1 | 4/2010 | Mukawa et al. |
| 2010/0149073 | A1 | 6/2010 | David |
| 2010/0278480 | A1 | 11/2010 | Vasylyev |
| 2010/0290127 | A1 | 11/2010 | Kessler et al. |
| 2010/0321409 | A1 | 12/2010 | Komori et al. |
| 2011/0007277 | A1 | 1/2011 | Solomon |
| 2011/0050655 | A1 | 3/2011 | Mukawa |
| 2011/0083741 | A1 | 4/2011 | Munro |
| 2011/0083742 | A1 | 4/2011 | Munro |
| 2011/0155331 | A1 | 6/2011 | Lopin |
| 2011/0157600 | A1 | 6/2011 | Lyon |
| 2011/0213664 | A1 | 9/2011 | Osterhout et al. |
| 2011/0221656 | A1 | 9/2011 | Haddick et al. |
| 2011/0226332 | A1 | 9/2011 | Ford et al. |
| 2011/0227813 | A1 | 9/2011 | Haddick et al. |
| 2011/0255303 | A1 | 10/2011 | Nichol et al. |
| 2011/0286222 | A1 | 11/2011 | Coleman |
| 2012/0002294 | A1 | 1/2012 | Dobschal |
| 2012/0002295 | A1 | 1/2012 | Dobschal et al. |
| 2012/0019662 | A1 | 1/2012 | Maltz |
| 2013/0147686 | A1 | 6/2013 | Clavin |
| 2013/0235191 | A1 | 9/2013 | Miao |
| 2013/0242392 | A1 | 9/2013 | Amirparviz et al. |
| 2014/0153102 | A1 | 6/2014 | Chang |
| 2015/0205126 | A1 | 7/2015 | Schowengerdt |
| 2016/0109708 | A1 | 4/2016 | Schowengerdt |
| 2016/0154244 | A1 | 6/2016 | Bietry |
| 2016/0270656 | A1 | 9/2016 | Samec et al. |
| 2016/0343164 | A1 | 11/2016 | Urbach et al. |
| 2017/0332070 | A1 | 11/2017 | Markovsky et al. |
| 2018/0045960 | A1* | 2/2018 | Palacios ................. G02F 1/133 |
| 2018/0308455 | A1 | 10/2018 | Hicks et al. |
| 2018/0348524 | A1 | 12/2018 | Blum et al. |
| 2020/0049998 | A1 | 2/2020 | Leighton |
| 2020/0183174 | A1 | 6/2020 | Stannard |
| 2020/0225400 | A1 | 7/2020 | Stannard |
| 2020/0233218 | A1 | 7/2020 | Leighton et al. |
| 2020/0278553 | A1 | 9/2020 | Leighton et al. |
| 2021/0055788 | A1 | 2/2021 | Crispin |

FOREIGN PATENT DOCUMENTS

| | | | |
|---|---|---|---|
| EP | 1736812 | B1 | 4/2010 |
| EP | 3355315 | A1 | 8/2018 |
| RU | 2069835 | C1 | 11/1996 |
| TW | 271580 | B | 1/2007 |
| WO | 2002099509 | A1 | 12/2002 |
| WO | 2007014371 | A2 | 2/2007 |
| WO | 2007019138 | A1 | 2/2007 |
| WO | 2007062098 | A2 | 5/2007 |
| WO | 2008109420 | A2 | 9/2008 |
| WO | 2008110942 | A1 | 9/2008 |
| WO | 2010033859 | A2 | 3/2010 |
| WO | 2010062481 | A1 | 6/2010 |
| WO | 2010106248 | A1 | 9/2010 |
| WO | 2010123934 | A1 | 10/2010 |
| WO | 2011124897 | A1 | 10/2011 |
| WO | 2011130715 | A2 | 10/2011 |
| WO | 2018009885 | A1 | 1/2018 |
| WO | 2018166006 | A1 | 9/2018 |
| WO | 2020123018 | | 6/2020 |
| WO | 2020123561 | | 6/2020 |
| WO | 2020146683 | | 7/2020 |

OTHER PUBLICATIONS

Office Action dated Feb. 19, 2019, issued on U.S. Appl. No. 15/206,111, filed Jul. 8, 2016, assigned to Daqri LLC.

(56) References Cited

OTHER PUBLICATIONS

Office Action dated Nov. 3, 2017 issued on U.S. Appl. No. 15/206,111, filed Jul. 8, 2016, 8 pages.
Aye T M, "Miniature Guided Light Array Sequential Scanning Display for Head Mounted Displays," Final Report to US Army CECOM, May 15, 1998. Retrieved on-line from http://handle.dtic.mil/100.2/ADA350745, 35 pages.
Corresponding GB Patent Application GB1200321.6 specification and drawings, filed Jan. 9, 2011, at UK Intellectual Property Office, to Cerr Limited, Inventors: Crosby, David Nicholas et al., 46 pages.
UK Intellectual Property Office, Combined Search and Examination Report under Sections 17 and 18(3) of UK Patents Act 1977, dated May 8, 2012, issued on corresponding GB Patent Application GB1200312.6,to Cerr Limited, Inventors Crosby, David Nicholas et al., 3 pages.
International Search Report and Written Opinion dated Nov. 2, 2017 on International Patent Application PCTU1741228, filed in Jul. 17, 2017 in the name of Daqri, LLC, 21 pages.
International Search Report and Written Opinion dated Feb. 21, 2020 issued on International Patent Application PCT/US2019/065551, filed Dec. 10, 2019, in the name of Daqri Llc, 18 pages.
Office Action dated Aug. 10, 2017 issued on U.S. Appl. No. 14/825,148, 36 pages.
Office Action dated Mar. 10, 2018, issued on U.S. Appl. No. 15/404,172, filed Jan. 1, 2017 assigned to Daqri LLC, 41 pages.
Office Action dated Jan. 31, 2019 issued on U.S. Appl. No. 15/893,599, filed Feb. 10, 2018, 30 pages.
Office Action dated Aug. 8, 2019 issued on U.S. Appl. No. 15/893,599, filed Feb. 10, 2018, 48 pages.
International Search Report Jan. 9, 2020, issued on International Patent Application PCT/US19/55198, filed Oct. 8, 2019 in the name of Daqri, LLC.
International Search Report and Written Opinion dated May 19, 2020 on International Patent Application PCT/US2020/012995, filed Jan. 9, 2020 in the name of Daqri, LLC, 40 pages.
Office Action dated Apr. 24, 2020 issued on U.S. Appl. No. 16/658,078, filed Nov. 19, 2019, 57 pages.
Office Action dated Feb. 3, 2020, issued on U.S. Appl. No. 16/596,648, filed Oct. 8, 2019, 36 pages.
Office Action dated Aug. 27, 2020 issued on U.S. Appl. No. 16/739,103, filed Jan. 9, 2020, 2 pages.
Office Action dated Mar. 1, 2016 issued on U.S. Appl. No. 14/825,148, filed Aug. 12, 2015, 11 pages.
International Search Report and the Written Opinion of International Search Authority / US, dated Oct. 24, 2016 on International Patent Application PCT/US16/41588, filed Jul. 8, 2016 in the name of Daqri LLC.
Non Final office action received for U.S. Appl. No. 16/709,787 no. dated Apr. 6, 2021, 24 pages.
Non Final office action received for U.S. Appl. No. 16/709,787 no. dated May 21, 2021, 43 pages.

\* cited by examiner

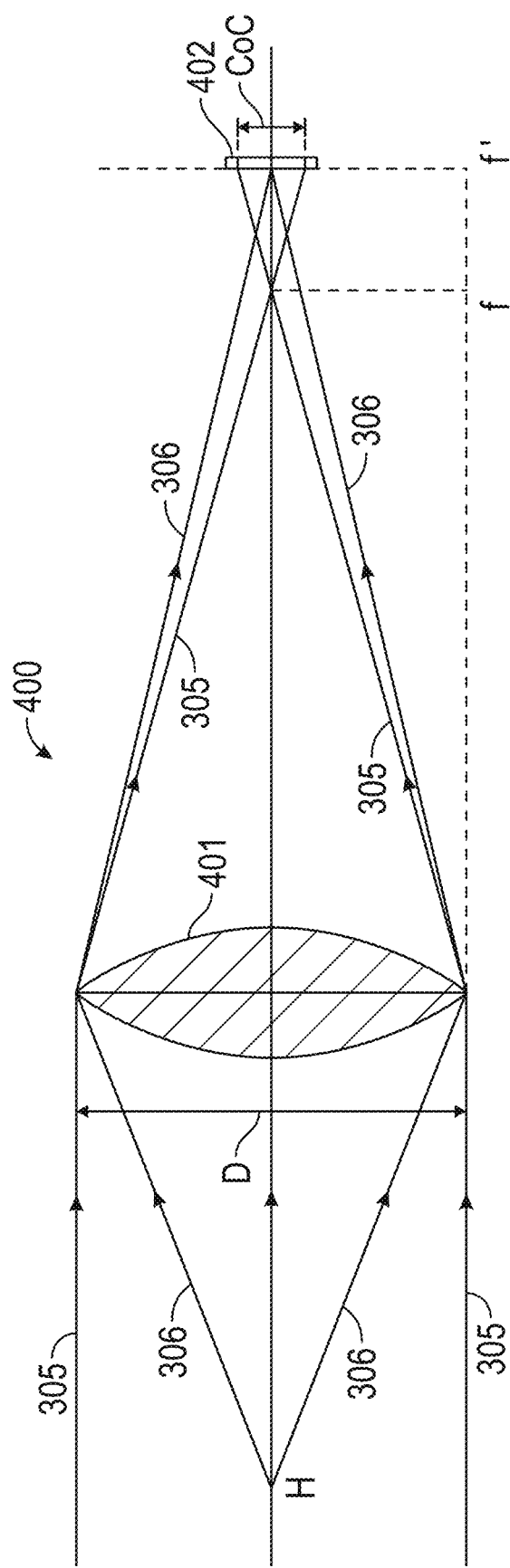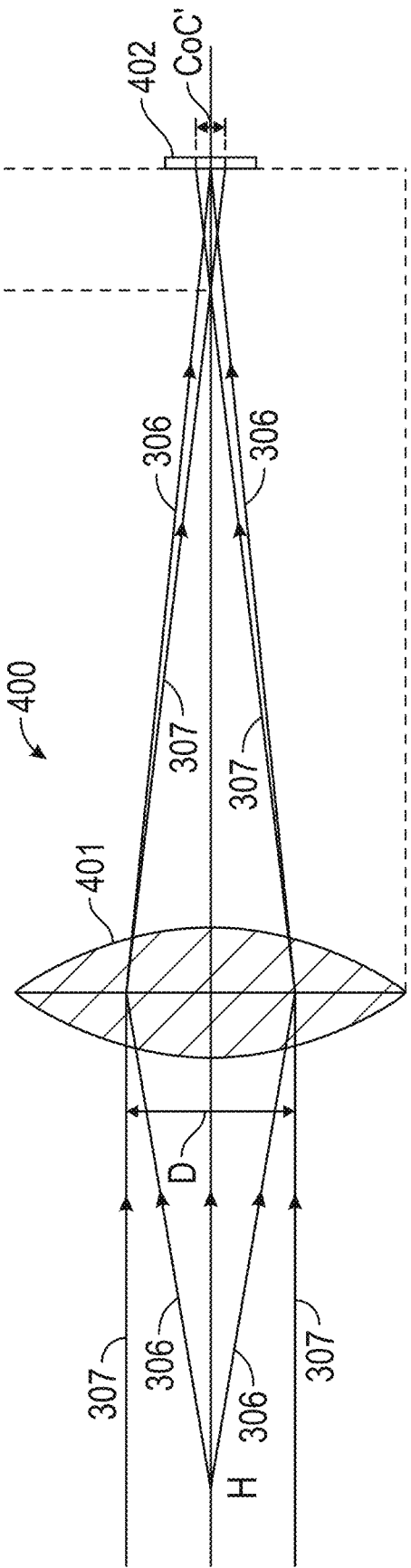

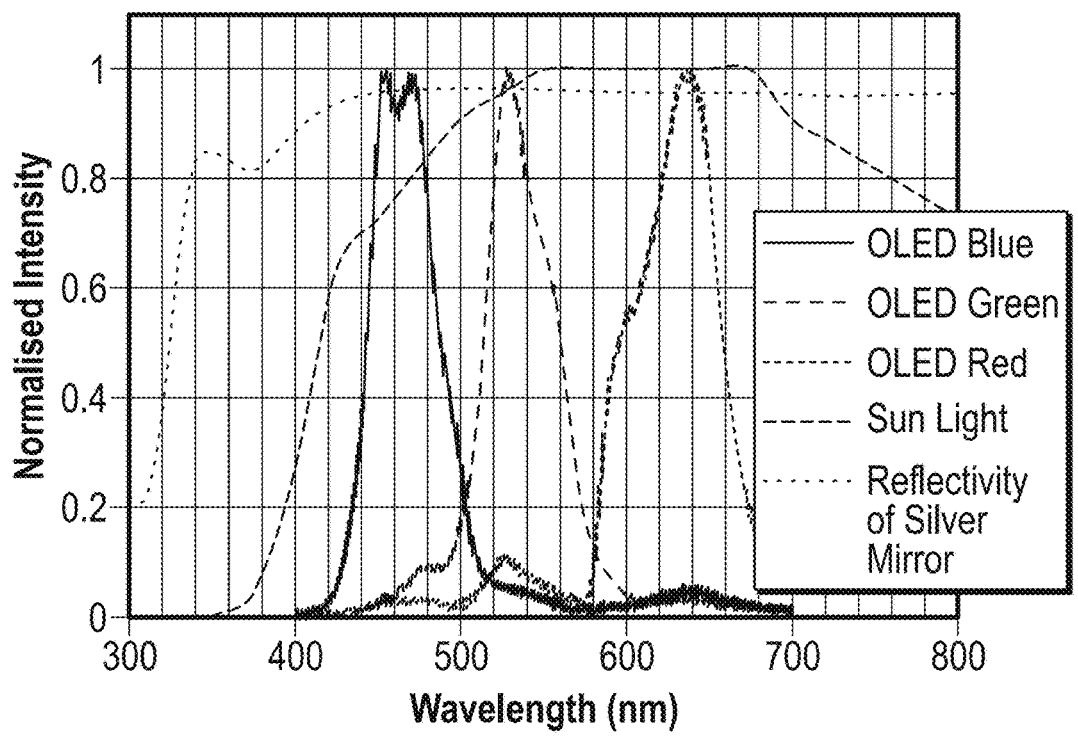
FIG. 26
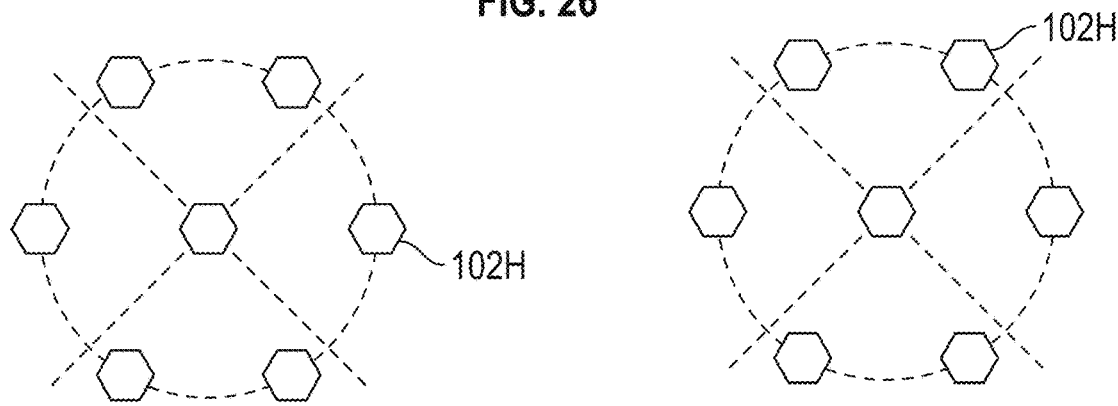
FIG. 27
FIG. 28
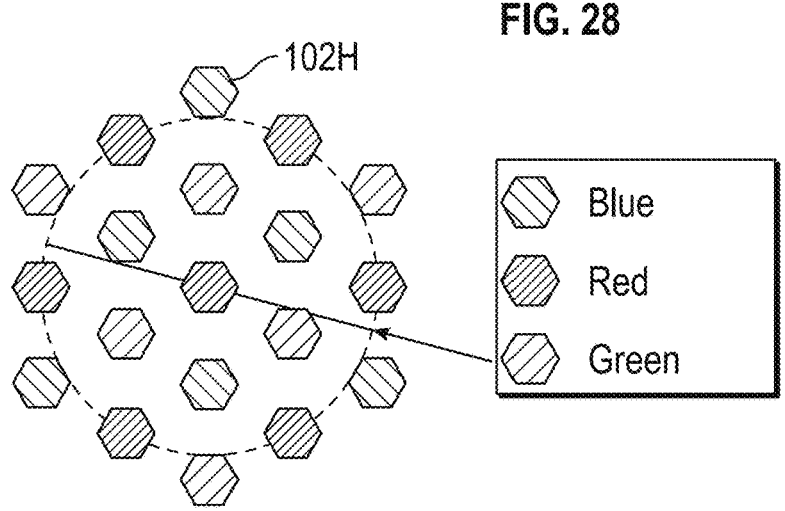
FIG. 29

Direct - View Eyetracking

Indirect - View Eyetracking

OPTICAL HYPERFOCAL REFLECTIVE SYSTEMS AND METHODS, AND AUGMENTED REALITY AND/OR VIRTUAL REALITY DISPLAYS INCORPORATING SAME

TECHNICAL FIELD

Embodiments relate to optical systems and methods, and more particularly but not exclusively, to optical systems for augmented reality systems and/or virtual reality optical displays. Some embodiments relate to systems and methods for delivering virtual display image views to the human eye in augmented reality imaging systems and/or virtual reality imaging systems. Some embodiments relate to augmented and/or virtual reality displays incorporating the aforementioned optical systems and methods associated therewith.

BACKGROUND

Virtual reality and augmented reality display systems, such as those used in head mounted displays and head up displays, are configured to display a virtual image to the human eye. In augmented reality display systems, the systems deliver the virtual image overlaying the real world being observed by the human eye.

Some users of such virtual reality and augmented reality systems experience eye strain and fatigue resulting in an uncomfortable viewing experience.

There is a need to provide systems that can be used in virtual reality and/or augmented reality displays to at least alleviate the problems of eye strain and fatigue.

SUMMARY

According to one aspect, there is provided an optical hyperfocal reflective system. The optical hyperfocal reflective system may comprise at least one optical substrate; an optical input coupling portion configured to input couple a collimated display image to the optical substrate; and an optical hyperfocal output coupling portion integrated with the optical substrate; wherein the optical output coupling portion includes at least one hyperfocal reflective view port; wherein the hyperfocal reflective view port comprises at least one discrete optical hyperfocal reflector spot integrated with the optical substrate; wherein the discrete optical hyperfocal reflector spot is at least partially reflective and configured to reflectively project on to a target area located at predetermined working distance from the hyperfocal reflective view port a discrete portion of the optical input coupled display image rays as a discrete optical spot beam of rays that form a discrete virtual display image portion, wherein the discrete optical hyperfocal reflector spot is sized to form the discrete optical spot beam with a diameter at the target area such that the view of the discrete virtual display image portion, as seen by a lens-detector system locatable at the target area, is hyperfocused.

In some embodiments, the optical hyperfocal output coupling portion includes a plurality of the hyperfocal reflective view ports integrated with the optical substrate, and wherein the optical hyperfocal reflector spots are distributed spaced apart from one another in a pattern extending along the optical hyperfocal coupling portion and form a plurality of the virtual display image portion hyperfocused views which collectively substantially correspond to the display image or a portion thereof.

The target area may be a target area for a human eye and the hyperfocused view of the virtual display portion observable by the human eye locatable at the target area is hyperfocused.

The optical substrate may be partially or substantially transparent to optical rays of a real world image received through a face of the optical substrate facing away from the eye target area.

At least some of the optical hyperfocal reflector spots may be embedded in the optical substrate.

At least some of the optical hyperfocal reflector spots may be disposed on a face of the optical substrate.

Each of the optical hyperfocal reflector spots may have an aperture diameter of between about 100 and 1000 microns.

Each of the discrete spot beams may have a diameter of between 100 and 1000 microns at the target area.

Each or some of the optical hyperfocal reflector spots of the plurality of hyperfocal view ports may be spaced apart by an inter-reflector distance, wherein the inter-reflector distance is between about 500 um to 8 mm.

The shape and pattern of the optical hyperfocal reflector spots may be selected such that the virtual display image views formed by the plurality of hyperfocal view ports tessellate.

Each or some of the optical hyperfocal reflector spots may be wavelength selective hyperfocal reflector spots.

The plurality of hyperfocal reflective view ports may comprise a plurality of red light hyperfocal reflective view ports, a plurality of green light hyperfocal reflective view ports and a plurality of blue light hyperfocal reflective view ports, wherein the optical hyperfocal reflector spot of each of the plurality of red light hyperfocal view ports is configured to selectively reflect the input coupled collimated display image rays having a specific or band of wavelengths of red light and to substantially pass light having other wavelengths, wherein the optical hyperfocal reflector spot of each of the plurality of green light hyperfocal view ports is configured to selectively reflect the input coupled collimated display image rays having a specific or band of wavelengths of green light and to substantially pass light having other wavelengths, and wherein the optical hyperfocal reflector spot of each of the plurality of blue light hyperfocal view ports is configured to selectively reflect the input coupled collimated display image rays having a specific or band of wavelengths of blue light and to substantially pass light having other wavelengths.

The optical substrate may be partially or substantially transparent to optical rays of a real world image received through a face of the optical substrate facing away from the eye target area.

Each hyperfocal reflector spot of each of the plurality of the hyperfocal view ports may be configured to substantially pass the optical rays of the real world image having the other wavelengths of light that are not reflected by the hyperfocal reflector spot and allow them to reach the eye target area superimposed on the display image rays having the specific or band of wavelengths selective reflected by the hyperfocal reflector spot.

The pattern of hyperfocal reflector spots may comprise alternating red light hyperfocal reflector spots, blue light hyperfocal reflector spots and green light hyperfocal reflector spots.

Each of the hyperfocal spots may comprise at least one reflective coating.

Each of the hyperfocal reflector spots may comprise a diffraction optical element.

Each of the hyperfocal reflector spots may comprise a polarisation selective reflector spot.

Each of the plurality of hyperfocal reflector spots may comprise first polarisation state selective reflector spots and second polarisation state selective hyperfocal reflector spots, the first polarisation state being different from the second polarisation state.

The first polarisation state may be orthogonal to the second polarisation state or at an intermediate angle. The intermediate angle may be selected according to the position of the hyperfocal reflective spot along the optical substrate.

The pattern of hyperfocal reflector spots may comprise alternating first polarisation state reflector spots and second polarisation reflector spots.

The optical substrate may comprise an optical waveguide.

The optical substrate may comprise a non-waveguide optical substrate and wherein the optical input coupling may comprise freespace.

According to another aspect, an augmented or virtual reality electronic display system is provide. The system may comprise at least one collimated display image generating system; and at least one optical hyperfocal reflective system optically, the collimated display image generating system being optically coupled to the optical hyperfocal reflective system; wherein the optical hyperfocal reflective system comprises: at least one optical substrate; an optical input portion integrated with and/or separate from the optical substrate; and
an optical hyperfocal output coupling portion; wherein the optical input portion optically couples the collimated display image generating system to the optical hyperfocal output coupling portion; wherein the optical output coupling portion includes at least one hyperfocal reflective view port; wherein the hyperfocal reflective view port comprises at least one discrete optical hyperfocal reflector spot integrated with the optical substrate; wherein the discrete optical hyperfocal reflector spot is at least partially reflective and is configured to reflectively project on to target area located at predetermined working distance from the hyperfocal reflective view port a discrete portion of the optical input coupled display image rays as a discrete optical spot beam of rays, wherein the discrete optical hyperfocal reflector spot is sized to form the discrete optical spot beam with a diameter at the target area such that the view of the discrete virtual display image portion, as seen by a lens-detector system locatable at the target area, is hyperfocused.

In some embodiments, the optical hyperfocal output coupling portion may include a plurality of the hyperfocal reflective view ports integrated with the optical substrate, and wherein the optical hyperfocal reflector spots are distributed spaced apart from one another in a pattern extending along the optical hyperfocal coupling portion.

The lens-detector may be a human eye and wherein the display system may be a binocular system in which a first one of the optical hyperfocal reflective systems is optically coupled to a first one of the collimated display image generating systems; the first optically hyperfocal reflective system being configured for a left eye target area of the binocular display system; and further comprising a second one of the optical hyperfocal reflective systems optically coupled to a second one of the collimated display image generating systems; the second optically hyperfocal reflective system being configured for the right eye target area of the binocular system.

The first optical hyperfocal reflective system and the second optical hyperfocal reflective system may be spaced from the left eye target area and the right eye target area such that a vergence plane of the binocular system is located in the optical range from infinity down to the hyperfocal distance of the left eye lens and the right eye lens.

Each or some of the optical hyperfocal reflector spots of the plurality of hyperfocal view ports may be spaced apart by an inter-reflector distance, wherein the inter-reflector distance is between about 500 um and 8 mm.

The shape and pattern of the optical hyperfocal reflector spots may be selected such that the virtual display image views formed by the plurality of hyperfocal view ports tessellate.

Each or some of the optical hyperfocal reflector spots may be wavelength selective reflector spots.

The plurality of hyperfocal reflective view ports may comprise a plurality of red light hyperfocal reflective view ports, a plurality of green light hyperfocal reflective view ports and a plurality of blue light hyperfocal reflective view ports, wherein the optical hyperfocal reflector spot of each of the plurality of red light hyperfocal view ports is configured to selectively reflect the input coupled collimated display image rays having a specific or band of wavelengths of red light and to substantially pass light having other wavelengths, wherein the optical hyperfocal reflector spot of each of the plurality of green light hyperfocal view ports is configured to selectively reflect the input coupled collimated display image rays having a specific or band of wavelengths of green light and to substantially pass light having other wavelengths, and wherein the optical hyperfocal reflector spot of each of the plurality of blue light hyperfocal view ports is configured to selectively reflect the input coupled collimated display image rays having a specific or band of wavelengths of blue light and to substantially pass light having other wavelengths.

The pattern of hyperfocal view ports may comprise alternating red light hyperfocal viewports, blue light hyperfocal viewports and green light hyperfocal viewports.

The optical substrate may be partially or substantially transparent to optical rays of a real world image received through a face of the optical substrate facing away from the eye target area.

Each hyperfocal reflector spot of each of the plurality of the hyperfocal view ports may be configured to substantially pass the optical rays of the real world image having the other wavelengths of light that are not reflected by the hyperfocal reflector spot and allow them to reach the eye target area superimposed on the display image rays having the specific or band of wavelengths selective reflected by the hyperfocal reflector spot.

Each of the hyperfocal spots may comprise at least one reflective coating.

Each of the hyperfocal reflector spots may comprise a diffraction optical element.

The optical substrate may comprise an optical waveguide.

The optical substrate may comprise a non-waveguide optical substrate and wherein the optical input coupling comprises freespace.

The optical substrate may be partially or substantially transparent to optical rays of a real world image received through a face of the optical substrate facing away from the eye target area.

The augmented or virtual reality display system may be a head mounted display.

The augmented or virtual reality display system may be a head up display.

The augmented or virtual reality display system may be a near eye display.

According to another aspect, an optical exit pupil expander hyperfocal system is provided. The system may comprise: at least one optical substrate; an optical input coupling portion configured to input couple a collimated display image to the optical substrate; wherein the optical input coupling portion is integrated with/or separate from the optical substrate; and an optical hyperfocal output coupling portion integrated with the optical substrate; wherein the optical output coupling portion includes a plurality of hyperfocal reflective view ports integrated with the optical substrate; wherein each one of the hyperfocal reflective view ports comprises at a discrete optical hyperfocal reflector spot integrated with the optical substrate; wherein the discrete optical hyperfocal reflector spot is configured to at least partially reflectively project on to target area located at predetermined working distance from the hyperfocal reflective view port a discrete portion of the optical input coupled display image rays as a discrete optical spot beam of rays, wherein the discrete optical hyperfocal reflector spot is sized to form the discrete optical spot beam with a diameter at the target area such that the view of the discrete virtual display image portion, as seen by a lens-detector system locatable at the target area, is hyperfocused; and wherein the plurality of optical hyperfocal reflector spots are distributed spaced apart from one another in a pattern extending in an exit pupil expanding direction along the optical substrate and are collectively configured to progressively extract the collimated display image optical input rays from the pupil exit expander.

The optical substrate may comprise an optical waveguide.

The optical waveguide may by partially or substantially transparent to optical rays of a real world image received through a face of the optical waveguide facing away from the target area.

The hyperfocal reflector spots may be inclined relative to the exit expanding direction.

At least some of the hyperfocal reflector spots may be partially reflective spots.

At least some of the hyperfocal reflector spots may be fully reflective spots.

The angles of inclination of the hyperfocal reflector spots may vary according to the hyperfocal reflector spot positions along the optical wave guide in the exit pupil extending direction.

The substrate may be a non-waveguide substrate and the hyperfocal reflector spots are progressively inclined relative to the horizontal plane and/or vertical plane according to the hyperfocal reflector spot positions along the substrate in the exit pupil extending direction so as to maintain the field of view of the hyperfocused virtual display image viewable at the target region.

The pattern of hyperfocal reflector spots may vary according to the position along the optical wave guide in the exit pupil expanding direction.

The concentrations of hyperfocal reflector spots per unit volume or area of the optical waveguide may vary according to the position of along the optical wave guide in the exit pupil expanding direction.

The hyperfocal reflector spots may be distributed in patterns in common areas or common volume segments of the optical waveguide, the common areas or common volume segments being spaced apart along the optical wave guide in the exit pupil expanding direction.

The pattern of hyperfocal reflector spots in each common area or common volume segments may vary according to the position of the areas or volume segments along the optical waveguide in the exit pupil expanding direction.

The concentration of the hyperfocal reflector spots in each of the patterns in the common area or common volume segment of the optical waveguide may vary according to the position of the common area or volume segment along the optical waveguide in the exit pupil expanding direction.

The reflectivities of at least some of the hyperfocal reflector spots may vary according to the hyperfocal reflector spot positions along the optical wave guide in the exit pupil extending direction.

At least some of the hyperfocal reflector spots may comprise angularly selective hyperfocal reflector spots.

The angular responses of the angularly selective hyperfocal reflector spots may vary according to their spaced apart positions in the exit pupil expanding direction along the optical wave guide.

The angular selective hyperfocal reflector spots may comprise angular notch filter hyperfocal reflector spots.

At least some of the angularly selective hyperfocal reflector spots may be partially reflective spots.

At least some of the angularly selective hyperfocal reflector spots may be fully reflective spots.

At least some of the hyperfocal reflector spots may be wavelength selective hyperfocal reflector spots.

The wavelength selectivities of the wavelength selective hyperfocal reflector spots may vary according to their spaced apart positions in the exit pupil expanding direction along the optical wave guide.

At least some of the wavelength selective hyperfocal reflector spots may be partially reflective spots.

At least some of the wavelength selective hyperfocal reflector spots may be fully reflective spots.

Each of at least some of the wavelength selective hyperfocal reflector spots may be a wavelength and angular selective hyperfocal reflector spot.

The angular responses of the angular and wavelength selective hyperfocal reflector spots may vary according to their spaced apart positions in the exit pupil expanding direction along the optical wave guide.

The wavelength and angular and wavelength selective hyperfocal reflector spots may be angular notch filter wavelength selective hyperfocal reflector spots.

At least some of the angular and wavelength selective hyperfocal reflector spots may be partially reflective spots.

At least some of the angularly hyperfocal selective reflector spots may be fully reflective spots.

At least some of the hyperfocal reflector spots may be fully reflective hyperfocal reflector spots and arranged spaced apart in an exit pupil expanding direction and spaced part in a different direction to the exit pupil expanding direction to allow some of the optical input collimated display image rays propagating in the exit pupil expanding direction to pass through the optical waveguide between some of the fully reflective spots spaced apart in the different direction and be progressively reflected by fully reflective spots spaced further along the optical waveguide in the exit pupil expanding direction.

At least some of the optical hyperfocal reflector spots may be embedded in the optical substrate.

At least some of the optical hyperfocal reflector spots are disposed on a face of the optical substrate.

Each of the optical hyperfocal reflector spots may have an aperture diameter of between about 100 and 1000 microns.

Each of the spot beam may have a diameter of between 100 and 1000 microns at the target area.

Each or some of the optical hyperfocal reflector spots of the plurality of hyperfocal view ports may be spaced apart by an inter-reflector distance, wherein the inter-reflector spot distance is between about 500 um and 8 mm.

The shape and pattern of the optical hyperfocal reflector spots may be selected such that the virtual display image views formed by the plurality of hyperfocal view ports tessellate.

The plurality of hyperfocal reflective view ports may comprise a plurality of red light hyperfocal reflective view ports, a plurality of green light hyperfocal reflective view ports and a plurality of blue light hyperfocal reflective view ports, wherein the optical hyperfocal reflector spot of each of the plurality of red light hyperfocal view ports is configured to selectively reflect the input coupled collimated display image rays having a specific or band of wavelengths of red light and to substantially pass light having other wavelengths, wherein the optical hyperfocal reflector spot of each of the plurality of green light hyperfocal view ports is configured to selectively reflect the input coupled collimated display image rays having a specific or band of wavelengths of green light and to substantially pass light having other wavelengths, and wherein the optical hyperfocal reflector spot of each of the plurality of blue light hyperfocal view ports is configured to selectively reflect the input coupled collimated display image rays having a specific or band of wavelengths of blue light and to substantially pass light having other wavelengths.

The optical substrate may be partially or substantially transparent to optical rays of a real world image received through a face of the optical substrate facing away from the eye target area.

The reflector spot of each of the plurality of the hyperfocal view ports may be configured to substantially pass the optical rays of the real world image having the other wavelengths of light that are not reflected by the hyperfocal reflector spot and allow them to reach the eye target area superimposed on the display image rays having the specific or band of wavelengths selective reflected by the hyperfocal reflector spot.

The pattern of hyperfocal reflector spots may comprise alternating red light hyperfocal reflector spots, blue light hyperfocal reflector spots and green light hyperfocal reflector spots.

Each of the hyperfocal spots may comprise at least one reflective coating.

Each of the hyperfocal reflector spots may comprise a diffraction optical element.

The diffraction angles of the diffraction optical element hyperfocal reflector spots may vary according to the hyperfocal reflector spot positions along the optical wave guide in the exit pupil extending direction.

The diffraction angles of the diffraction optical element hyperfocal reflector spots may be progressively inclined relative to the horizontal plane and/or vertical plane according to the hyperfocal reflector spot positions along the optical wave guide in the exit pupil extending direction so as to maintain the field of view of the hyperfocused virtual display image viewable at the eye target region.

At least some of the hyperfocal reflector spots may comprise polarisation state selective reflector spots.

The polarisation state selective reflector spots may be polarisation state selective according to their spaced apart positions along the optical wave guide in the pupil exit expanding direction.

The plurality of hyperfocal reflector spots may comprise first polarisation state selective reflector spots and second polarisation state selective reflector spots, the first polarisation state being different from the second polarisation state.

The first polarisation state may be orthogonal to the second polarisation state or at an intermediate angle. The intermediate angle may be selected according to the position of the reflective spot along the optical substrate.

The pattern of hyperfocal reflector spots may comprise alternating first polarisation state reflector spots and second polarisation reflector spots.

The polarisation state selective hyperfocal reflector spots may be distributed in patterns in common areas and/or common volume segments of the optical wave guide, the common areas and/or common volume segments being spaced apart along the optical waveguide in the exit pupil expanding direction.

The polarisation state selective hyperfocal reflector spots in each of the patterns of the common area and/or common volume segment may be polarisation state selective according to the position of the common area and/or common volume segment along the optical waveguide in the exit pupil expanding direction.

The polarisation state selective hyperfocal reflector spots may comprise first polarisation state hyperfocal reflector spots and second polarisation state selective hyperfocal reflector spots, the first polarisation state being orthogonal, or at an intermediate angle, to the second polarisation state. The intermediate angle may be selected according to the position of the reflective spot along the optical substrate.

The concentration of the polarisation state selective hyperfocal reflector spots in each pattern in the common area and/or common volume segment may vary according to the position of the common area and/or common volume segment along the optical wave guide in the first exit pupil expanding direction.

According to another aspect, a near-eye augmented or virtual reality electronic display system is provided. The system may comprise: at least one collimated display image generating system; and at least one optical hyperfocal exit pupil expander, the collimated display image generating system optically coupled to the exit pupil expander; wherein the optical hyperfocal exit pupil expander comprises: an optical substrate; the optical substrate having an optical input coupling portion and an output coupling portion; wherein the optical input coupling portion is configured to input couple the collimated display image from the exit pupil to the optical substrate; wherein the optical output coupling portion includes a plurality of hyperfocal reflective view ports integrated with the optical substrate; wherein each one of the hyperfocal reflective view ports comprises at a discrete optical hyperfocal reflector spot integrated with the optical substrate; wherein the discrete optical hyperfocal reflector spot is configured to at least partially reflectively project on to target area located at predetermined working distance from the hyperfocal reflective view port a discrete portion of the optical input coupled display image rays as a discrete optical spot beam of rays, wherein the discrete optical hyperfocal reflector spot is sized to form the discrete optical spot beam with a diameter at the target area such that the view of the discrete virtual display image portion, as seen by a lens-detector system locatable at the target area, is hyperfocused and wherein the plurality of optical hyperfocal reflector spots are distributed spaced apart from one another in a pattern extending in an exit pupil expanding direction along the optical substrate and are collectively configured to progressively extract the collimated display image optical input rays from the pupil exit expander.

The lens-detector system may be a human eye and wherein the display system is a binocular system in which a first one of the exit pupil expanders is optically coupled to a first one of the collimated display image generating systems; the exit pupil expander being configured for a left eye target area of the binocular display system; and further comprising a second one of exit pupil expanders optically coupled to a second one of the collimated display image generating systems; the second exit pupil expander being configured for the right eye target area of the binocular system.

The first exit pupil expander and the second exit pupil expander may be spaced from the left eye target area and the right eye target area such that a vergence plane of the binocular system is located in the optical range from infinity down to the hyperfocal distance of the left eye lens and the right eye lens.

Each or some of the optical hyperfocal reflector spots of the plurality of hyperfocal view ports may be spaced apart by an inter-reflector distance, wherein the inter-reflector distance is between about 500 um and 8 mm.

The shape and pattern of the optical hyperfocal reflector spots may be selected such that the virtual display image views formed by the plurality of hyperfocal view ports tessellate.

The optical substrate may comprise an optical waveguide.

The optical waveguide may partially or substantially transparent to optical rays of a real world image received through a face of the optical waveguide facing away from the eye target area.

The hyperfocal reflector spots may be inclined relative to the exit expanding direction.

At least some of the hyperfocal reflector spots may be partially reflective spots.

At least some of the hyperfocal reflector spots may be fully reflective spots.

The substrate may be a non-waveguide substrate and wherein the angles of inclination of the hyperfocal reflector spots vary according to the hyperfocal reflector spot positions along the substrate in the exit pupil extending direction.

The hyperfocal reflector spots may be progressively inclined relative to the horizontal plane and/or vertical plane according to the hyperfocal reflector spot positions along the optical substrate in the exit pupil extending direction so as to maintain the field of view of the hyperfocused virtual display image viewable at the eye target region.

The pattern of hyperfocal reflector spots may vary according to the position along the optical wave guide in the exit pupil expanding direction.

The reflectivities of at least some of the hyperfocal reflector spots may vary according to the hyperfocal reflector spot positions along the optical wave guide in the exit pupil extending direction.

At least some of the hyperfocal reflector spots may comprise angularly selective hyperfocal reflector spots.

The angular responses of the angularly selective hyperfocal reflector spots may vary according to their spaced apart positions in the exit pupil expanding direction along the optical wave guide.

The angular selective hyperfocal reflector spots may comprise angular notch filter hyperfocal reflector spots.

At least some of the hyperfocal reflector spots may be wavelength selective hyperfocal reflector spots.

The wavelength selectivities of the wavelength selective hyperfocal reflector spots may vary according to their spaced apart positions in the exit pupil expanding direction along the optical wave guide.

Each of at least some of the wavelength selective hyperfocal reflector spots may be a wavelength and angular selective hyperfocal reflector spot.

At least some of the hyperfocal reflector spots may be fully reflective reflector spots and arranged spaced apart in an exit pupil expanding direction and spaced part in a different direction to the exit pupil expanding direction to allow some of the optical input collimated display image rays propagating in the exit pupil expanding direction to pass through the optical waveguide between some of the fully reflective spots spaced apart in the different direction and be progressively reflected by fully reflective spots spaced further along the optical waveguide in the exit pupil expanding direction.

At least some of the optical hyperfocal reflector spots may be embedded in the optical substrate.

At least some of the optical hyperfocal reflector spots may be disposed on a face of the optical substrate.

Each of the optical hyperfocal reflector spots may have an aperture diameter of between 100 and 1000 microns.

Each of the spot beams may have a diameter of between 100 and 1000 microns at the target area.

Each or some of the optical hyperfocal reflector spots of the plurality of hyperfocal view ports may be spaced apart by an inter-reflector distance, wherein the inter-reflector distance is between about 500 um and 8 mm.

The shape and pattern of the optical hyperfocal reflector spots may be selected such that the virtual display image views formed by the plurality of hyperfocal view ports tessellate.

The plurality of hyperfocal reflective view ports may comprise a plurality of red light hyperfocal reflective view ports, a plurality of green light hyperfocal reflective view ports and a plurality of blue light hyperfocal reflective view ports, wherein the optical hyperfocal reflector spot of each of the plurality of red light hyperfocal view ports is configured to selectively reflect the input coupled collimated display image rays having a specific or band of wavelengths of red light and to substantially pass light having other wavelengths, wherein the optical hyperfocal reflector spot of each of the plurality of green light hyperfocal view ports is configured to selectively reflect the input coupled collimated display image rays having a specific or band of wavelengths of green light and to substantially pass light having other wavelengths, and wherein the optical hyperfocal reflector spot of each of the plurality of blue light hyperfocal view ports is configured to selectively reflect the input coupled collimated display image rays having a specific or band of wavelengths of blue light and to substantially pass light having other wavelengths.

Each of the hyperfocal spots may comprise at least one reflective coating.

Each of the hyperfocal reflector spots may comprise a diffraction optical element.

At least some of the hyperfocal reflector spots comprise polarisation state selective reflector spots.

The polarisation state selective reflector spots may be polarisation state selective according to their spaced apart positions along the optical wave guide in the pupil exit expanding direction.

The display image generating system may include a polarisation state dynamic switch, wherein the polarisation state dynamic switch is configured to dynamically vary the polarisation state of the input coupled collimated display image such that the hyperfocal spots reflecting the optical input display image rays switch between different polarisation state selective reflector spots according to the polarisation state of the optical input display image rays.

The polarisation state dynamic switch may comprise a liquid crystal material structure.

The plurality of hyperfocal reflector spots may comprise first polarisation state selective reflector spots and second polarisation state selective reflector spots, the first polarisation state being different from the second polarisation state.

The first polarisation state may be orthogonal to the second polarisation state or at an intermediate angle. The intermediate angle may be selected according to the position of the hyperfocal reflective spot along the optical substrate.

The display image generating system may include a polarisation state dynamic switch, wherein the polarisation state dynamic switch is configured to dynamically vary the polarisation state of the input coupled collimated display image between the first polarisation state and the second polarisation state such that the hyperfocal spots reflecting the optical input display rays dynamically switch between the first polarisation state selective reflector spots and the second polarisation state selective reflector spots according to the polarisation state of the optical input display image rays.

The polarisation state dynamic switch may be further configured to dynamically vary the polarisation state of the input coupled collimated display image circularly between the first polarisation state and the second polarisation state such that the hyperfocal spots reflecting the optical input display rays dynamically switch between the first polarisation state selective reflector spots, a combination of the first polarisation state selective reflector spots and the second polarisation state selective reflector spots, and the second polarisation state selective reflector spots, according to the circular polarisation state of the optical input display image rays.

The polarisation state dynamic switch may comprise a liquid crystal material structure.

The pattern of hyperfocal reflector spots may comprise alternating first polarisation state reflector spots and second polarisation reflector spots.

The polarisation state selective hyperfocal reflector spots may be distributed in patterns in common areas and/or common volume segments of the optical wave guide, the common areas and/or common volume segments being spaced apart along the optical waveguide in the exit pupil expanding direction.

The polarisation state selective hyperfocal reflector spots in each of the patterns of the common area and/or common volume segment may be polarisation state selective according to the position of the common area and/or common volume segment along the optical waveguide in the exit pupil expanding direction.

The concentration of the polarisation state selective hyperfocal reflector spots in each pattern in the common area and/or common volume segment may vary according to the position of the common area and/or common volume segment along the optical wave guide in the first exit pupil expanding direction. According to another aspect, an augmented or virtual reality electronic display system is provided. The system may comprise: at least one collimated display image generating system; and at least one optical hyperfocal freespace reflector, the collimated display image generating system optically coupled to the optical hyperfocal freespace reflector; wherein the optical hyperfocal freespace reflector comprises: an optical substrate having a display image receiving face; and a plurality of hyperfocal reflective view ports integrated with the optical substrate wherein each one of the hyperfocal reflective view ports comprises at a discrete optical hyperfocal reflector spot integrated with the optical substrate; wherein the discrete optical hyperfocal reflector spot is configured to at least partially reflectively project on to a target area located at predetermined distance from the hyperfocal reflective view port a discrete virtual image display portion of the optical input coupled display image rays as a discrete optical spot beam of rays, wherein the discrete optical hyperfocal reflector spot is sized to form the discrete optical spot beam with a diameter at the target area such that the view of the discrete virtual display image portion, as seen by a lens-detector system locatable at the target area, is hyperfocused; and wherein the plurality of optical hyperfocal reflector spots are distributed spaced apart from one another in a pattern extending over the display image receiving face of the optical substrate and are collectively configured such that the virtual display image views formed by the reflected discrete optical spot beams together form the display image.

The optical substrate may be partially or substantially transparent to optical rays of a real world image received through a face of the optical substrate facing away from the eye target area.

The optical substrate may comprise a flat or curved optical combiner substrate.

The optical combiner substrate may be off axis relative to the axis of the image display generating system.

The display system may be a binocular system in which a first one of the optical hyperfocal freespace reflectors is optically coupled to a first one of the collimated display image generating systems; the first optical hyperfocal freespace reflector being configured for a left eye target area of the binocular display system; and further comprising a second one of the optical hyperfocal freespace reflectors optically coupled to a second one of the collimated display image generating systems; the second optical hyperfocal freespace reflector being configured for the right eye target area of the binocular system.

The lens-detector may be a human eye and wherein the first optical hyperfocal freespace reflector and the second optical hyperfocal freespace reflector are spaced from the left eye target area and the right eye target area such that a vergence plane of the binocular system is located in the optical range from infinity down to the hyperfocal distance of the left eye lens and the right eye lens.

Each or some of the optical hyperfocal reflector spots of the plurality of hyperfocal view ports may be spaced apart by an inter-reflector distance, wherein the inter-reflector distance is between about 500 um and 8 mm.

The shape and pattern of the optical hyperfocal reflector spots may be selected such that the virtual display image views formed by the plurality of hyperfocal view ports tessellate.

At least some of the hyperfocal reflector spots may be partially reflective spots.

At least some of the hyperfocal reflector spots may be fully reflective spots.

The reflectivities of at least some of the hyperfocal reflector spots may vary according to the hyperfocal reflector spot positions on the receiving face of the optical substrate.

At least some of the hyperfocal reflector spots may be wavelength selective hyperfocal reflector spots.

The wavelength selectivities of the wavelength selective hyperfocal reflector spots may vary according to their spaced apart positions on the receiving face of the optical substrate.

The optical hyperfocal reflector spots may have an aperture diameter of between 100 and 1000 microns.

Each of the spot beams may have a diameter of between 100 and 1000 microns at the target area.

Each or some of the optical hyperfocal reflector spots of the plurality of hyperfocal view ports may be spaced apart by an inter-reflector distance, wherein the inter-reflector distance is between about 500 um and 8 mm.

The shape and pattern of the optical hyperfocal reflector spots may be selected such that the virtual display image views formed by the plurality of hyperfocal view ports tessellate.

The plurality of hyperfocal reflective view ports may comprise a plurality of red light hyperfocal reflective view ports, a plurality of green light hyperfocal reflective view ports and a plurality of blue light hyperfocal reflective view ports, wherein the optical hyperfocal reflector spot of each of the plurality of red light hyperfocal view ports is configured to selectively reflect the input coupled collimated display image rays having a specific or band of wavelengths of red light and to substantially pass light having other wavelengths, wherein the optical hyperfocal reflector spot of each of the plurality of green light hyperfocal view ports is configured to selectively reflect the input coupled collimated display image rays having a specific or band of wavelengths of green light and to substantially pass light having other wavelengths, and wherein the optical hyperfocal reflector spot of each of the plurality of blue light hyperfocal view ports is configured to selectively reflect the input coupled collimated display image rays having a specific or band of wavelengths of blue light and to substantially pass light having other wavelengths.

The each of the hyperfocal spots may comprise at least one reflective coating.

Each of the hyperfocal reflector spots may comprise a diffraction optical element.

At least some of the hyperfocal reflector spots may comprise polarisation state selective reflector spots.

The polarisation state selective reflector spots may be polarisation state selective according to their spaced apart positions over the receiving face of the optical substrate.

The display image generating system may include a polarisation state dynamic switch, wherein the polarisation state dynamic switch is configured to dynamically vary the polarisation state of the input coupled collimated display image such that the hyperfocal spots reflecting the optical input display image rays switch between different polarisation state selective reflector spots according to the polarisation state of the optical input display image rays.

The polarisation state dynamic switch may comprise a liquid crystal material structure.

The plurality of hyperfocal reflector spots may comprise first polarisation state selective reflector spots and second polarisation state selective reflector spots, the first polarisation state being different from the second polarisation state.

The first polarisation state may be orthogonal to the second polarisation state or at an intermediate angle. The intermediate angle may be selected according to the position of the hyperfocal reflective spot along the optical substrate.

The display image generating system may include a polarisation state dynamic switch, wherein the polarisation state dynamic switch is configured to dynamically vary the polarisation state of the collimated display image between the first polarisation state and the second polarisation state such that the hyperfocal spots reflecting the optical input display rays dynamically switch between the first polarisation state selective reflector spots and the second polarisation state selective reflector spots according to the polarisation state of the optical input display image rays.

The polarisation state dynamic switch may be further configured to dynamically vary the polarisation state of the input coupled collimated display image circularly between the first polarisation state and the second polarisation state such that the hyperfocal spots reflecting the optical input display rays dynamically switch between the first polarisation state selective reflector spots, a combination of the first polarisation state selective reflector spots and the second polarisation state selective reflector spots, and the second polarisation state selective reflector spots, according to the circular polarisation state of the optical input display image rays.

The polarisation state dynamic switch may comprise a liquid crystal material structure.

The pattern of hyperfocal reflector spots may comprise alternating first polarisation state reflector spots and second polarisation reflector spots.

According to another aspect, there is provided an optical and electronic display system. The system may comprise any one of the optical hyperfocal reflective systems mentioned hereinbefore or hereinafter; at least one processor; and at least one eye tracking camera operably coupled to the processor, the eye tracking camera(s) being configured to monitor the eye at the eye target area; wherein the processor is operably coupled to the display image generating system of an augmented or virtual reality electronic display system; and wherein the optical hyperfocal reflective system is configured to form a hyperfocused human eye view of the virtual display image of the display image according to the monitoring of the eye.

The eye tracking camera(s) may be configured to monitor the gaze direction of the eye at the eye target area; wherein the processor may be configured to modify a display image according to an eye tracking value corresponding to the gaze direction being monitored by the eye tracking camera; and wherein the optical hyperfocal reflective system may be configured to form a hyperfocused human eye view of the virtual display image of the modified display image.

The processor may be configured to apply blurring to one or more objects in the display image according to the eye tracking output.

The processor may be configured to determine where an eye in the eye target area of the augmented or virtual reality electronic display system is looking at a real world object of the real world scene and the position of the plane in which real world object is located; wherein the processor is configured to determine the intended positions of objects in the hyperfocused virtual display image relative to the plane in which real world object is located and wherein the display image generating system is configured to apply blur to one or more of objects in the display image that have an intended position closer or further away from the plane in which the a real world object is located.

The eye tracking camera may be configured to monitor the pupil size of the eye and further comprising a luminance control system configured to control the amount of outside world luminance reaching the eye.

The luminance control system may comprise an electro darkening filter or panel located between the eye target area and the outside world, the processor being operably connected to the electro darkening filter and being configured to provide feedback control to the electro darkening filter or panel to control the amount of outside world luminance reaching the eye according to the pupil size monitoring.

The eye tracking camera may be arranged in an indirect view configuration.

The eye tracking camera may be arranged in a direct view configuration.

According to yet another aspect, a method for an augmented or virtual reality electronic display system is provided. The method may comprise determining the gaze direction of an eye at an eye target area of the augmented or virtual reality electronic display system based on eye tracking information; modifying a display image according to the determined gaze direction; displaying, using the augmented or virtual reality electronic display system, a hyperfocused human eye view of a virtual display image of the modified image.

The method may further comprise tracking of the eye using at least one eye tracking camera and determining the eye tracking information from the eye tracking camera.

Modifying the display image according to the eye tracking may comprise apply blurring to one or more objects in the display image according to the eye tracking.

The method may further comprise determining, from the eye tracking, where an eye in the eye target area of the augmented or virtual reality electronic display system is looking at a real world object of the real world scene, the position of the plane in which real world object is located, the intended positions of objects in the display image relative to the plane in which real world object is located.

The method may further comprise applying blur to one or more of objects in the display image that have an intended position closer or further away from the plane in which the a real world object is located.

According to yet another aspect method for an augmented or virtual reality electronic display system is provide. The method may comprise: determining the gaze direction of an eye at an eye target area of the augmented or virtual reality electronic display system based on eye tracking information; modifying a display image according to the determined gaze direction; displaying, using the augmented or virtual reality electronic display system, a hyperfocused human eye view of a virtual display image of the modified image.

The method may further comprise tracking of the eye using at least one eye tracking camera and determining the eye tracking information from the eye tracking camera.

Modifying the display image according to the eye tracking may comprise applying blurring to one or more objects in the display image according to the eye tracking.

The method may further comprise determining, from the eye tracking, where an eye in the eye target area of the augmented or virtual reality electronic display system is looking at a real world object of the real world scene, the position of the plane in which real world object is located, the intended positions of objects in the display image relative to the plane in which real world object is located.

The method may further comprise applying blur to one or more of objects in the display image that have an intended position closer or further away from the plane in which the a real world object is located.

According to yet another aspect, an apparatus is provided. The apparatus may comprise: a memory storing instructions; and one or more processors, wherein the instructions, when processed by the one or more processors, cause: eye tracking with an eye tracking camera the gaze direction of an eye observing an augmented or virtual reality electronic display; modifying a display image according to the eye tracking; generating a hyperfocused human eye view of a virtual display image of the modified display image.

Modifying the display image according to the eye tracking may comprise applying blurring to one or more objects in the display image according to the eye tracking.

At least one processor may be further configured to: determine from the eye tracking where an eye in the eye target area of the augmented or virtual reality electronic display system is looking at a real world object of the real world scene; the position of the plane in which real world object is located; determine the intended positions of objects in the display image relative to the plane in which real world object is located; and apply blur to one or more of objects in the display image that have an intended position closer or further away from the plane in which the a real world object is located.

According to yet another aspect, a computer-readable medium is provided. The computer-readable medium may include contents that are configured to cause a processor to edit an image to be displayed by performing a method comprising: determining from an eye tracking camera the gaze direction of an eye of the observer of a hyperfocused virtual image of a display image; editing the display image by apply blurring to one or more objects in the display image according to the gaze direction such that one or more objects in the hyperfocused virtual image appear out of focus.

According to yet another aspect, an optical hyperfocal reflective system is provided. The system may comprise: at least one optical substrate; an optical hyperfocal output coupling portion integrated with the optical substrate; wherein the optical output coupling portion includes at least one hyperfocal reflective view port; wherein the hyperfocal reflective view port comprises at least one discrete optical hyperfocal reflector spot, the optical hyperfocal reflector spot being partially reflective and integrated with the optical substrate and orientated towards an eye viewing location of the system; wherein an aperture of the discrete optical hyperfocal reflector spot is about 100 and 1000 microns in diameter.

The optical hyperfocal output coupling portion may include a plurality of the hyperfocal reflective view ports integrated with the optical substrate, and wherein the optical hyperfocal reflector spots are distributed spaced apart from one another in a pattern extending along the optical hyperfocal output coupling portion.

The optical substrate may comprise partially or substantially transparent material.

At least some of the optical hyperfocal reflector spots may be embedded in the optical substrate.

Each or some of the optical hyperfocal reflector spots of the plurality of hyperfocal view ports may be spaced apart by an inter-reflector spot which is between about 500 um and 8 mm.

According to yet another aspect, a method of reflectively delivering a display image for augmented reality and/or virtual display systems is provided. The method may comprise projecting a display image at infinity into or onto a substrate of an optical delivery device; and forming a hyperfocused view of a virtual image of the display image at a viewing location; wherein forming a hyperfocused view of a virtual image of the display image comprises: reflectively projecting from at least one hyperfocal reflector spot of at least one hyperfocal reflective view port integrated with the optical substrate at least one portion of the display image as at least one discrete spot beam, wherein the optical hyperfocal reflector spot is sized to form the discrete optical spot beam with a diameter at the viewing location such that the view of the display image portion, as seen by a lens-detector system locatable at the viewing location, is hyperfocused.

According to yet another aspect, an optical exit pupil expander hyperfocal system is provided. The system may comprise: a first optical waveguide substrate; a first optical input coupling portion configured to selectively input couple collimated display image rays of at least one first wavelength into the first optical waveguide substrate in an exit pupil expanding direction and to pass at least some collimated image rays of at least a second wavelength therethrough; wherein the first optical input coupling portion is integrated with/or separate from the first optical waveguide substrate; and a first optical hyperfocal output coupling portion integrated with the first optical waveguide substrate; wherein the first optical output coupling portion includes one or a plurality of first hyperfocal reflective view ports integrated with the first optical waveguide substrate; wherein each one of the first hyperfocal reflective view ports comprises a first discrete optical hyperfocal reflector spot integrated with the first optical waveguide substrate wherein the first discrete optical hyperfocal reflector spot is configured to at least partially reflectively project on to a target area located at a predetermined working distance from the first hyperfocal reflective view port a discrete portion of the optical input coupled display image rays of at least the first wavelength as a first discrete optical spot beam of rays, wherein an aperture of the first discrete optical hyperfocal reflector spot is sized so that the first discrete optical spot beam of rays of at least the first wavelength forms a view of the virtual display image portion that is hyperfocused as seen by a lens-detector locatable at the target area.

The system may further comprise a second optical waveguide substrate; a second optical input coupling portion configured to selectively input couple the collimated display image rays of the at least one second wavelength, received from the first optical input coupling portion, into the second optical waveguide substrate in an exit pupil expanding direction; wherein the second optical input coupling portion is integrated with/or separate from the second optical waveguide substrate; wherein the first wavelength is different from the second wavelength; a second optical hyperfocal output coupling portion integrated with the second optical waveguide substrate; wherein the optical hyperfocal output coupling portion is at least partially transparent to the first discrete optical spot beam of rays of the at least first wavelength at least partially reflected from the first hyperfocal reflective spots, wherein the second optical output coupling portion includes one or a plurality of second hyperfocal reflective view ports integrated with the second optical waveguide substrate; wherein each one of the second hyperfocal reflective view ports comprises a second discrete optical hyperfocal reflector spot integrated with the second optical waveguide substrate; wherein the second discrete optical hyperfocal reflector spot is configured to at least partially reflectively project on to target area located at a predetermined working distance from the second hyperfocal reflective view port a discrete portion of the optical input display image rays of at least the second wavelength, received from the second optical input coupling portion, as a second discrete optical spot beam of rays, wherein an aperture of the second discrete optical hyperfocal reflector spot is sized so that the second discrete optical spot beam of rays of at least the second wavelength forms a view of the virtual display image portion that is hyperfocused as seen by a lens-detector locatable at the target area.

The plurality of first optical hyperfocal reflector spots may be distributed spaced apart from one another in a first pattern extending in an exit pupil expanding direction along the first optical waveguide substrate and are collectively configured to progressively extract the collimated display image optical input rays of at least the first wavelength from the pupil exit expander; and the plurality of second optical hyperfocal reflector spots may be distributed spaced apart from one another in a second pattern extending in an exit pupil expanding direction along the second optical waveguide substrate and are collectively configured to progressively extract the collimated display image optical input rays of at least the second wavelength from the pupil exit expander.

The plurality of first optical hyperfocal reflector spots may be distributed in the first optical waveguide substrate relative to the plurality of second optical hyperfocal reflector spots distributed in the second optical waveguide substrate such that the hyperfocused views formed at the target area by the first discrete spot beams do not overlap hyperfocused views formed at the target area by the second discrete spot beams.

The collimated image may be polychromatic and wherein the at least first wavelength may comprise a wavelength corresponding to a first color and the at least second wavelength comprises a wavelength corresponding to a second color.

The first optical input coupling portion may be configured to selectively input couple the collimated image rays of the first wavelength and some of the collimated image rays of the second wavelength into the optical first waveguide; and the first optical input coupling portion may be configured to pass at least some of the other collimated image rays of the second wavelength and to pass the collimated rays of a third wavelength to the second optical input coupling portion.

The plurality of first hyperfocal spots may be configured to selectively reflect the collimated image rays of the first wavelength and the second wavelength received from the first optical input coupling portion as the first discrete spots beams.

The second optical input coupling portion may be configured to selectively input couple the collimated image rays of the second wavelength and the third wavelength received from the first second optical coupling portion into the second optical waveguide substrate.

The plurality of second hyperfocal spots may be configured to selectively reflect the collimated image rays of the second wavelength and the third wavelength received from the optical input coupling portion as the second discrete spots beams.

The first wavelength may correspond to a first color, the second wavelength corresponds to a second color and the third wavelength corresponds to a third color.

The first color may comprise blue, the second color may comprise green and the third color may comprise red.

The system may further comprise a third optical waveguide substrate; wherein the first optical input coupling portion is further configured to pass collimated image rays of the second wavelength and a third wavelength therethrough; the first, second and third wavelengths being different from one another; wherein the second optical input coupling portion is further configured to pass the collimated image rays of at least the third wavelength therethrough; and a third optical input coupling portion configured to input couple the collimated display image rays of the at least one third wavelength, received from the second optical input coupling portion, into the second optical waveguide substrate in an exit pupil expanding direction; wherein the third optical input coupling portion is integrated with/or separate from the third optical waveguide substrate; a third optical hyperfocal output coupling portion integrated with the third optical waveguide substrate; wherein the third optical hyperfocal output coupling portion is at least partially transparent to the reflected first discrete optical spot beam of rays of the at least first wavelength and the reflected second discrete optical spot beam of rays of the at least second wavelength; wherein the third optical output coupling portion includes one or a plurality of third hyperfocal reflective view ports integrated with the third optical waveguide substrate; wherein each one of the third hyperfocal reflective view ports comprises a third discrete optical hyperfocal reflector spot integrated with the third optical waveguide substrate; wherein the third discrete optical hyperfocal reflector spot is configured to at least partially reflectively project on to target area located at a predetermined working distance from the third hyperfocal reflective view port a discrete portion of the optical input display image rays of at least the third wavelength, received from the third optical input coupling portion, as a third discrete optical spot beam of rays, wherein an aperture of the third discrete optical hyperfocal reflector spot is sized so that the third discrete optical spot beam of rays of at least the third wavelength forms a view of the virtual display image portion that is hyperfocused as seen by a lens-detector locatable at the target area.

The first optical input coupling portion may be configured to selectively input couple the collimated image rays of the first wavelength into the optical first waveguide; and wherein the first optical input coupling portion is configured to pass collimated image rays of the second wavelength and the third wavelength to the second optical input coupling portion; wherein the plurality of first hyperfocal spots may be configured to selectively reflect the collimated image rays of the first wavelength received from the first optical input coupling portion as the first discrete spots beams; wherein the second optical input coupling portion may be configured to selectively input couple the collimated image rays of the second wavelength received from the first second optical coupling portion into the second optical waveguide substrate and wherein the second optical input coupling portion may be configured to pass therethrough the collimated image rays of the third wavelength received from the first optical input coupling portion; wherein the plurality of second hyperfocal spots may be configured to selectively reflect the collimated image rays of the second wavelength received from the optical input coupling portion as the second discrete spots beams; wherein the third optical input coupling portion may be configured to selectively input couple the collimated image rays of the third wavelength received from the second optical coupling portion into the third optical waveguide substrate; wherein the plurality of second hyperfocal spots may be configured to selectively reflect the collimated image rays of the third wavelength received from the third optical input coupling portion as the third discrete spots beams;

First wavelength may correspond to a first color, the second wavelength may correspond to a second color and the third wavelength may correspond to a third color.

The first color may comprise blue, the second color may comprise green and the third color may comprise red.

The plurality of first optical hyperfocal reflector spots may be distributed spaced apart from one another in a first pattern extending in an exit pupil expanding direction along the first optical waveguide substrate and are collectively configured to progressively extract the collimated display image optical input rays of at least the first wavelength from the pupil exit expander; wherein the plurality of second optical hyperfocal reflector spots may be distributed spaced apart from one another in a second pattern extending in an exit pupil expanding direction along the second optical waveguide substrate and are collectively configured to progressively extract the collimated display image optical input rays of at least the second wavelength from the pupil exit expander; and wherein the plurality of third optical hyperfocal reflector spots may be distributed spaced apart from one another in a third pattern extending in an exit pupil expanding direction along the second optical waveguide substrate and are collectively configured to progressively extract the collimated display image optical input rays of at least the third wavelength from the pupil exit expander.

The plurality of first optical hyperfocal reflector spots, the plurality of second optical hyperfocal reflectors spots and the plurality of third optical hyperfocal reflector spots may be distributed in the first optical waveguide substrate, the second optical waveguide substrate and the third optical waveguide substrate, respectively relative to each other such that the hyperfocused views formed at the target area by the first discrete spot beams, the second discrete spot beams and the third discrete spot beams do not overlap one another.

One or more of the optical output coupling portions may comprise a diffraction optical output coupler, each of the reflective spots of the diffraction optical output coupler comprising a diffraction grating.

One or more of the optical input coupling portions may comprise a diffraction optical input coupler.

The system may further comprise a pupil expanding region operably coupling the optical input coupling portion to the output coupling portion.

The pupil expanding region may comprise a diffraction extension grating.

INCORPORATION BY REFERENCE

All publications mentioned herein are incorporated herein by reference to disclose and describe the apparatus, methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

The publications discussed or mentioned herein are provided solely for their disclosure prior to the filing date of the present application. Nothing herein is to be construed as an admission that the present invention is not entitled to antedate such publication by virtue of prior invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order that the present invention may be more readily understood, reference will now be made to the accompanying drawings, in which:

FIG. 3 is a simple geometric optical ray diagram illustrating a circle of confusion rendered by a lens on an optical detector;

FIG. 4 is a simple geometric optical ray diagram illustrating how the circle of confusion shown in FIG. 3 has been adjusted;

FIG. 26 illustrates typical emission spectrum of an image source;

FIG. 27 illustrates a plurality of optical hyperfocal reflective view ports according to an embodiment;

FIG. 28 illustrates a plurality of optical hyperfocal reflective view ports according to an embodiment;

FIG. 29 illustrates a plurality of optical hyperfocal reflective view ports according to an embodiment;

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Applicant has identified herein one or more important drawbacks of optical image delivery systems that are used in virtual reality and augmented reality display, such as but not limited to head mounted displays, including near to eye displays, and head up displays.

One such drawback is the undesirable effect of the so called optical vergence—accommodation conflict. Vergence is the simultaneous movement of both eyes in opposite directions to obtain or maintain single binocular vision. Vergence movements are closely connected to accommodation of the eye. Accommodation is the process by which the vertebrate eye changes optical power to maintain a clear image or focus on an object as its distance varies. Under normal conditions, changing the focus of the eyes to look at an object at a different distance will automatically cause vergence and accommodation.

The so called vergence—accommodation optical conflict effect is a result of the display screen creating the virtual image at a fixed optical distance from the observer yet the observer's eyes automatically adjusting their optical focus based on the perceived distance to objects they are looking at in the virtual image and/or the real world scene. In augmented reality displays, the conflict is a result of simultaneously viewing a virtual image located at a finite focal distance that does not correspond with the real-world focal distance for a given vergence angle.

Figure 1B:
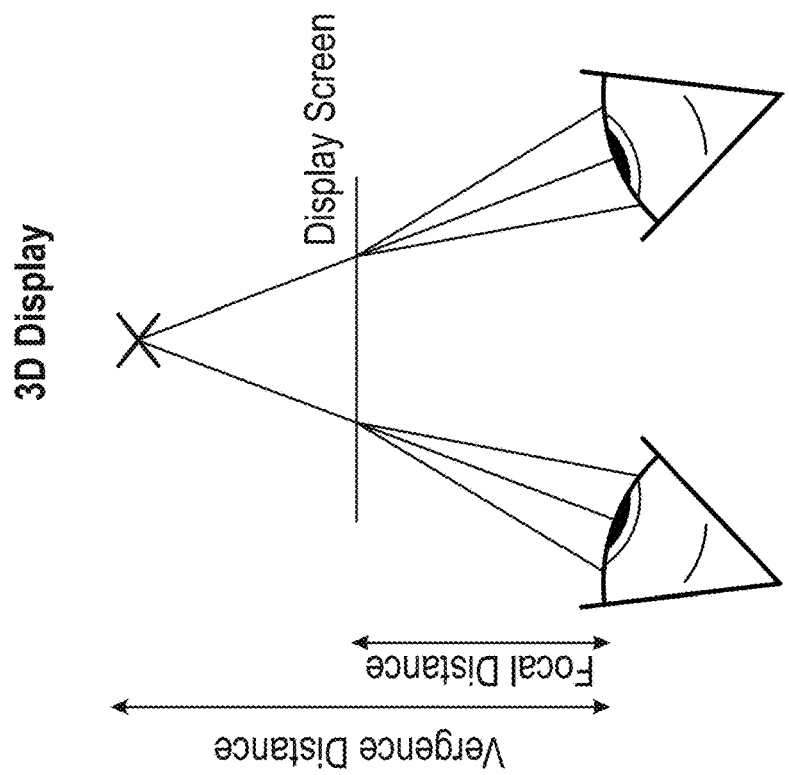
FIG. 1B is a schematic ray diagram illustrating optical convergence—accommodation mismatch associated with conventional optical systems used in augmented reality systems and virtual reality systems.
Figure 1A:
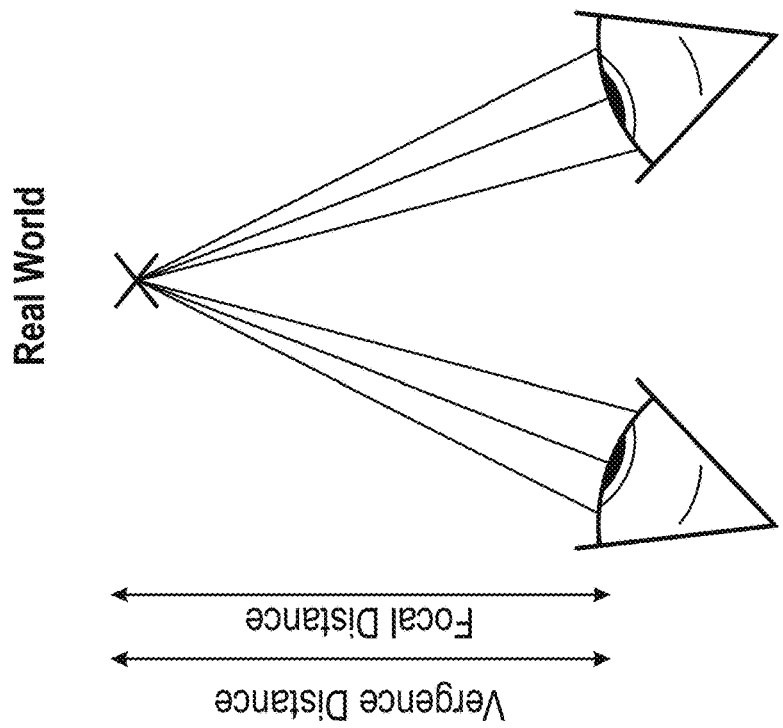
FIG. 1A is a schematic ray diagram illustrating matched optical convergence and accommodation of human eyes observing a real world scene.

FIGS. 1A and 1B are schematics generally illustrating optical convergence—accommodation mismatch problems associated with conventional optical systems used in augmented reality systems and virtual reality systems. In real world viewing vergence and accommodation work together without conflict as shown by way of example in FIG. 1A in which the vergence distance/plane and the focal distance/plane are compatible, i.e. the human eyes are rotated to aim or fix on the real world scene and have adapted to maintain the real world image in focus. In augmented reality displays, and also in virtual reality displays, when the focal plane is fixed, the display can easily emulate the vergence component of a different focal plane, but not the accommodation component. Hence there is a conflict between the two.

By way of example in FIG. 1B, an optical display generates a 3D virtual image of an object that is perceived by the eyes to be at the same distance as the real word scene in FIG. 1A. The human eyes automatically rotate and aim at the virtual image of the object based on the distance of the object being perceived as being beyond the display screen so that the vergence component remains unchanged compared to that shown in FIG. 1A. However, the human eyes naturally adapt to maintain the 3D virtual image in focus at a focal plane of the display screen itself that is significantly less than the vergence distance. Similar conflicts occur when the display generates a virtual image of an object that is perceived to be closer to the human eyes than the actual focal plane of the display screen. The vergence-accommodation conflict can lead to double vision, reduced visual clarity, visual discomfort, and fatigue [see the following articles: Kooi, F. L. and Toet, A. "Visual comfort of binocular and 3D displays." Displays, 25, 99-108. doi:10.1016/j.displays.2004.07.004; Lambooij et al. "Visual Discomfort and Visual Fatigue of Stereoscopic Displays: A Review, Journal of Imaging Science and Technology® 53(3): 030201-030201-14, 2009; and Shibata T, Kim J, Hoffman D M, Banks M S, "The zone of comfort: Predicting visual discomfort with stereo displays." Vis. 2011 Jul. 21; 11(8):11. doi: 10.1167/11.8.11; each of which is incorporated herein by reference.

As a result of the vergence-accommodation conflict, binocular augmented reality systems struggle to produce convincing 3-Dimensional imagery as the angular discrepancy between images sent to the left and right eye (convergence) that conveys an objects distance does not match the depth at which the eye has to focus to form a sharp image (accommodation).

The aforementioned optical problems can be mitigated by aspects of the present technology which allow for optical systems and methods that provide improved optical delivery over known virtual reality and/or augmented display systems. Optical systems and methods according to aspects of the present technology will now be described in more detail for use in some exemplary augmented reality and virtual reality display systems. However, it will be appreciated that in some other aspects and embodiments, the present technology can be configured for augmented reality and/or virtual reality systems other than those shown in the examples and even for other types of optical delivery systems utilized in imaging applications to deliver an improved viewing experience.

As will be explained in more detail below with reference to different aspects and embodiments of the present technology, optical hyperfocal reflective systems are provided which can be used in an augmented reality or virtual reality display system to allow for a reduction in the vergence and accommodation optical conflict. Hyperfocal reflective viewports are employed by the systems to manipulate convergence in displays so as to allow the eyes accommodation to more closely match the convergence. One or more hyperfocal reflective viewports can be adopted in any type of optically redirecting system for augmented or virtual reality displays that is configured to redirect, using some form of reflection, a collimated display image into a human eye. The resulting optical system, referred to herein as an optical hyperfocal reflective system, use the hyperfocal reflective view port structures to deliver an image to the eye extending the focal accommodation range beyond that of the source image. The hyperfocal reflective viewports of the system reduce the optical effects of vergence—convergence conflicts by allowing the accommodation plane to move towards the convergence plane and maintain a sharp image.

The optical hyperfocal reflective system can be implemented using different approaches. In some approaches, the optical hyperfocal reflective system is implemented as a see-through optical combiner or as a non-see through optical combiner. In some embodiments the optical hyperfocal reflective system is an optical waveguide based system. In other embodiments the optical hyperfocal reflective system is a free-space optical reflector/combiner based system or other type of optical module configured to reflectively relay a collimated display image for a virtual or augmented reality display or other optical system.

As one general approach, the optical hyperfocal reflective system has an optical substrate. An optical input coupling portion is configured to input-couple a collimated display image to the optical substrate. An optical hyperfocal output-coupling portion is integrated with the optical substrate. The optical output-coupling portion includes one or a plurality of the hyperfocal reflective view ports. The hyperfocal reflective view port comprises a discrete optical hyperfocal reflector spot integrated with the optical substrate. The discrete optical hyperfocal reflector spot is configured to reflectively project on to a lens-detector system, or a target area in which the lens-detector system is to be placed, a discrete portion of the optical input coupled display image rays as a discrete optical spot beam of rays that form a discrete virtual display image portion. The target area is defined herein to mean an area covering possible display viewing locations of a lens-detector system for viewing the discrete virtual display portion. The lens-detector system, or the target area in which the lens-detector system is to be placed for viewing the discrete virtual display portion, is located at predetermined working distance from the hyperfocal reflective view port.

In some approaches, the lens-detector system is a human eye. In other approaches, the lens-detector system comprises any optical lens-detector device. In some embodiments of the optical lens-detector device, the optical lens-detector device is an optical lens or lens assembly coupled to a sensor device, such as a digital or analog sensor. In some embodiments, optical the lens-detector device is a camera system. Furthermore, it will be understood that whilst in some embodiments described herein reference is made to a human eye and components thereof, the lens-detector system may instead be another type of system, such as for example any of the aforementioned optical-lens detector devices. Yet furthermore, it will be understood that whilst in some embodiments described herein reference is made to an optical lens-detector device, the lens-detector device may on other embodiments be instead a human eye system.

The aperture of the discrete optical hyperfocal reflector spot is sized to form a virtual image hyperfocal spot with an aperture diameter D at the target area for an eye or other lens-detector system so that the discrete optical spot beam forms a view, as seen by the lens-detector system, of the virtual display image portion that is hyperfocused. The size of the virtual image hyperfocal spot at the target area is the effective (not actual) aperture size of the lens-detector system that causes a hyperfocused view of the virtual display portion as seen by the lens-detector system when the lens-detector system is placed in the target area. For a lens-detector system, the effective aperture therefore corresponds to the cross section of the discrete spot beam portion of virtual image forming rays passing into the lens to render a real image optical spot, known as the circle of confusion, on the detector of the lens-detector system. As will be explained in more detail with reference to specific embodiments, the hyperfocal reflective view port is much smaller than the lens of the lens-detector system to stop rays down to provide a circle of confusion that is of similar size to the lens-detector system, accounting for the working distance of the hyperfocal viewport from the lens detectors system.

For the purpose of explaining the optical hyperfocal view port in more detail, reference will now be made to FIG. 2, which is a conceptual diagram of an optical hyperfocal reflective system according to an embodiment of the present technology. For ease of illustration and explanation, elements shown in the FIG. 2 and in the other accompany figures herein are not drawn to scale.

Figure 2:
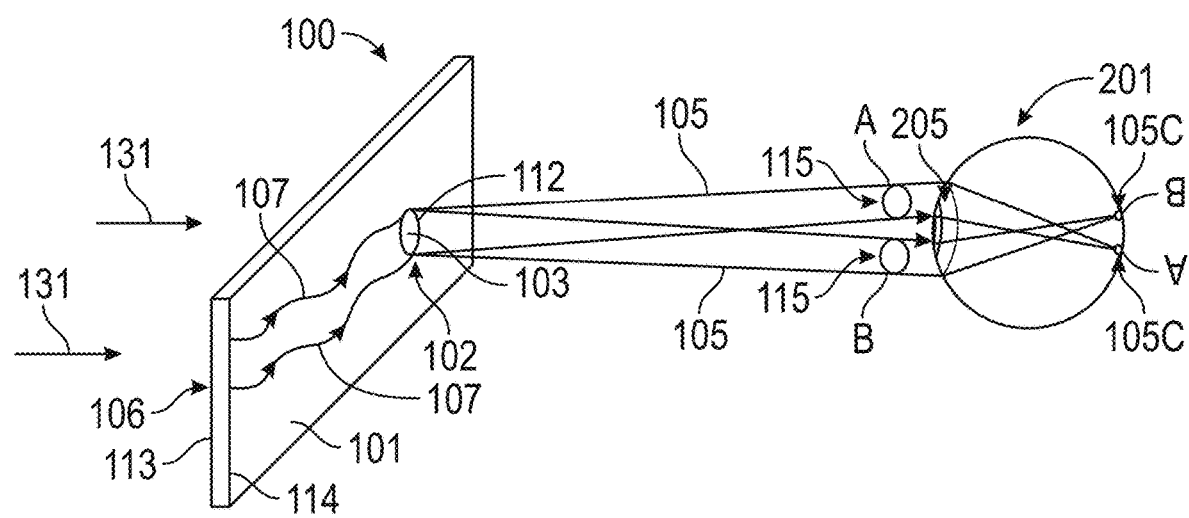
FIG. 2 is a conceptual diagram of an optical hyperfocal reflective system according to an embodiment of the present technology.

In FIG. 2, the optical hyperfocal reflective system 100 is implemented as an augmented reality optical combiner whereby, in use, the system reflectively delivers the virtual image overlaying the real world being observed by the human eye of the observer of the display system. System 100 is implemented as a light guided space optical combiner. However, in other embodiments, the optical hyperfocal reflective system can be implemented as a free-space optical combiner, a non-see through optical combiner (waveguided space or free space), or any type of optical module configured to reflectively relay a collimated display image for a virtual or augmented reality display or other optical system. Furthermore, as mentioned hereinbefore, in some embodiments other types of optical lens-detector system may be used other than the human eye.

As shown in FIG. 2, optical hyperfocal reflective system 100 includes a hyperfocal reflective view port 102 and a light guide optical substrate 101. Light guide optical substrate 101 is at least partly see through and, typically, substantially see-through, to visible light rays 131 from a real world scene that is to be observed by a lens-detector system through substrate 101. The lens-detector system is a human eye 201. In some other embodiments, the lens-detector system is an optical lens-detector device. Substrate 101 is configured so that the light rays 131 from the real world scene enter a front face 113 of substrate 101 on the same side as the real world scene, pass through substrate 101 and exit from rear 114 face of the substrate on the same side as human eye 201 of the observer.

Hyperfocal reflective view port 102 is integrated with the light guide optical substrate 101, meaning that is disposed in the substrate and/or on the surface of substrate 101. Hyperfocal reflective view port 102 has a discrete, physical view port aperture 112. For ease of illustration and explanation, the aperture 112 is shown in FIG. 2 as a one dimensional view port aperture. Hyperfocal view port aperture 112 refers to the opening through which optical input rays 107 of a generated display image input 106 are reflected out of the view port 102 and thereby output substrate 101 towards the human eye 201. Optical ray bundles 105 reflected out of the viewport form a virtual image since they are reflected out as collimated rays, and a cone of these rays is formed by the angular extent across the hyperfocal view port, which contributes to the field of view of the display. Virtual image forming rays in the form of a discrete spot beam 105 pass through viewing lens aperture 115 into the eye lens 205 to render a real image optical spot 105C, known as the circle of confusion, on the eye retina.

In optics, a circle of confusion is an optical spot caused by a cone of light rays from a lens not coming to a perfect focus when imaging a point source. It is also known as disk of confusion, circle of indistinctness, blur circle, or blur spot. The circle of confusion of the human eye is the optical spot caused by the cone of light rays from the eyelens not coming to a perfect focus on the eye retina. For a further explanation of Circle of confusion for the human eye, see for example Ray, Sidney F. 2000, including page 52, in The Manual of Photography: Photographic and Digital Imaging, 9th ed. Ed. Ralph E. Jacobson, Sidney F. Ray, Geoffrey G. Atteridge, and Norman R. Axford. Oxford: Focal Press. ISBN 0-240-51574-9 the entire contents of which is incorporated herein by reference.

FIG. 2. Illustrates an example of how two different letters "A" and "B" projected at infinity and subtending different angles would be focused at the back of the retina. In each case, a separate Circle of confusion (CoC) is formed. A CoC forms the basis of the point spread function of an imaging system, and are convolved with each part of the image. The CoC is the blur spot that is convolved with the scene, and makes differences in focus appear indistinguishable within the hyper focal distance range as will be explained in more detail below.

Reflective view port 102 is sized such that the discrete spot beam cross sectional diameter is sufficiently small that the eyelens or other lens-detector system is hyperfocused, that is, eyelens 205 is focusable from a desired distance (H) all the way to infinity whilst maintaining an acceptably sharp image without changing the image plane location.

For the purpose of explaining how hyper-focal reflective view port 102 is configured to provide hyperfocus, reference is made to FIGS. 3 and 4 which are simple geometric optical ray diagrams illustrating how circles of confusion rendered on an detector device 402 of a lens-detector system 400 can be adjusted. Lens-detector system 400 comprises a viewing lens 401 optically coupled to the optical sensor detector 402. In some embodiments, an optical viewing lens assembly may be used instead of a single lens 401. Optical sensor detector 402 is for example a CCD or CMOS image sensor. Such sensors may in some embodiments employ a rolling shutter or a global shutter. In FIG. 3, optical rays 305 come from a point source at infinity and optical rays 306 come from an arbitrary distance H. The infinity rays 305 focus at the focal length f of the lens 401. The rays 306 from H focus at point f'. At the point f' the rays 305 from infinity have expanded past their ideal focal point and will subtend an area known as the Circle of confusion (CoC). If the smallest resolvable point on the detector 402 is greater than the CoC then the detector will not be able to differentiate between the rays originating from infinity and those originating from H. Both images will appear acceptably sharp.

As can be seen by comparing FIG. 3, with FIG. 4, the CoC diameter can be adjusted by reducing the effective aperture D to the desired size. In FIG. 4, the rays 307 originating from infinity pass through an effective lens aperture with a reduced diameter D compared to the effective aperture shown in FIG. 3. Similarly, using the same principle, by projecting the discrete spot beam 105 of diameter D corresponding to the eye lens hyperfocal aperture on eye lens 205, the effective lens aperture of the human eye is adjusted so that the human eye in FIG. 2 is not able to differentiate between the reflected optical rays 105 from the hyper focal reflective viewport and those originating from H, the hyperfocal distance. This is the fundamental definition for the Hyperfocal reflective viewport 102.

For the lens-detector system shown in FIG. 4, the modified viewing lens aperture D therefore corresponds to the cross sectional diameter D of the discrete spot beam portion of image forming rays 307 passing into viewing lens 401 to render a real image optical spot, the circle of confusion, (CoC') on detector 402 of lens-detector system. As shown in FIG. 2, view port aperture 112 provides a corresponding modified viewing lens aperture at the pupil entrance of the eye. The modified viewing lens aperture is the viewing lens effective aperture that is smaller than the viewing lens actual aperture and that corresponds to the cross section of the reflected discrete spot beam portion of virtual image forming rays 105 passing into the eye lens 205 to render a real image optical spot 105C, the circle of confusion, on the eye retina. A hyperfocal reflective view port 102 is much smaller than the eyelens 205 to effectively stop virtual image forming rays down to provide a circle of confusion that is of similar size to eye lens 205, accounting for the working distance of the hyperfocal viewport from the eye lens.

The size of the modified viewing lens aperture at the target area for a lens-detector system is therefore the effective (not actual) aperture size of the lens-detector system that is smaller than the actual aperture diameter of the viewing lens and that causes a hyperfocused view of the virtual display portion as seen by the lens-detector system when the lens-detector system is placed in the target area.

Hyperfocal distance has different definitions to a person of ordinary skill in the art. One such definition of the hyperfocal distance is the closest distance at which a lens can be focused while keeping objects at infinity acceptably sharp. When the lens is focused at this distance, all objects at distances from half of the hyperfocal distance out to infinity will be acceptably sharp. Another definition is the hyperfocal distance is the distance beyond which all objects are acceptably sharp, for a lens focused at infinity. Both definitions are congruent. Hyperfocus allows a lens to be focused from a desired distance (H), all the way to infinity whilst maintaining an acceptably sharp image without changing the image plane location. For the avoidance of doubt, this application refers to hyperfocal distance with reference to the present technology as meaning the desired distance H, that is, the hyperfocus allows a viewing lens [such as but not limited to the human eye lens] to be focused from the hyperfocal distance (H), all the way to infinity whilst maintaining an acceptably sharp image without changing the virtual image plane location.

The definition of an "acceptably sharp image" is predetermined according to the optical specification of the system. In some embodiments, acceptably sharp image means an image with a level of sharpness that is predetermined according to standard values of average human eye performance. In some embodiments, acceptably sharp image means an image with a level of sharpness that is being predetermined according to a human eye performance of an individual. In some embodiments, acceptably sharp image means an image with a level of sharpness that is predetermined according to the resolution of an optical detector device (non-human). In yet some other embodiments, acceptably sharp image means an image with a level of sharpness that is in accordance to the Nyquist criterion—the circle of confusion should be half the size of the smallest resolvable feature on the display. This would be determined according to the smallest resolvable feature of the lens-detector system. For a lens-detector system being a human eye system, if the display is capable of showing image features below the smallest resolvable feature of the human eye, as per standard accepted values of average human eye performance, then clearly the resolution of the eye is the limit of acceptable sharpness. For the sake of clarity, acceptably sharp as referred to hereinafter means an image with at least a level of sharpness that is in accordance to the Nyquist criterion—the circle of confusion should be half the size of the smallest resolvable feature on the display. However, acceptably sharp may be defined according to any one of the other aforementioned definitions of acceptably sharp.

The equation that describes hyperfocal distance is given by:

$$H = \frac{(D+c)f}{c} \quad (1)$$

H is the hyperfocal distance, the aperture diameter D is the ratio of the focal length f to the F-number N; and c is the diameter of the circle of confusion.

Therefore $$H = \frac{(f/N + c)f}{c} = \frac{f^2}{Nc} + f \quad (2)$$

(for derivation see for example Photography for students of physics and chemistry by Derr, Louis, 1868-1923, including Pages 78 & 79, and appendix, Publication date 1906, Publisher New York, The Macmillan Company; London, Macmillan & Co., ltd. the entire contents of which is incorporated herein by reference).

Given the F-number is $$N = \frac{f}{D} \quad (3)$$

Hence we see that the Hyperfocal distance is directly proportional to both f and D:

$$H = \frac{fD}{c} + f \quad (4)$$

Examples of values of the circle of confusion for the human eye and the relationship with hyperfocal distance based on empirical data have been provided (see for example Ray, Sidney F. 2000, including page 52, in The Manual of Photography: Photographic and Digital Imaging, 9th ed. Ed. Ralph E. Jacobson, Sidney F. Ray, Geoffrey G. Atteridge, and Norman R. Axford. Oxford: Focal Press. ISBN 0-240-51574-9 the entire contents of which is incorporated herein by reference). The following example is given by the aforementioned Ray Sidney reference:

"Normal vision requires muscular action to alter the refractive state of the eye in order to focus. This internal focusing is called accommodation, and physiological limitations set a comfortable near distance of distinct vision (Dv) of some 250 mm . . . For example, in ideal conditions a high-contrast line of width 0.075 mm can be perceived at Dv subtending an angle of approximately 1 minute of arc, and representing an image on the retina of the eye of some 5 micrometres in width . . . The limiting performance is seldom achieved, and a lower value of 0.1 mm line width at Dv is commonly adopted. Converted into resolving power, an acuity of 0.1 mm corresponds to a spatial cycle of 0.2 min, being the width of the line plus an adjacent identical space such as is used on a bar-type resolution test target, giving a value of 5 cycles per mm for the average eye."

The aperture diameter D is determined using the above equations (1) to (4). Rearranging equation (3) to (4) gives equation (5) below for determining D the diameter of the effective aperture of the eye lens (and therefore the diameter of the discrete spot beam 105 at the eye lens shown in FIG. 2) for a predetermined hyperfocal distance H and circle of confusion c.

In some embodiments, the predetermined hyperfocal distance H for the system is a comfortable near distance of distinct vision of the human eye. In such as case, the aperture diameter D (which is the diameter of the reflected discrete spot beam at the viewing lens) is determined from equations (3) and (4) with a hyperfocal distance H equal to a comfortable near distance of distinct view of the human eye and a known circle of confusion c for that hyperfocal distance H. In some embodiments, alternatively or additionally, the hyperfocal distance H is set with a view to maintaining a net reflectivity of the optical image input rays to provide a required display efficiency.

By way of non-limiting example, when focusing at infinity the focal length of the eye lens is approximately 16 mm. When focusing at the hyperfocal distance of 0.25 m the focal length f of the eye is approximately 15.04 mm. The circle of confusion according to the empirical treatment set forth in the aforementioned reference of Ray, Sidney F. 2000 is approximately 13.3 microns for 0.2 mm spatial cycle. From the diameter of the aperture in front of the eye to give retinal resolution limited focus from 0.25 m to infinity is as follows:

$$D = \frac{(H-f)c}{f} = \frac{(0.25 - 15.04 \times 10^{-3})13.3 \times 10^{-6}}{(15.04 \times 10^{-3})}m = 2.1 \times 10^{-4}m \quad (5)$$

Hence, in the aforementioned example, the aperture diameter D corresponds to the ideal pupil diameter for hyper focus from infinity to 0.25 m is 210 microns on the eye lens. The hyperfocal view port aperture 112 is configured with the same or substantially the same aperture diameter. Since rays 105 are substantially parallel, view port aperture 112 projects a substantially similar size discrete spot of reflected rays on the eye lens. For systems in which the optical substrate is an optical waveguide substrate rays 105 are parallel or substantially parallel. For systems in which the optical substrate is an optical freespace combiner substrate or other non-waveguide substrate rays 105 may be parallel or substantially parallel whilst in some other embodiments, they may be diverging away from the hyperfocal reflective view port rather than being parallel and in which case the discrete spot diameter D at the viewing lens may be larger than the view port aperture 112 but can be determined by simple geometry.

The aforementioned example illustrates how to determine the aperture diameter of the hyperfocal reflective view port for a given hyperfocal distance. It would be appreciated that the pupil diameter for hyperfocus on the eye lens may be calculated using other empirical data and is not limited to the specific values set forth in the aforementioned reference of Ray, Sidney F.

In some embodiments, the angular resolution of a head mounted display or near eye display, or other display system incorporating the optical hyperfocal reflective system, combined with Nyquist criterion is used to determine the dimensions of the circle of confusion. The circle of confusion is predetermined to be half the size of the smallest resolvable feature on the displayed image at the exit pupil of display system. In some embodiments, the circle of confusion is predetermined to be less than half the size of the smallest resolvable feature.

Referring now in more detail to near-to-eye wave guide displays and other types of augmented reality display systems according to some embodiments, the optics involved in the design of these displays determine the Field of View (FOV), resolution and image location (x, y and z) amongst other specifics. In the real world our depth perception is driven by two main factors. Vergence; the eyes rotate in to maintain fixation on an object. Accommodation; the eye lens adapts to maintain sharp "in-focus" image on the retina. As previously described vergence-accommodation optical conflict occurs when the focal plane and vergence plane do not align. In a waveguide display, the image is propagated through the guide with the focal plane at infinity. Such AR displays exhibit a more severe vergence accommodation conflict, when the vergence plane is not within the CoC of the accommodation plane (where the display image is focused). Robert Konrad et al, show that vergence can drive accommodation (see "Accommodation-invariant Near-eye Displays", SIGGRAPH July 2017, Robert Konrad, Nitish Padmanaban, Keenan Molner, Emily A. Cooper, Gordon Wetzstein the contents of which is incorporated herein by reference). This convergence and accommodation discrepancy often leads to disorientation and nausea.

In waveguide based displays, the selected initial focal plane is at infinity so as not to forfeit resolution. This is because a waveguide maintains angular information and not positional information. The only way to have an image that has only angular information is to infinity correct it. It is possible to manipulate the displays to cause the eyes to converge at much closer distances but the accommodation of the eyes will remain at infinity causing VAC. Push-pull lenses can be used to bring the focal plane closer but this results in additional components, increasing overall form factor and ultimately provides a single focal plane. Waveguide based displays by their very nature of operation are forced to carry an image which has a focal plane at infinity, deviation from this leads to a loss of resolution. As will be explained more detail below, by using the hyperfocal reflective view port(s) to deliver the image to the eye after it has traversed the waveguide, the infinity focused image can be viewed and accommodated by the user in focal planes other than infinity, eliminating vergence discrepancy.

Figure 5:
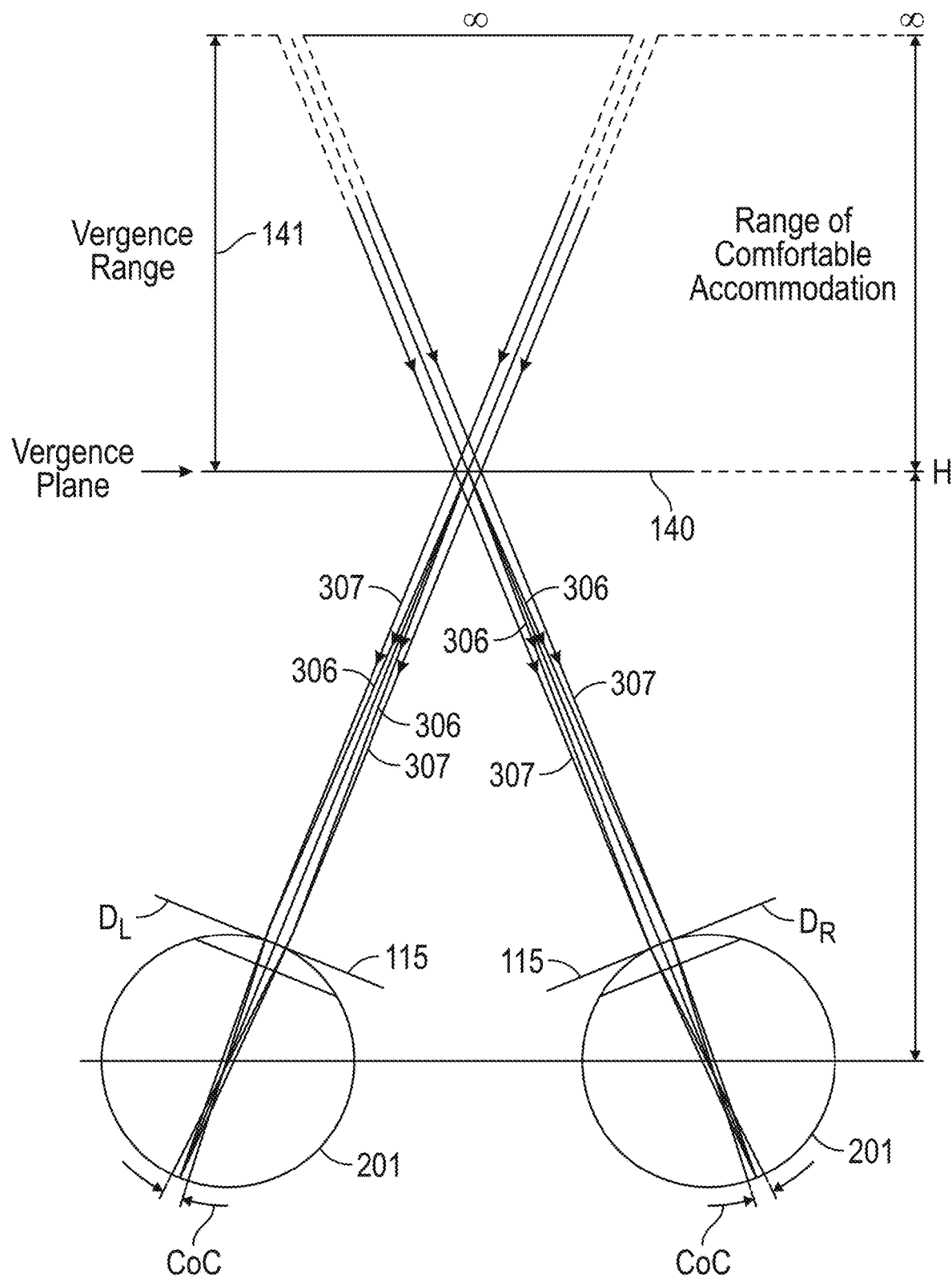
FIG. 5 illustrates how hyperfocal apertures in a binocular configuration at the entrance of the pupils of the eyes provide an accommodation range from the hyperfocal distance (H) to infinity.

In order to explain more adequately how the hyperfocal reflective view port(s) can be used to eliminate vergence discrepancy, reference will now be made to FIGS. 5 and 6 of the accompanying drawings. FIG. 5 illustrates how hyperfocal apertures 115 of diameter (D) in a binocular configuration at the entrance of the pupils of the eyes 201 provide an accommodation range from the hyperfocal distance (H) to infinity. A vergence plane 140, that is, the plane at which the line of sight or visual axis of both eyes converge to maintain single binocular vision, can be selected in a vergence range 141 from H to infinity and used to determine the plane that is most comfortable to accommodate at to maintain an acceptably sharp virtual image. Since optical rays 307 originate from infinity, each hyperfocal aperture 115 is moveable further from the eye along the line of sight without altering the hyperfocal performance. In a similar manner, hyperfocal reflective view port 102 embedded in a waveguide acts as a hyperfocal aperture to a projected display image.

Figure 6:
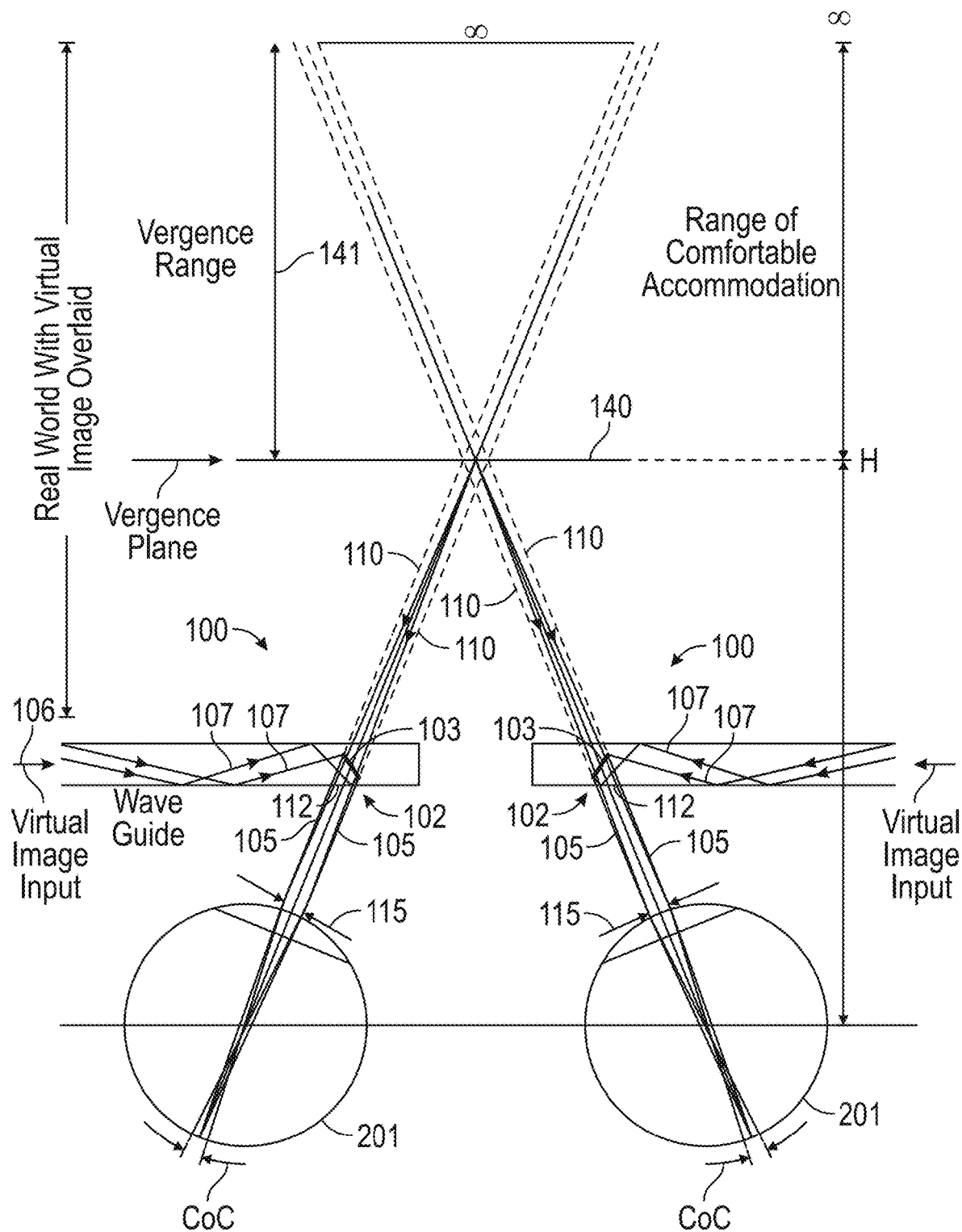
FIG. 6 illustrates a binocular optical hyperfocal reflective system according to an embodiment.

By way of example, FIG. 6 illustrates a binocular optical hyperfocal reflective system having an optical hyperfocal reflective system 100 for each eye 201 to an embodiment. Hyperfocal reflective view ports 102 are provided in respective optical wave guide substrates 101, one for each eye 201. In each of the optical hyperfocal reflective systems 100, aperture 112 of the hyperfocal view port is a 2 dimensional aperture defined by a titled discrete reflector spot 103 embedded in the waveguide substrate 101. Substrate 101 is a geometrical optical waveguide substrate.

Reflector spot 103 may be provided by any type of optical element that is configured to reflectively project out of the optical waveguide substrate and into the eye lens or eye target area (or other optical viewing lens-detector system) a discrete portion of optical input rays 107 as a discrete optical spot beam of substantially parallel rays or diverging rays 105.

The type of discrete reflector spot used can vary. In the embodiment of FIG. 6, one or more of the tilted reflector spots is an optical reflective coating or layer disposed in at least one inclined plane relative to the virtual image input wave propagation axis or exit pupil expanding direction, of the optical wave guide substrate, such as an optical layer comprising one or more metal layers or dielectric layers. In some other embodiments, the type of discrete reflector spot is selected according to the type of optics to be used in the virtual reality or augmented reality system, such as free space optical combiners, other exit pupil expanders, or other waveguide based optics such as but not limited to any class of reflective (isotropic and anisotropic), diffractive, holographic, switchable and addressable, or MEMS etc. waveguide technology.

In some embodiments, one or more of the reflector spots is a diffraction optical element which may be disposed in a plane which is inclined or parallel relative to the propagation axis of the waveguide substrate. Optical diffraction optical elements configured in the transmission mode or reflective mode may be employed as the reflector spots. Diffraction optical elements in the transmission mode effectively function as reflector spots by virtue of the fact that they are disposed on or embedded in optical wave guides and serve to direct waveguide reflected rays out of the guide.

The discrete spot beam 105 having a spot size corresponding to the hyperfocal aperture 115 is projected on the eye lens by the hyper focal reflective view port in waveguide substrate 101. Hyperfocal view port aperture 112 corresponds to the reflector spot aperture and has a cross-section selected accordingly using simple geometry so that reflected rays 105 that exit the view port aperture 112 are still representative of the 1D viewport aperture 112 to provide a discrete spot beam 105 with diameter D at the viewing lens, diameter D being determined as per the above examples. Hyperfocal reflective viewport 102 with a 2D aperture is therefore configured as a hyperfocal viewport to the projected display image. The position of the hyperfocal view ports 102 and the reflector spot tilt angles relative to the eyes are selected so that the vergence plane 140 is in a range from H to infinity and is used to determine the plane that is most comfortable to accommodate at to maintain an acceptably sharp image. The position of the hyperfocal view ports 102 relative to the eyes is determined by the position of the optical wave guide substrates 101 and the position of respective view ports 102 in the substrate optical wave guide substrates.

The aperture diameter of each one of the hyperfocal view ports, that is, the diameter of the discrete reflector spot aperture of the port, is sized sufficiently small such that the human eye view or other optical lens-detector view of the formed virtual image discrete portion is hyperfocused. Each eye is able to accommodate, in a range from infinity down to a hyperfocal distance of the eye lens, a virtual image formed by the discrete optical spot beam 105 without any loss of resolution of the virtual image spot. To this end, diameter D of the discrete spot beam 105 at the viewing lens is determined using the above mentioned procedures for calculating D. In turn, the discrete reflector spot aperture size is determined based on the calculated D taking into account the reflector spot tilt angle(s).

In embodiments in which the reflected spot beam is diverging rather than strictly parallel, the divergence of the beam is also to be taken into account to determine the discrete reflector spot aperture size from D by considering the angular position of the reflector spot relative to the eye lens, the distance between the reflector spot and the eye and the angle of divergence.

In some embodiments, the reflector spot aperture size is selected so that the projected discrete spot beam at the eye lens has a diameter that is equal to the calculated diameter D. In some other embodiments, the reflector spot aperture size is selected so that the projected discrete spot beam at the eye lens has a diameter less than diameter D. By way of non-limiting example, in some approaches of the optical hyperfocal reflective systems of any of the embodiments disclosed herein, the working distance between the hyperfocal reflective spot and the eye target area for a human eye is typically between about 10 mm and 75 mm and the hyperfocal reflector spot aperture size is typically about 100 to 1000 microns in diameter. In some embodiments, the hyperfocal reflector spot aperture size is less than 1000 microns. Note that other working distances and hyperfocal reflector spot sizes are envisaged and will vary according to the type of display system being used and the type of optical lens detector system intended to view the hyperfocused spot image.

Adopting the aforementioned approach, a plurality of hyperfocal reflective viewports 102 can be used in an optical hyperfocal reflective system to create an augmented reality display, that overlays on the real world, projected images that can be both converged and accommodated at planes other than infinity, despite the original projected image being at infinity. This allows a compact waveguide based AR display, or other type of optical reflective system based AR display, to be provided. Whilst the optical hyperfocal reflective system of FIG. 6 is a waveguide based optical combiner, the hyperfocal reflective view ports 102 can be incorporated in other reflective systems which either use waveguide technology such as but not limited to any class of reflective (isotropic and anisotropic), diffractive, holographic, switchable and addressable, or MEMS etc. waveguide technology, or in a non-waveguide systems such as freespace combiners and even non-combiners using such systems.

One drawback of each hyperfocal reflective viewport 102 being away from the eye compared to a hyperfocal aperture at the eye is that the field-of-view that can be accessed by the eye at any one location is reduced.

As a general approach, a pattern or distribution of the plurality of hyperfocal view ports in the optical hyperfocal reflective system is provided to allow eyes 201 to have access to the full field of view of the display. The plurality of hyperfocal reflective viewports are arranged in a particular configuration in the optical hyperfocal reflective system to extract the optical input rays and thereby expand the exit-pupil of the display image generating device whilst performing the hyperfocus of the virtual image in the manner described above with reference to FIGS. 2 to 6. As will be explained in more detail with reference to different embodiments, the particular pattern of hyperfocal view ports may differ depending on the type of optical hyperfocal reflective system, such as waveguide based or free space combiner or non-combiner, being adopted. It is important that eye 201 is receiving a unique portion of the display field of view from each viewport to maintain the hyperfocus. Over sampling will reduce the hyperfocal effect and under sampling will create uniformity issues. This will inevitably mean variation in performance from person to person. In some embodiments, in order to achieve desired performance characteristics, the system can be configured with a distribution of hyperfocal reflective viewports for a specific condition and the optical performance subsequently characterized when those conditions vary.

Reference will now be made in more detail to a near-to-eye waveguide display systems according to some embodiments of the present technology. In a near-to-eye waveguide based system, the plurality of hyperfocal reflective viewports are arranged in a particular configuration in the waveguide to extract progressively the optical rays 107 guided by internal reflection along the waveguide and thereby expand the exit-pupil of the image forming device whilst performing the hyperfocus of the virtual image in the manner described above with reference to FIGS. 2 to 6.

Figure 7:
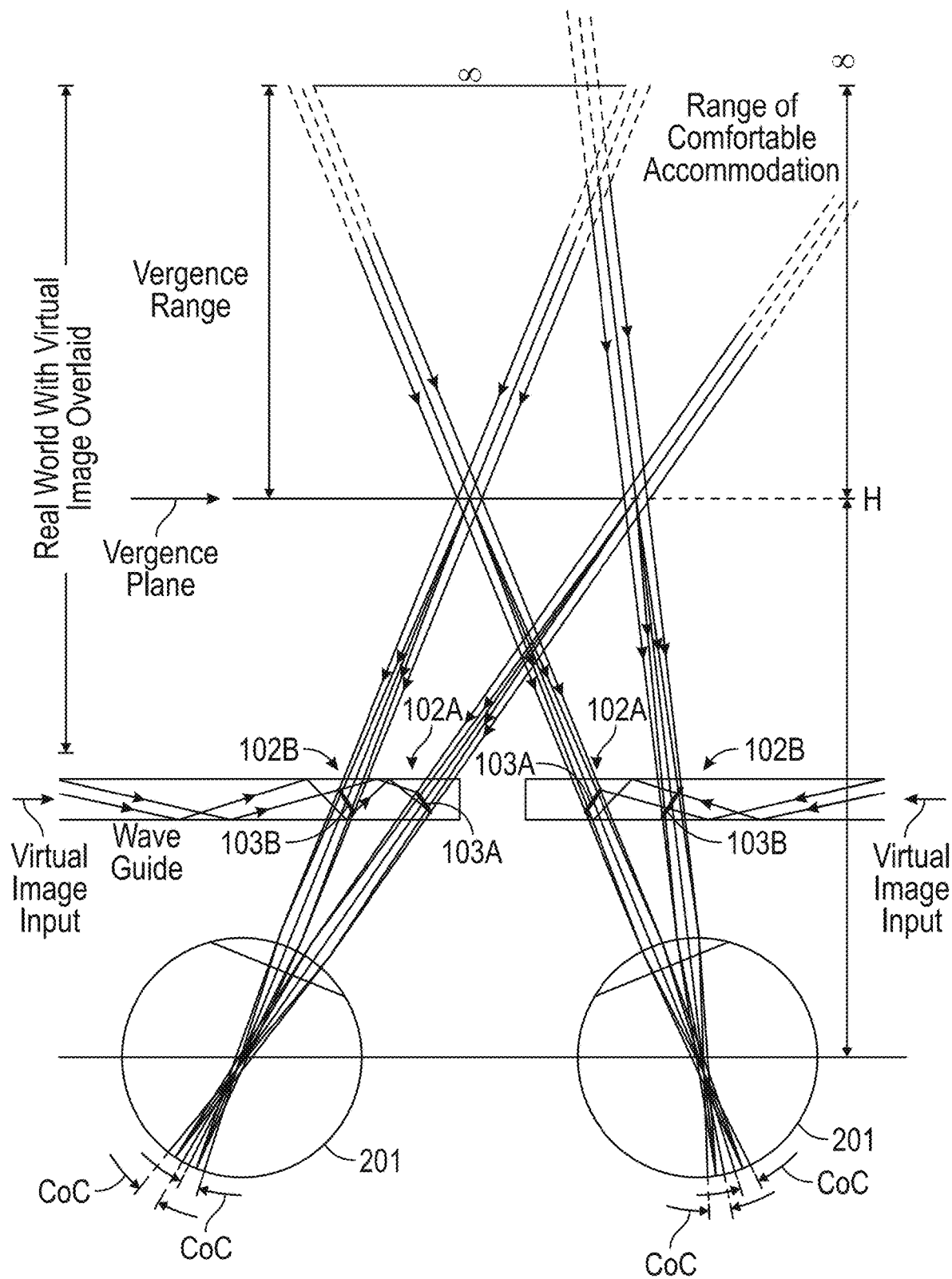
FIG. 7 illustrates a binocular optical hyperfocal reflective system according to an embodiment.

As for the optical hyperfocal reflective system 100 of FIG. 7, the plurality of hyperfocal reflector spots 103 are arranged in the optical hyperfocal reflective system to allow the human eye virtual image view to be hyperfocused over substantially the full field of view of the display system and accommodated at a plane towards the convergence plane. In this manner, each optical hyperfocal reflective system in the near-to-eye system is configured as an exit pupil hyperfocal expander for expanding the exit pupil of the image generating display system.

Figure 8:
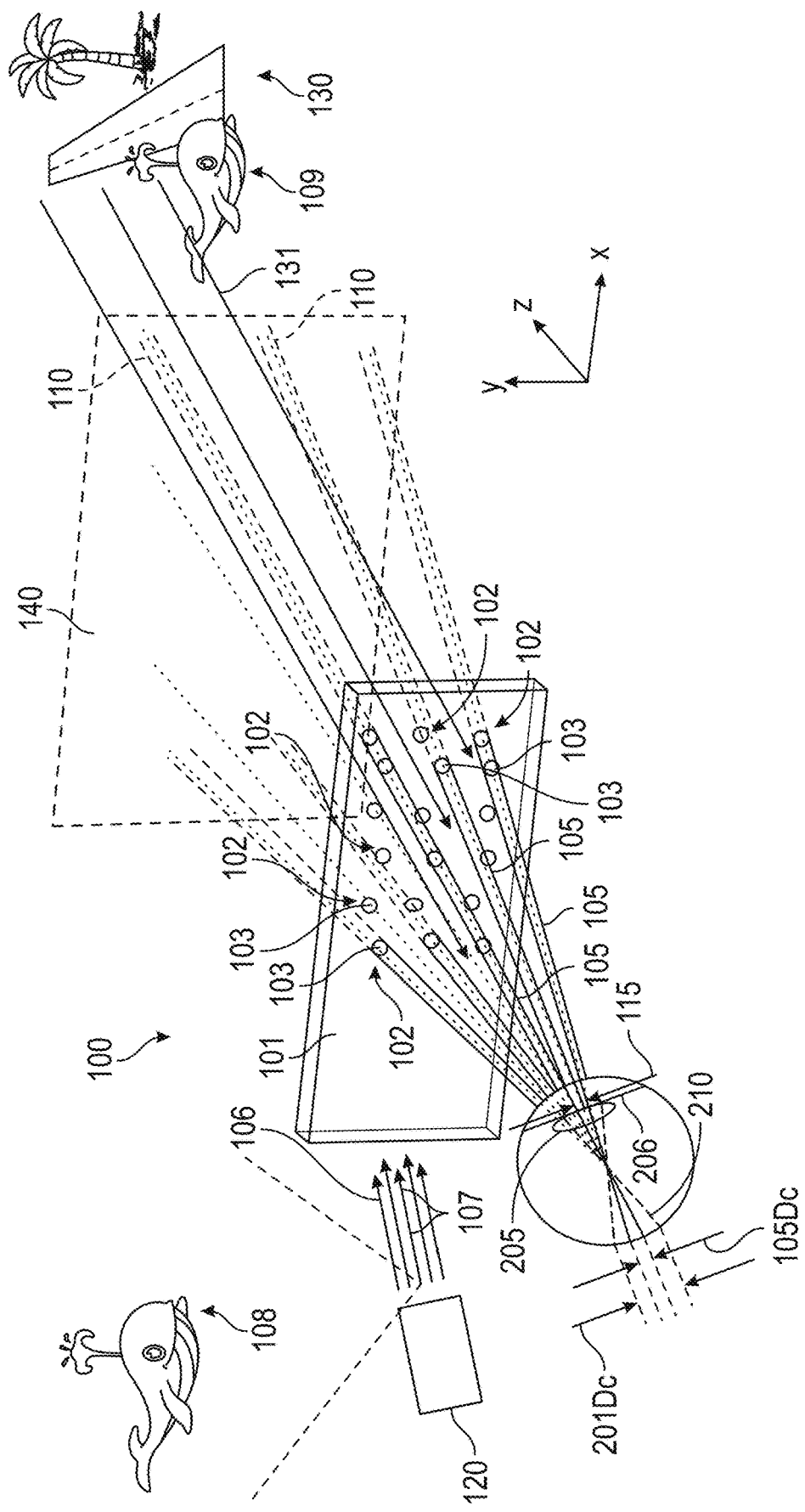
FIG. 8 illustrates a near-to-eye augmented reality display system according to an embodiment.
Figure 9A:
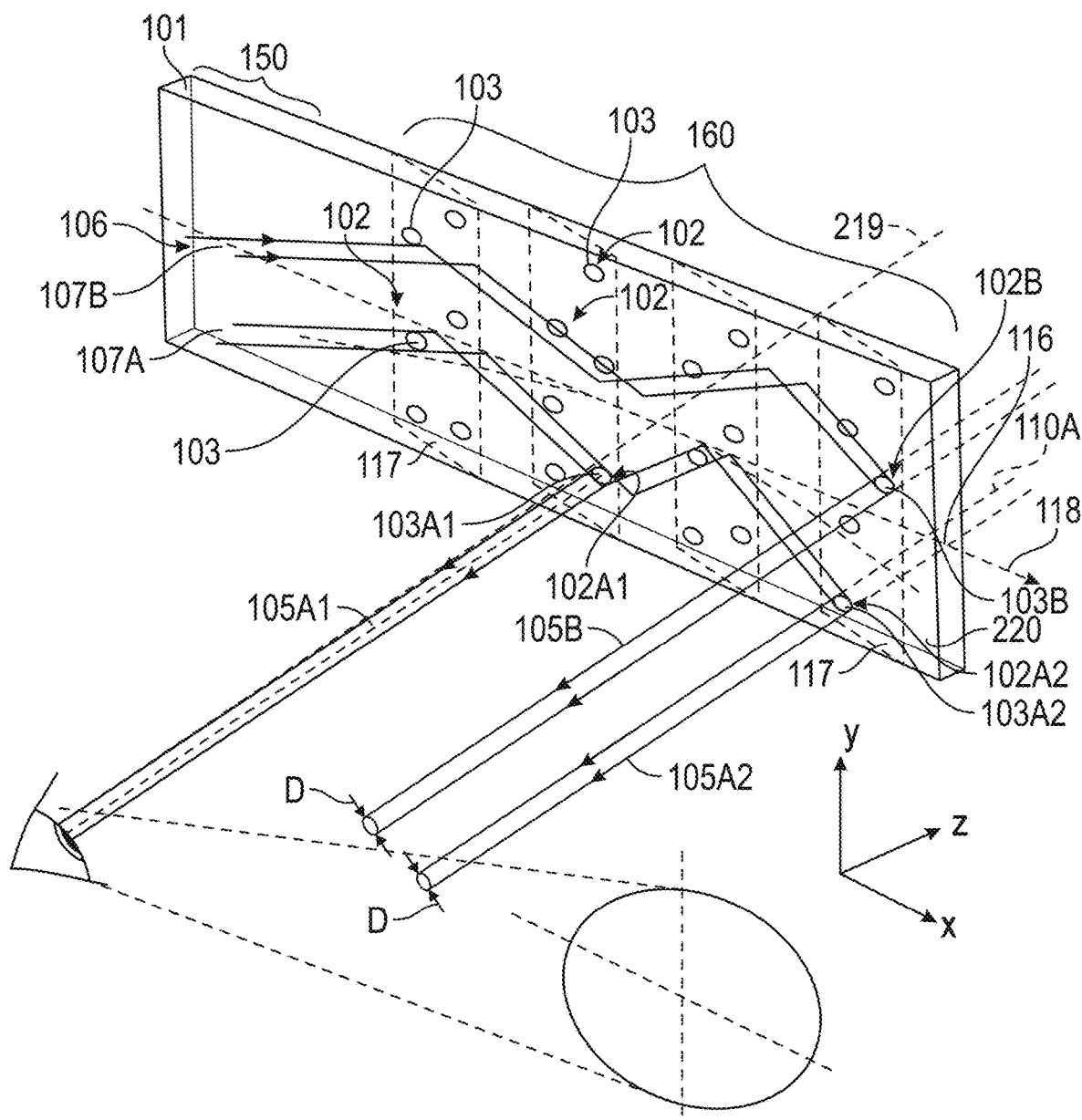
FIG. 9A illustrates an optical hyperfocal reflective system used in the display system of FIG. 8 according to an embodiment.

Referring to FIGS. 8 and 9A, a near-to-eye wave guide augmented display system according to one embodiment includes a display image generating system 120 and optical reflective hyperfocal system 100, one for each eye 201 in the binocular configuration. For ease of explanation, only one image generating system 120 and optical hyperfocal reflective system 100 for one left eye 201 is shown in FIGS. 8 and 9A but it will be understood that the display system includes a similar optical hyperfocal reflective system and image generation system configured for the right eye to form a binocular system. In some embodiments, the optical hyperfocal reflective system for the right eye is a mirror image of the optical hyperfocal reflective system for the left eye. In some other embodiments, the display system is monocular display system and includes only one of the optical hyperfocal reflective systems 100.

FIGS. 8 & 9A are conceptual diagrams showing an array of hyperfocal reflective view ports in which only a limited number of hyperfocal reflective view ports are shown in a simple distribution for ease of explanation only. Typically, the number of hyperfocal reflective view ports 102 is more than shown. However, in some other embodiments, when hyperfocus of substantially the full range of the field of view is not required, the number of hyperfocal reflective view ports is less than that shown. FIG. 8 shows an example of a discrete beam 105 impinging on the eye lens and reaching the retina forming a reduced circle of confusion of diameter 105Dc compared to the circle of confusion of diameter 201Dc that would be expected for a beam diameter that corresponds to the eyelens aperture. For ease of illustration, only one beam 105 is shown passing into the eye. However, in practice multiple beams 105 pass through the eye target region into the eye lens and onto the retina.

Image generating system 120 may include any type of suitable near eye image generating device and any optics that is configured to generate a display image 108 and output the display image collimated at infinity to the optical hyperfocal reflective system. By way of non-limiting examples, the image generating device may be an LED, LCD display, or laser based device or other light source device for generating the display image. The image generating device is implemented as a micro display but in other embodiments may be another type of display. The image generating system includes any optics required to collimate the display image to infinity such as a collimating lens.

Optical waveguide substrate 101 is made from waveguide materials such as but not limited to glass, plastic or other suitable materials. In some embodiments, the substrate material may be magnesium aluminate spinel, photonic crystals and/or other optical material. The optical waveguide substrate 101 itself is a slab or planar type waveguide substrate. Optical substrate 101 has a straight horizontal x axis extending along a length of the waveguide substrate in the exit pupil expanding direction indicated by the x axis arrow 118 shown in FIG. 9A. In some other embodiments, optical waveguide substrate 101 may be curved or other shapes and configurations and have bent or curved axis. As best shown in FIG. 9A, system 100 has an optical input coupling portion 150 and optical output coupling portion 160.

Various optical input coupling portions and coupling methods are possible. In the embodiment shown in FIG. 8, optical input coupling portion 150 is the side or end of the waveguide which is located away from the optical output coupling portion 150. Optical input 106, which comprises collimated display image rays 107, is directly injected into optical input coupling portion 150. In some other embodiments, optical input coupling portion 150 includes a reflective mirror incorporated in the waveguide to reflectively couple optical input rays 107 injected into the side of substrate into the guided space. In yet some other embodiments, optical input coupling portion includes one or more other optical coupling components integrated with or separate from the optical waveguide substrate for coupling optical input 106 into the waveguide. By way of example, such optical coupling components may be a prism, lens system and or diffraction optical elements. In yet other embodiments, input coupling portion is a diffractive coupling system which may include one or more diffraction optical elements integrated with or separate from the waveguide substrate.

Each reflector spot has an aperture size that is selected according to the method described in herein so that the hyperfocal view port projects a discrete spot beam with aperture D at the eye lens or other optical lens-detector system thereby providing hyperfocus of the discrete virtual image. In this manner, the eye receives and maintain hyperfocus of a unique portion of the display field of view from each viewport and maintains hyperfocus of the overall virtual image.

Progressive extraction of optical input rays 107 along optical wave guide substrate 101 in the exit pupil expanding direction is achieved in varies ways. For a waveguide, the hyperfocal reflector spots are parallel to each other. The waveguide is an "angular device" so by distributing the hyperfocal reflector spots along the waveguide it is possible to pick off a range of angles. Each hyperfocal reflector spot does in principle reflect across the full angular range, in some embodiments, the hyperfocal reflector spots are titled to reflect across at least the max and min angular extent (such as but not limited to e.g. 40 degrees) governed by the eye relief of the display system. In the embodiment of FIG. 9A, progressive extraction is achieved using a pattern of hyperfocal view ports that is a combination of ports having partially hyperfocal reflector spots and ports having fully reflective hyperfocal reflector spots. Each partially hyperfocal reflector spot acts as a beam splitter which reflects only part of the incident optical input ray 107 out towards the eye lens and transmits the other part along the waveguide in the exit pupil expanding direction to another hyperfocal reflector spot in the reflector sequence which is spaced further along waveguide substrate 101 away from optical input coupling 150. Fully reflective hyperfocal reflector spots substantially fully reflect the incident optical input ray 107 and do not allow any of the optical input ray to pass further along the waveguide in the exit pupil expanding direction.

By way of example in FIG. 9A, output coupling portion 160 includes partially reflective hyperfocal reflector spots 103A1 to 103A2 of hyperfocal view port reflector ports 102A1 to 102A2. The first partially reflective hyperfocal reflector spot 103A1 is configured to split a discrete portion 107A of optical input rays 107 incident on the first hyperfocal reflector spot 103A1 into a first discrete spot beam 105A1 that is reflected by the spot towards eye lens 205 and into a remaining part that transmits through spot 103A1 and further along waveguide substrate 101 in the exit pupil expanding direction 118 to the next hyperfocal reflector spot in the reflector sequence, that is, second hyperfocal reflector spot 103A2. Second hyperfocal reflector spot 103A2 is configured to partially split the remaining rays of discrete portion 107A incident on second hyperfocal reflector spot 103A2 into a second discrete spot beam 105A2 that is reflected by the spot towards eye lens 205 and into a remaining part that continues to propagate along the waveguide to any next hyperfocal reflector spot until the last partially reflective hyperfocal reflector spot in the reflector sequence is reached or until a fully reflective hyperfocal reflector spot is reached. Since discrete spot beams 105A1 and 105A2 are reflected by the spots 103A1 and 103A2, respectively, they form respective discrete spot beams with diameters D (D being calculated as described herein) at the eye target area so that when the virtual image spots are viewed by the human eye they are hyperfocused.

When fully reflective hyperfocal reflector spots are employed, progressive extraction of the display image is achieved by configuring the fully reflective hyperfocal reflector spots in a pattern and distribution along the optical wave guide in the exit pupil expanding direction 118 to allow some of the optical input rays to pass through the optical wave guide substrate material between the fully reflective hyperfocal reflector spots until they impinge on a fully reflective hyperfocal reflector spot further along the waveguide substrate.

By way of example, in FIG. 9A, a discrete portion 107B of optical input display image rays 107 propagates into output coupling portion 160 and initially passes through optical transparent material between hyperfocal view port reflector spots 103. The passing discrete portion 107B continues along the waveguide by total internal reflection uninterrupted by hyperfocal reflector spots 103 until discrete portion 107B reaches a fully reflective hyperfocal view port reflector spot 103B. Since hyperfocal reflector spot 103B is fully reflective, the reflector spot fully reflects all of the discrete ray portion 107B as a discrete spot beam 105B towards the eye lens and blocks any of the rays 107 of portion 107B from transmitting further down the waveguide.

In some other embodiments, all of the hyperfocal view ports have fully reflective hyperfocal reflector spots. By way of example, in some other embodiments, all reflective spots 103 in the reflective system shown in FIGS. 8 and 9A are fully reflective. When optical input rays 107 that form the display image travel along waveguide substrate 101, some of them hit first hyperfocal reflector spots that are disposed in a first volume section of the substrate closest to optical input coupling portion 150 and are re-directed towards the eye. However, the majority of the rays 107 miss the first hyperfocal reflector spots as they only occupy a small area of the first volume section. If for example the spots occupy 5% of the first volume section then overall reflectivity is about 5% too and 95% of the image energy passes through the first volume section to the next volume section further along the substrate and so on. The hyperfocal reflector spots reflect optical rays that have propagated straight through into the substrate but also the other rays that arrive via a wide "bounce" and hit the hyperfocal reflector spots at a glancing angle.

In some other embodiments, all of the hyperfocal reflector spots are partially reflective. For example, at least some of the hyperfocal reflector spots each have reflectivities between about 5-100%. In some embodiments, the reflectivities of at least some of the hyperfocal reflector spots are the same. In some embodiments, the reflectivities of at least some of the hyperfocal reflector spots are different.

Figure 10A:
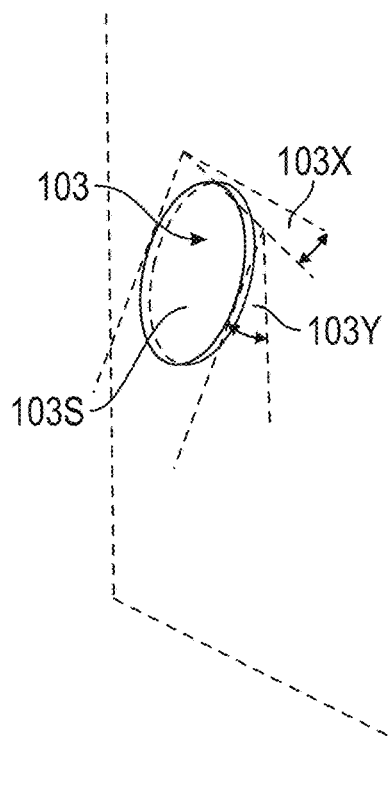
FIG. 10A is an enlarged view of part of the optical hyperfocal reflective system of FIG. 9A showing a hyperfocal reflector spot according to an embodiment.
Figure 10B:
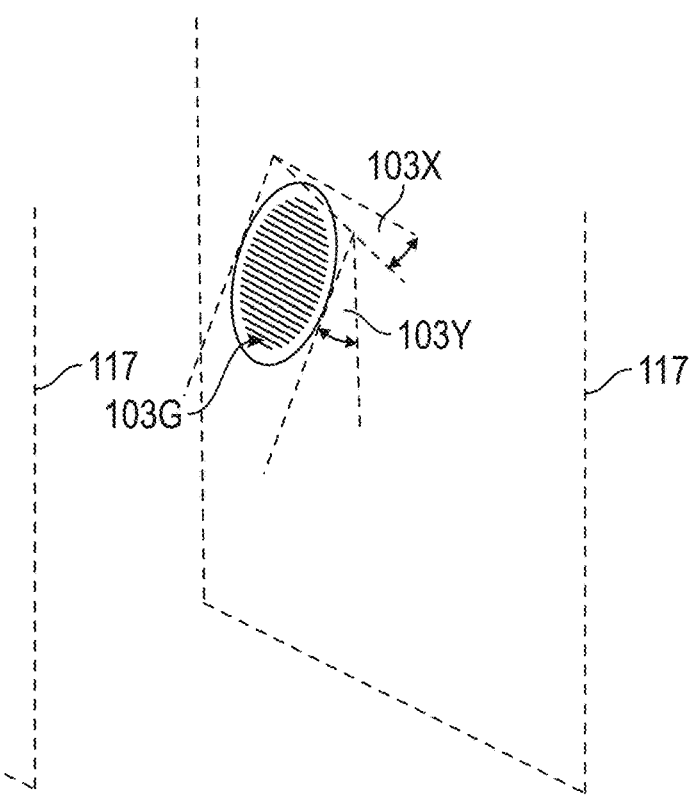
FIG. 10B is an enlarged view of part of an optical hyperfocal reflective system showing a hyperfocal reflector spot according to an embodiment.
Figure 10C:
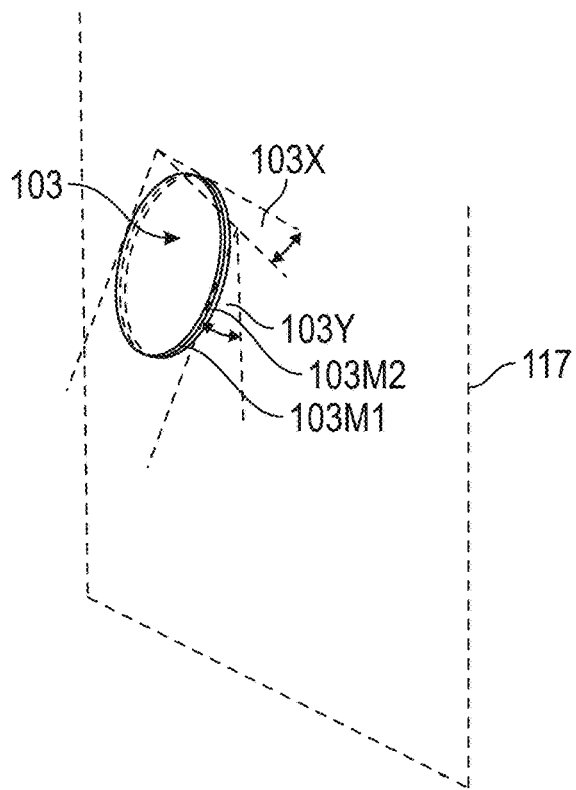
FIG. 10C is an enlarged view of part of an optical hyperfocal reflective system of FIG. 9B showing a hyperfocal reflector spot according to an embodiment.

In the embodiment of FIGS. 8 and 9A, hyperfocal reflector spots 103, are reflective coatings inclined relative to the direction of propagation of the guided optical rays which is in the exit pupil expansion direction 118. In some embodiments, hyperfocal reflective spots of any one of the embodiments herein may be reflective coating spots By way of example FIG. 10A, is an enlarged view of part of the output coupling portion of FIG. 9A showing a hyperfocal reflector spot 103 made from a reflective coating material and having a specular reflecting surface 103S. In some embodiments, optical hyperfocal reflector spots 103 are made of a reflective material such as but not limited to a single reflective metal layer or multiple layers of reflective oxides or other materials. A non-limiting example of a hyperfocal reflector spot made from a multilayer dielectric reflective coating according to one embodiment is shown in FIG. 10C.

The hyperfocal reflector spot material may deposited by known deposition techniques. In some embodiments, injection forming with over-molded reflective layers and optical 3D printing, may be used to form the optical substrate including the pattern region. In the embodiment shown in FIG. 9A, the hyperfocal reflector spot is substantially planar and circular or elongated circular in shape. As will be explained in more detail below with respect to some other embodiments, other particular spot shapes may be adopted in present technology that provide certain advantages with respect to the overall virtual image view quality.

In some other embodiments, the or each hyperfocal reflector spot 103 of any of the systems disclosed herein is a diffraction optical element. In some embodiments the diffraction optical element can be a holographic optical element. A non-limiting example of such an optical element is a diffraction grating as shown in FIG. 10B.

The distribution of hyperfocal reflector spot angular positions may be selected so that the hyperfocal view ports project their associated discrete spot beams in a particular distribution over the eye target region at the pupil entrance of the eye. In embodiments in which the hyperfocal reflector spots are included in optical waveguides, the hyperfocal reflector spots are inclined at the same or substantially same angles relative to the exit pupil expanding direction. The hyperfocal reflector spots may be inclined at the same angle as a common vertical inclined plane 117 or may be inclined off axis to the common plane as shown in non-limiting examples of hyperfocal reflector spots in FIG. 10. In some embodiments, the eye target region corresponds to a region over which the eye is capable of having a line of sight or visual axis to each of the hyperfocal reflective view ports within the substantially full field of view of the display take taking account eye movements within the eyebox.

In some embodiments, hyperfocal reflector spots 103 of the hyper focal reflective view ports are angled to project corresponding discrete spot beams with diameters D over the eye target region in a uniform or irregular pattern according to particular optical performance requirements.

In some other embodiments, hyperfocal reflector spots 103 are disposed at the rear or front faces of the optical substrate in addition to being disposed within the volume of optical substrate 101. Hyperfocal reflector spots 103 distributed within and/or on the surface of the transparent optical substrate material form a pattern region. In some embodiments, the distribution of hyperfocal reflector spots 103 is a regular pattern. In some other embodiments, distribution of hyperfocal reflector spots 103 is an irregular pattern. In some other embodiments, the distribution of reflective spots 103 is a combination of a regular pattern region and an irregular pattern. For ease of explanation and visualization, in the accompanying figures, hyperfocal reflector spots are shown enlarged and not to scale. Furthermore, not all hyperfocal reflector spots are shown. In practice, the number of hyperfocal reflector spots will depend on the display set up and the viewing lens-detector size. For a near eye display configuration, in one non-limiting example there are typically 100 to 200 hyperfocal reflector spots in the substrate for a 10 mn square pupil. For a Red, Green, Blue, system of the embodiments described herein, there may be in one non-limiting example typically 300 to 600 spots.

For ease of manufacture and design, in some embodiments, as for example shown in FIGS. 8 and 9A, hyperfocal reflector spots are distributed in a plurality of distinct planes or planar volume segments 117 spaced apart along a length of substrate 101. Each plane or segment 117 extends between top and bottom sides of substrate 105 and is inclined relative to propagation axis 116 as shown in FIG. 9A. Hyperfocal reflector spots in one or more of the planes 117 are distributed in a pattern that is not limited to that shown in the figures. The pattern in one or more planes can be regular pattern or an irregular pattern. Furthermore, the shape, size, tilt, and/or spacing of each hyperfocal reflector spot, or at least some reflective dots, can be the same or can be different from one another. Providing the reflective spots in a plurality of distinct planes or segments, allows the system to be more conveniently manufactured from a plurality of planar substrates of optical material having the hyperfocal reflector spots disposed thereon that are sandwiched together to embed the hyperfocal reflector spots in the optical substrate. However, in other embodiments, the hyperfocal reflector spots are not distributed in distinct planes or segments and are distributed throughout the volume.

In some embodiments, hyperfocal reflector spots 103 closer to optical input coupling portion 150 have a relatively low reflectivity (small area of dots) and subsequent ones further away from optical input coupling portion 105 have greater reflectivity (bigger area of dots) progressively increasing reflectivity the further along waveguide substrate 101. The spot area to optical transparent gap ratio may be varied to obtain chosen reflectivity at different positions along the waveguide. The thickness of the reflective spots or other elements will vary but is typically but not limited to 0.1-1 micrometers (um). In some embodiments, hyperfocal reflective spots formed from holographic film layers may be for example about 1 micrometer.

In the system of FIG. 9A, the spot shapes are regular shapes. In other embodiments, the spots may be regular and/or random shapes. Reflective spots have the same separation distances but in other embodiments may have different separation distances. The reflecting spot thickness may also vary for different reflective dots. Optical combiner performance and imaging can be controlled and improved by optimization of various reflector parameters including but not limited to the following: shape of the hyperfocal reflector spots (regular or random shapes), minimum dimension of a spot feature, maximum dimension of a spot feature, degree of randomization over surface, thickness of spot reflecting material, minimum separation between dots, maximum separation between spots and fraction of area occupied by dots. In some embodiments, at least some reflective spots or other elements have a fully or substantially reflective front side and fully or substantially absorbing rear side. Some reflective spots or elements include a buried relief reflector and a positive relief reflector.

Figure 12:
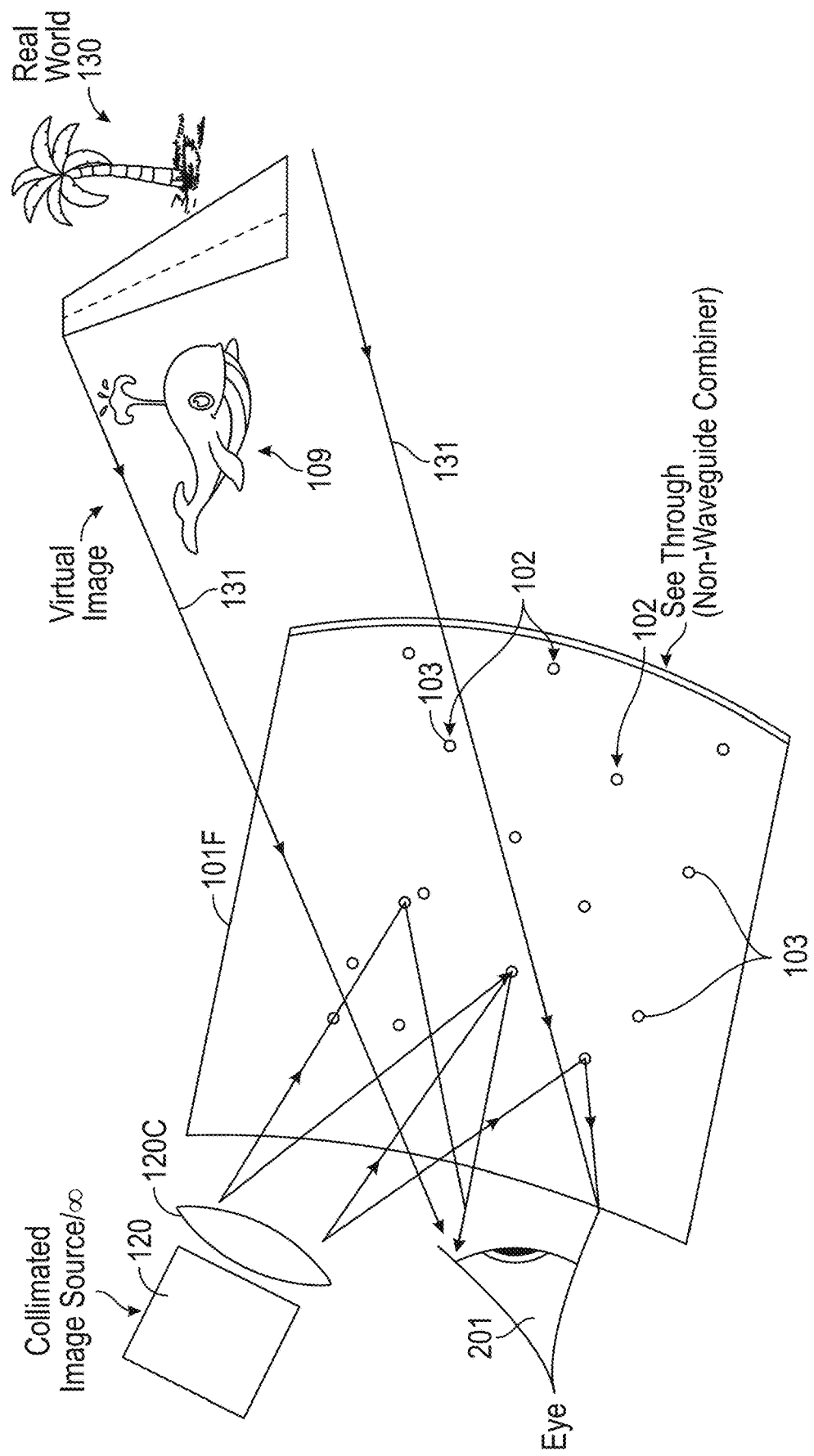
FIG. 12 is an optical hyperfocal reflective system according to an embodiment.

In some embodiments, the optical hyperfocal reflective system is implemented as a freespace optical combiner including hyperfocal view ports 102. By way of example, an optical hyperfocal reflective system implemented as a freespace optical combiner (non-waveguide combiner) according to one embodiment is shown in FIG. 12. Hyperfocal reflector spots 103 are reflective coatings disposed spaced apart in a pattern on the surface of a concave optical substrate 101F. In some other embodiments, optical substrate 101F may have other profiles or shapes. Optical substrate 101F is made from a partially or substantially transparent material so that optical rays of a real world image are visible by the eye. Optical substrate 101F is configured to allow optical input display image rays 107 incident on the regions of the substrate between hyperfocal reflector spots 103 to pass through optical substrate 101F and/or to be reflected away from the eye target area rather than being reflected to the eye target area or eye. In some embodiments, such as for virtual reality applications, optical substrate 101F is opaque and optical input display image rays 107 that are incident on the regions of the substrate between hyperfocal reflector spots are either absorbed and/or reflected away from the eye target area or eye.

Optical image generating device 120 directs optical ray input 106 (collimated optical rays 107) to a relay lens 120L which disperses or spreads rays 107 out over the surface of the concave substrate. Hyperfocal reflector spots 103 are orientated so that rays 107 are reflected as the discrete spot beams 105 to the eye target area or eye lens with an angular direction that is necessary to capture the full field of view of the display in the manner already explained hereinbefore with reference to embodiments of FIGS. 8 and 9. Since there is now more than one hyperfocal reflector spot, each hyperfocal reflector spot can be considered separately as providing an associated effective hyperfocal aperture 115 at the viewing lens and therefore providing a unique field of view. To this end the aperture size of each hyperfocal reflector spot 103 is selected to project a discrete display image spot beam that has a diameter D at the eye and is calculated as described herein with reference to the embodiments set forth above.

In the freespace combiner or other non-wave guide combiner, access to the field of view of the display system is maintained by using hyperfocal view ports that are accordingly distributed and/or tilted so that access to the field of view that would be otherwise lost is regained. In some embodiments, the angular position of each hyperfocal reflector spot is individually selected so that the full display image that is extracted by way of reflection from the pattern of hyperfocal reflector spots is directed on the eye target area or eye lens.

In some embodiments of the freespace combiner or other non-wave guide combiner, hyperfocal reflector spots 103 are progressively further tilted horizontally across the horizontal field of view of the display and/or progressively tilted vertically (upwardly or downwardly) across the vertical field of view of the display. Other distributions of tilt angles of the hyperfocal reflector spots envisaged. As shown by way of example in FIGS. 9A and 10A, hyperfocal reflector spot 103 is tilted in different planes relative to common plane 117 in the optical substrate. Hyperfocal reflector spot 103 is tilted in the x axis by a first angle 103X relative to common plane 117 and is tilted in the Y axis by a second angle 103Y relative to common plane 117. In other embodiments, at least some of the hyperfocal reflector spots can be tilted in x, y, z planes (or any combination thereof) differently or in the same way.

In some embodiments freespace combiner or other non-wave guide combiner, in order to capture substantially the full field of view of the display system hyperfocal reflector spots 103 are tilted progressively further horizontally (by a positive or negative angle 103X relative to the common plane 117 depending on the position of the substrate being to the left or right of the eye) according to the horizontal field of viewing range of the display. Furthermore, hyperfocal reflector spots are tilted progressively further vertically (upwardly or downwardly by a positive or negative angle 103Y relative to the common plane 117) according to the vertical field of view of the display so that the hyper focal reflective view ports substantially capture the full field of view of the display.

As already indicated hereinbefore, in some other embodiments, hyperfocal reflector spots 103 of the hyperfocal reflective view ports are diffraction optical elements each configured to a particular diffraction order so as that the diffraction optical elements either alone, or in combination with than optical substrate, effectively reflect the optical input ray portions as discrete spot beams 105. By way of background, diffraction is achieved when a light ray is incident on a structure that has a size and order of the wavelength of the light. Structures that are repetitive or periodic result in diffracted rays with directions that are determined by Bragg's law. A diffraction surface is capable of generating multiple beams, that is, orders and the relative intensities of the different diffracted beams depend on characteristics of the diffracting structure.

Diffraction optical elements are configured with a diffracting structure such that substantially all of the rays diffracted by the element are directed in one specific order, that is, so that they form discrete spot beam 105 in the required direction and profile so as to form the discrete virtual display hyperfocused views. For example, the optical profile of diffraction gratings can be configured by known methods such as blazing (altering of grating groove angle or shape without changing its period), and altering grating pitch, the size, shape, and concentration. One non-limiting example of a hyperfocal reflector spot 103 that is a diffraction optical element 103G is shown in FIG. 10B. In some embodiments in which the waveguide is curved, changing the grating pitch is appropriate.

Figure 11:
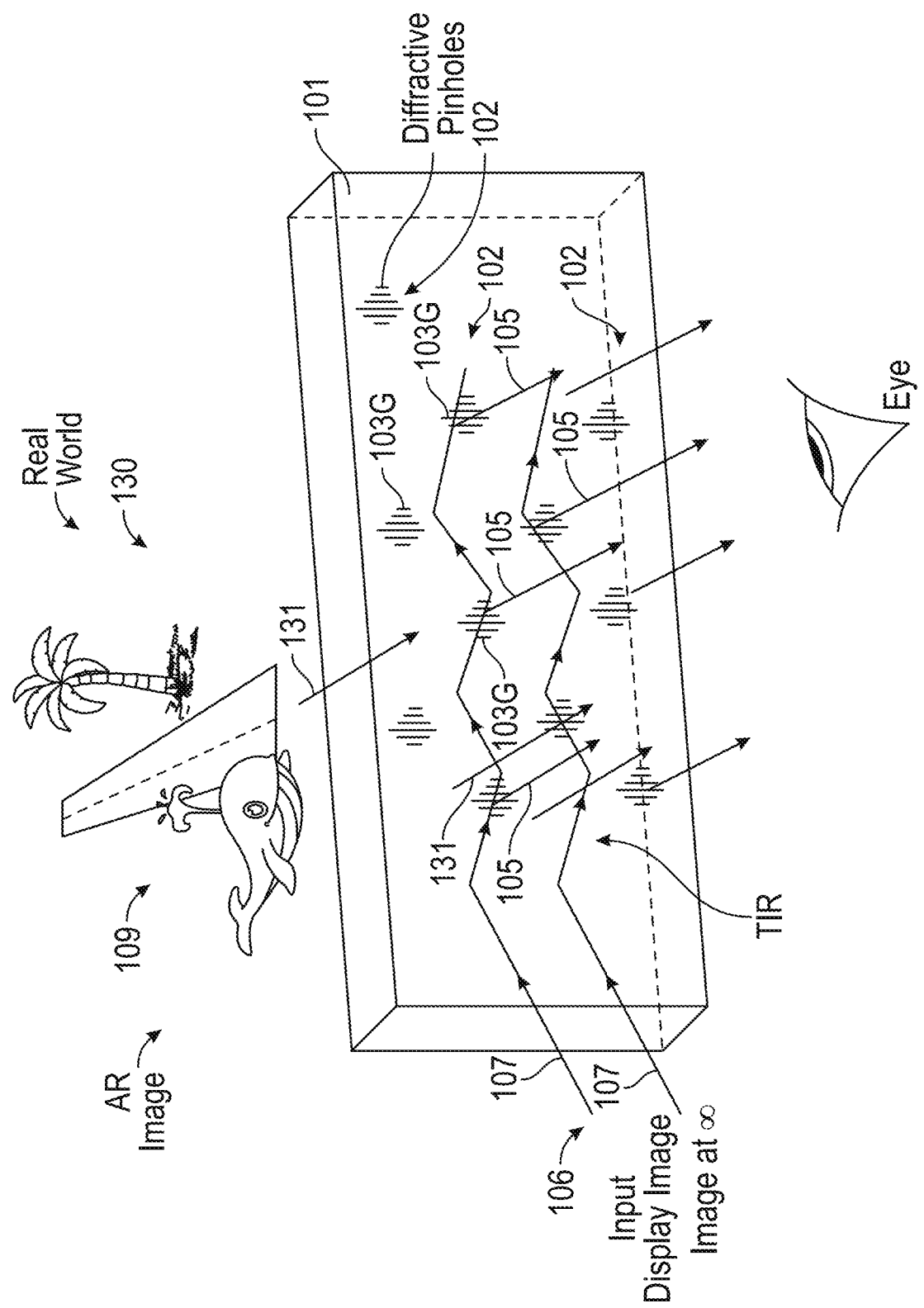
FIG. 11 is an optical hyperfocal reflective system according to an embodiment.

In some embodiments, the diffraction elements are not inclined but rather extend in a plane parallel to the propagation axis of the waveguide and are distributed spaced apart along one or more faces of the waveguide substrate and/or embedded in the waveguide substrate. By way of example, FIG. 11 illustrates an optical hyperfocal reflective system implemented as an exit pupil expander according to an embodiment. Hyperfocal reflector spots 103 of the hyperfocal view ports comprise diffraction optical elements 103G disposed on the face 111 of the substrate facing the eye. In some other embodiments, hyperfocal reflector spot diffraction optical elements 103G are disposed on the face of the substrate opposite face 111 and/or disposed in a parallel plane inside the substrate.

In the embodiment, of FIG. 11, diffraction optical elements 103G are diffractive pin holes. In some other embodiments, some or all of the diffraction optical elements 103G are other types of diffraction gratings or diffraction optical elements such as holographic diffraction gratings or other optical elements or any combination thereof. The aperture size of diffraction optical elements 103G is selected to project virtual aperture viewports onto the eye with a diameter D and is calculated as described herein with reference to the embodiments set forth above. In some embodiments, the optical profile of each of the diffraction elements is progressively tuned according to their position along the substrate in the exit pupil expanding direction so that rays diffract in specific orders to provide the desired angular directions of the reflected spot beams 105 relative to the eye lens or eye target area that are necessary to capture the full field of view of the display in the manner already explained hereinbefore.

In some aspects of the present technology, the hyperfocal reflective view ports 102 are wavelength dependent view ports thereby providing wavelength selective optical hyperfocal reflective systems. Hyperfocal reflector spots 103 of the view ports are configured as wavelength selective hyperfocal reflector spots so that each of the reflected discrete spot beams 105 are made up of reflected rays having only a specific wavelength or specific band of wavelengths. In some embodiments, some or all of the wavelength selective hyperfocal reflector spots are configured to reflect optical input rays 107 having the same specific wavelength or same band of wavelengths whilst transmitting through other wavelengths of light. In some other embodiments, one or more of the wavelength selective hyperfocal reflector spots is configured to reflect only optical input rays 107 with a specific wavelength or specific band of wavelengths that is different from the specific wavelength or wavelength band of optical input rays 107 that are reflected by one or more of the other hyperfocal reflector spots.

Wavelength selective hyperfocal reflector spots can be used in any of the different optical reflective hyperfocal systems described herein, where appropriate. Wavelength selective hyperfocal reflector spots can be formed in different ways. In some embodiments, the hyperfocal reflector spot is made from wavelength selective reflective coatings. Wavelength-tuned reflective coatings are multilayer dielectric layers or other types of thin film interference optical coatings etc. engineered to reflect a specified band of wavelengths of light rather than a broad band of wavelengths. A wavelength selective notch hyperfocal reflector spot 103 having multilayer dielectric layers 103M1 and 103M2 is shown by way of non-limiting example in FIG. 10C. Only two of the multilayer dielectric layers are shown in FIG. 10C but there may be many more layers than shown. Furthermore, as already indicated hereinbefore, the figures are not to scale. The thickness of the layers shown in FIG. 10C is enlarged for the purpose of illustration and would in practice in some embodiments be fractions of a wavelength in thickness. In some other embodiments, the wavelength selective reflective spots are diffraction optical elements described herein and such as shown by way of non-limiting example in FIG. 10B.

In some embodiments, the optical hyperfocal reflective system includes a plurality of different groups of wavelength selective hyperfocal viewports. Each group of wavelength selective hyperfocal viewports is configured to be selective to a different band of wavelengths. The wavelength selective hyperfocal reflector spots 103 of each group of hyperfocal view ports are configured to reflect a different wavelength or different band of wavelengths. One or more different groups of the wavelength dependent hyperfocal reflector spots may be distributed along the optical substrate of the optical hyperfocal system with the same pattern or different pattern. In this manner, discrete patterned wavelength band dependent hyperfocal reflector spots form reflective Hyperfocal view-ports for increasing the hyperfocal range for each angular distribution of rays for each wavelength band of projected light.

Figure 13:
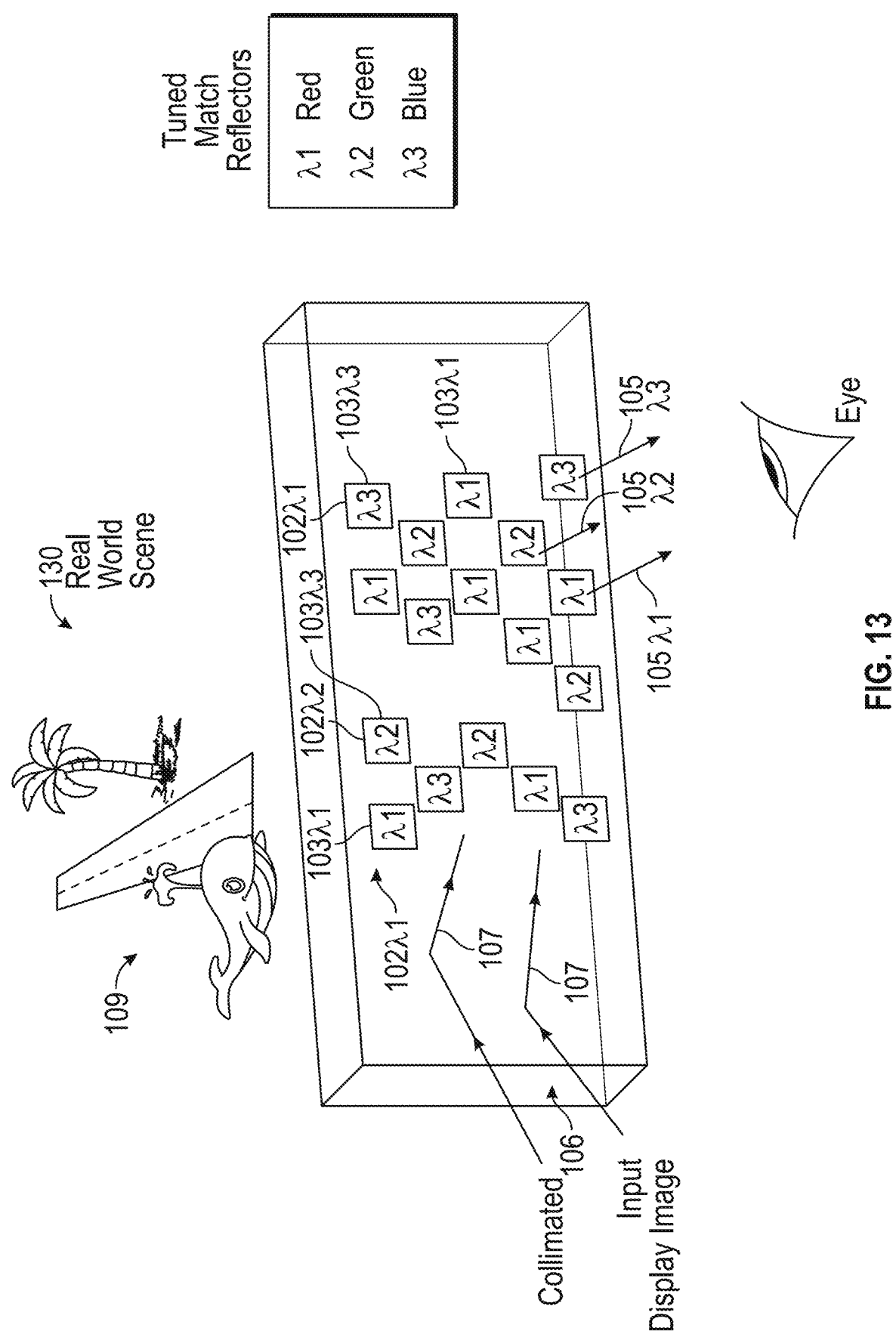
FIG. 13 is an optical hyperfocal reflective system according to an embodiment.

In some embodiments, the wavelength selective optical hyperfocal reflective systems are configured as waveguide based systems, FIG. 13 illustrates the optical hyperfocal reflective system including a plurality of different groups of wavelength selective hyperfocal viewports according to one embodiment. First hyperfocal reflector spots 103λ1 of a first group of hyperfocal view ports 102λ1 are configured to selectively reflect rays 107 within a first band of wavelengths as discrete spot beams 105λ1 towards the eye lens or eye target area. First hyperfocal reflector spots 103λ1 are distributed in a first pattern along the waveguide substrate. Second hyperfocal reflector spots 103λ2 of a second group of hyperfocal view ports 102λ2 are configured to selectively reflect rays 107 within a second band of wavelengths as discrete spot beams 105λ2 towards the eye lens or eye target area. Second hyperfocal reflector spots 103λ2 are distributed in a second pattern along the waveguide substrate. Third hyperfocal reflector spots 103λ3 of a third group of hyperfocal view ports 102λ3 are configured to selectively reflect rays 107 within a third band of wavelengths as discrete spot beams 105λ3 towards the eye lens or eye target area. Third hyperfocal reflector spots 103λ3 are distributed in a third pattern along the waveguide substrate. Hyperfocal reflector spots 103λ1-103λ3 are configured so that the discrete reflected spot beams 105λ1-105λ3 have an angular direction relative to eye lens 205 or eye target area that is necessary to capture the full field of view of the display in the manner already explained hereinbefore with reference to FIGS. 7 to 9B. The aperture size of the hyperfocal reflector spots is selected to project discrete spot beams onto the eye with a diameter D so as to achieve the hyperfocal focus of the virtual image in the manner explained hereinbefore.

In the embodiment shown in FIG. 13, the first band of wavelengths λ1 is a first narrow band of wavelengths corresponding to red light, the second band of wavelengths λ 2 is a second narrow band of wavelengths corresponding to green light, and the third band of wavelengths λ 3 is a third narrow band of wavelengths corresponding to blue light. Optical image generator 102 is an RGB light source such as but not limited to an RGB LED. In some other embodiments, there may be more or less different groups of wavelength selective hyperfocal reflector spots than shown in FIG. 13. In some other embodiments, the patterns, size, and shape, of the wavelength selective spots of each group may be different to the patterns shown in FIG. 13. In other embodiments, each band of wavelengths may be different to those indicated in FIG. 13.

In some embodiments, wavelength selective hyperfocal view ports 102 λ1 to 102λ3, or other ports shown in system embodiments, may be configured to be both wavelength and angularly selective hyperfocal reflective view ports. In some embodiments, one or more of the hyperfocal reflector spots of such ports is configured to at least partially reflect optical input rays 107 having angles of incidence with respect to the hyperfocal reflector spot which are in a specific band of angles selected for the particular reflector and to pass or transmit, without reflection or with reduced reflection optical input light rays outside of the specific band of angles. In some embodiments, one more of the hyperfocal reflector spots is configured to reflect optical input rays 107 having angles of incidence with respect to the hyperfocal reflector spot in a first band of angles and one or more of the other hyperfocal reflector spots is configured to reflect optical input rays 107 having angles of incidence with respect the hyperfocal reflector spot in a second band of angles different from the first band of angles.

The manner in which the wavelength selective and angularly selective hyperfocal reflector spot is configured to achieve a particular angular selectivity will depend on the type of hyperfocal reflector spot used. For wavelength selective hyperfocal reflector spots that are diffraction optical elements, such as but not limited to for example those shown in FIG. 10B, the angular selectivity is determined by the type of diffraction grating used, whether the diffraction grating is being used in a transmissive or reflective mode, and the diffraction structure as is known in the art. For wave length selective hyperfocal reflector spots that are formed from multilayer dielectric coatings or other optical layers, the angular selectivity is determined by the multilayer design. By way of example, in one embodiment, the wavelength and angularly selective hyperfocal reflector spot is a hyperfocal reflector spot 103 made from wavelength- and angularly-tuned reflective coatings including but not limited to 103M1 and 103M2 as shown in FIG. 10C.

In some embodiments, one or more of each of the hyperfocal reflector spots 103 of any of the embodiments is an angular selective notch filter hyperfocal reflector spot configured to at least partially reflect optical input rays 107 having angles of incidence with respect to the hyperfocal reflector spot which are in a specific transflectance band of angles selected for the particular hyperfocal reflector spot and to pass or transmit, without reflection or with reduced reflection optical input light rays that have angles of incidence above and below the selected specific transflectance band. The specific transflectance band of angles selected for the particular hyperfocal reflector spots may be the same for each hyperfocal reflector spot or may be different for one or more hyperfocal reflector spots. In some embodiments, the specific transflectance band of angles selected for hyperfocal reflector spots of one or more of the groups of hyperfocal reflective view ports may be different.

In some embodiments, the specific transflectance band of each angular selective notch filter optical hyperfocal reflector spot can be selected according to the reflector order of the reflector within the sequence of the reflectors in the optical waveguide substrate. This allows for improved performance particular in the optical hyperfocal reflective systems of the embodiments in which the systems are implemented as exit hyperfocal expanders. Instead of using reflective coatings with a flat angular response, a range of angularly selective hyperfocal reflector spots are contained within the optical waveguide substrate and optimized according to their reflector order within the sequence of reflectors. This configuration of reflectors ensures that the required angular information is passed through to the correct reflector within the sequence. The angular response in addition ensures that no secondary image, or a reduced secondary image, is formed and carried to successive reflectors, which would otherwise result in undesired artefacts.

Figure 9B:
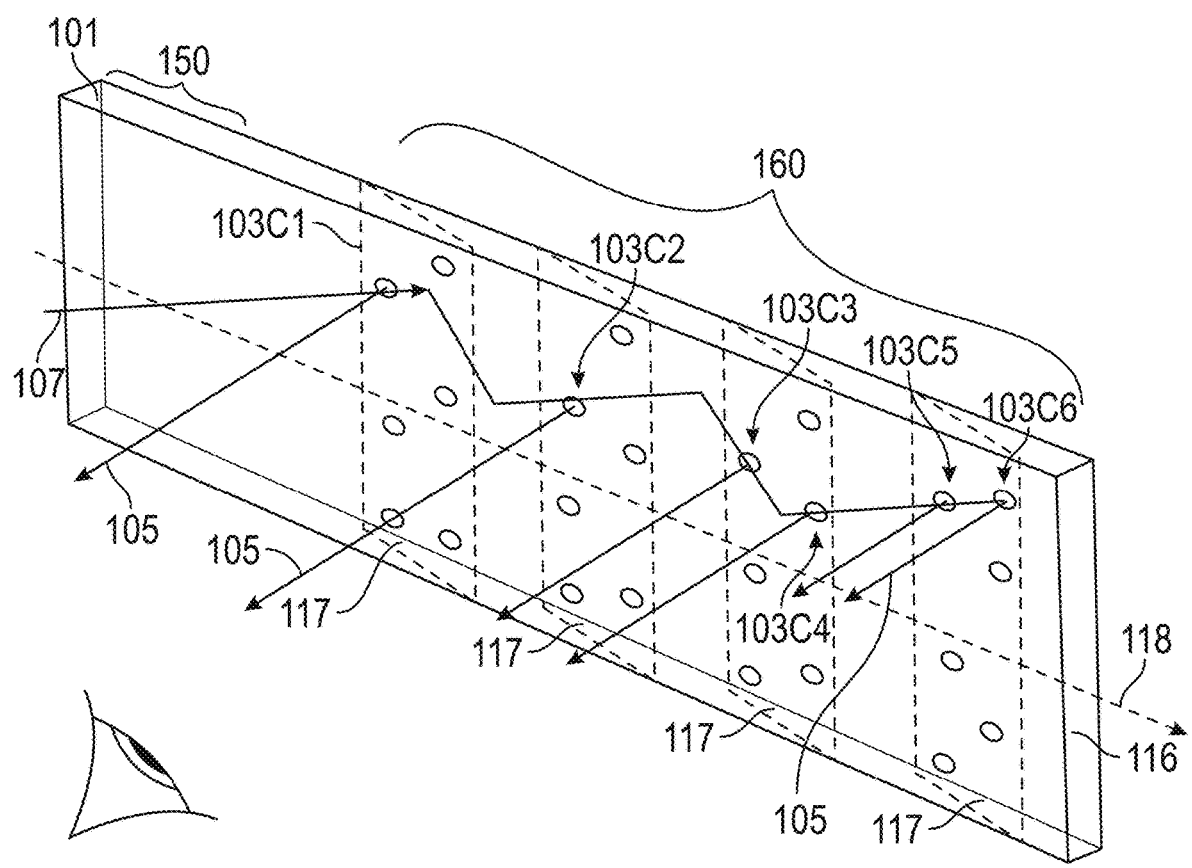
FIG. 9B illustrates an optical hyperfocal reflective system for use in the display system of FIG. 8 according to an embodiment.
Figure 14:
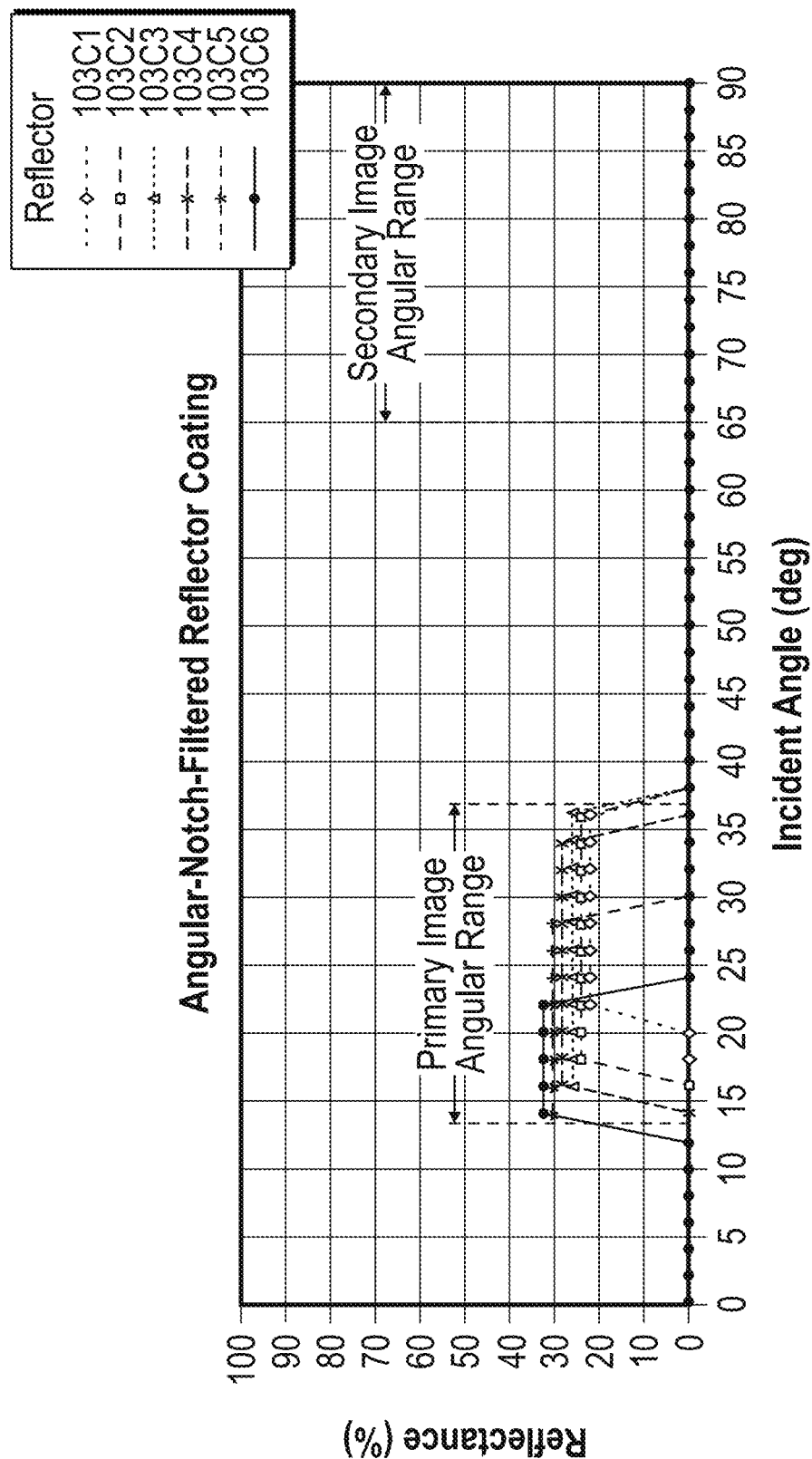
FIG. 14 is a graph illustrating reflectance dependence on light ray incident angle for each one of a sequence of angular selective notch filter optical hyperfocal reflector spots in the optical hyperfocal reflective system of FIG. 9B according to one embodiment.
Figure 15:
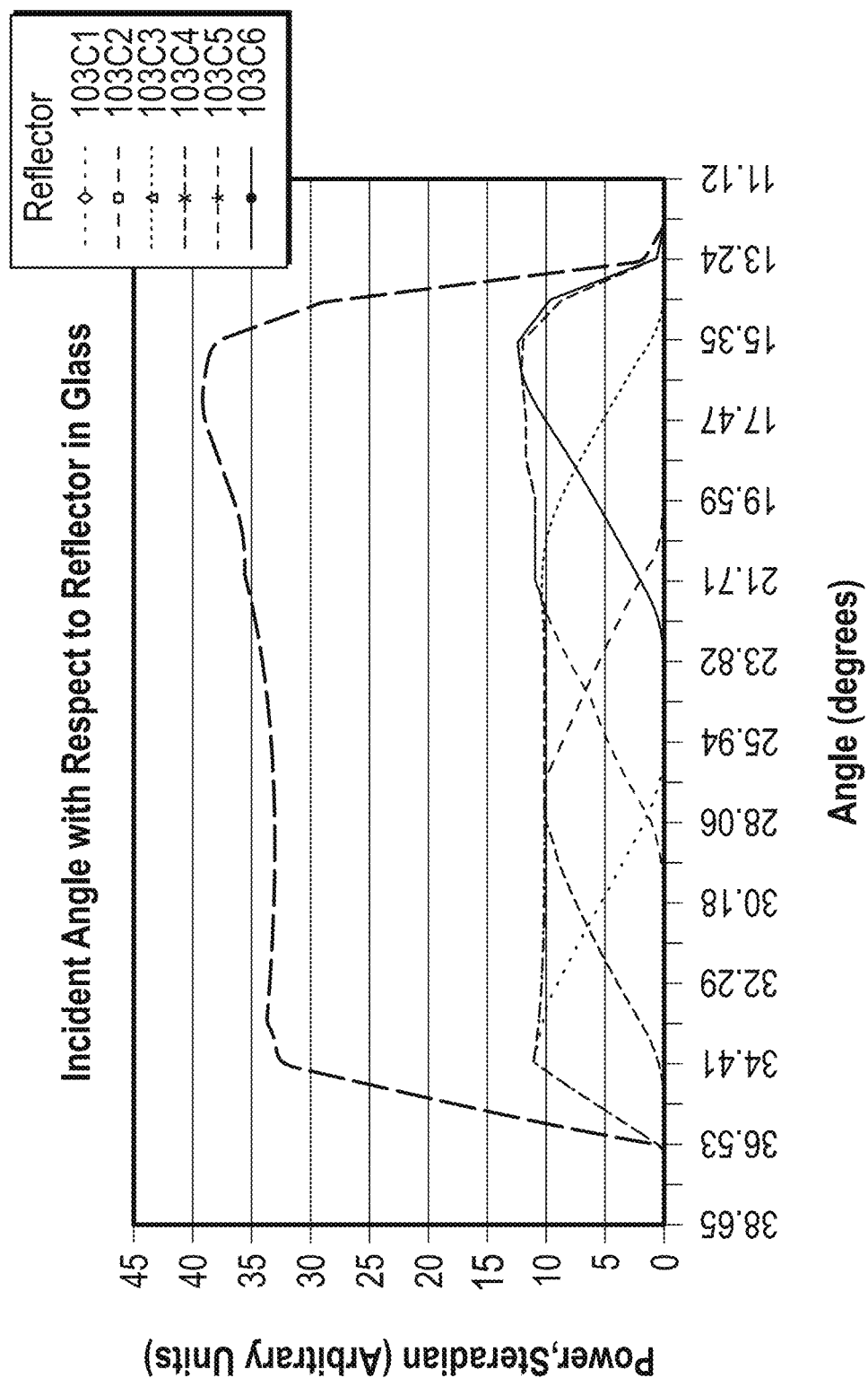
FIG. 15 is a graph illustrating the net angular response of the sequence of optical hyperfocal reflector spots referred to in FIG. 15 as seen at the eye according to an embodiment.

By way of example, FIG. 9B is an optical hyperfocal reflective system according to another embodiment which is similar to the system of FIG. 9A but in which hyperfocal reflector spots of the hyperfocal view ports are angularly selective hyperfocal reflector spots. Angular selective notch filter optical hyperfocal reflector spots 103C1 to 103C6 are partially reflective and distributed along the wave guide in the exit pupil expanding direction in a reflector sequence according to one non-limiting example. FIG. 14 is an exemplary graph illustrating reflectance dependence on display input light ray 107 incident angle for each one the angular selective notch filter optical hyperfocal reflector spots 103C1 to 103C6 in the optical hyperfocal reflective system of FIG. 9B according to one embodiment. As can be seen from FIG. 14, the angular dependence of each hyperfocal reflector spot 103C1 to 103C6 in the sequence is tuned to a different notch band of angles of incidence of the optical rays 107. In the example of FIG. 14, the position of the angles notch band of the hyperfocal reflector spots 103C1 to 103C6 is progressively shifted to higher angles of incidence according to the reflector sequence. FIG. 15 is a graph illustrating the net angular response of the optical reflective spots 103C1 to 103C6 as seen at the eye according to one embodiment.

In some embodiments, the hyperfocal reflective spots are each configured as both a wavelength selective hyperfocal reflector spot and an angularly selective hyperfocal reflector spot based on the aforementioned embodiments. By way of example, in some embodiments, wavelength and angularly-tuned reflective coatings for each discrete patterned hyperfocal reflector spot can be configured to form Hyperfocal view-ports for increasing the hyperfocal range for each angular distribution of rays 107 for each wavelength band of projected light, such as Red, Green, and Blue.

In each of the optical hyperfocal reflective systems described herein, the quality of the virtual image 109 viewed by the eye depends on various parameters such as the distribution of the hyperfocal reflective view ports and the shape of the hyperfocal reflector spots. In relation to optimal positioning of the hyperfocal view ports, there is a balance of hyperfocal view port distribution and undersampling or oversampling. The amount of sampling that one needs from a plurality of hyperfocal reflector spots requires a lower limit on spacing between the hyperfocal reflector spots, and that is set by the smallest typical pupil size. Conditions of under-sampling and over-sampling occurs when less or more than one hyperfocal view port contributes to the redirected image spot formed at the eye respectively. Hyperfocal reflector spot shape is also another parameter for improving field overlap.

In some other embodiments, the hyperfocal reflector spots are randomized shapes but still distributed geometrically to address increased pupil size (=increased oversampling). Distributing geometrically provides nominal coverage of Field of view. Randomized shapes ensure that on the average the system is not viewing equally parts of the field simultaneously from more than one hyperfocal reflector spot, which would reduce the HVP effect.

Figure 16:
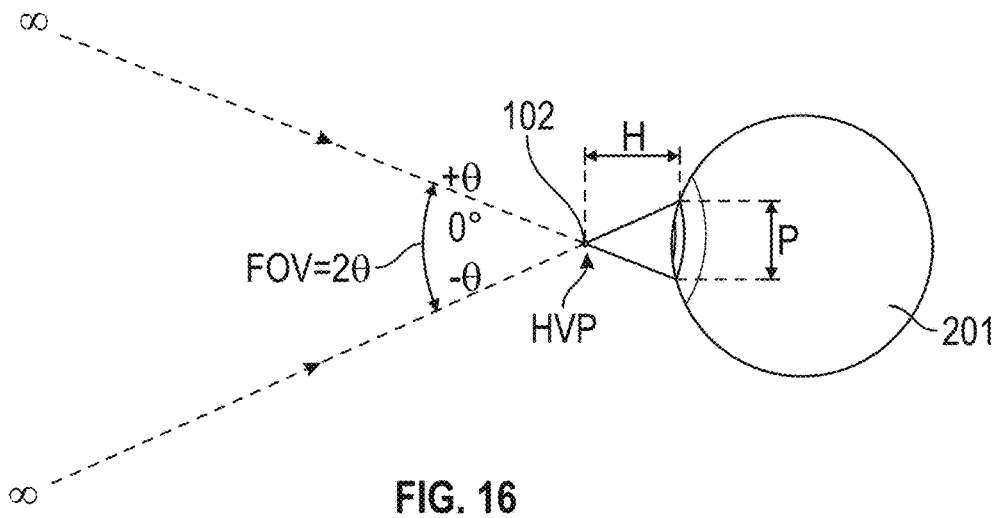
FIG. 16 illustrates a single hyperfocal reflective view port take in isolation according to an embodiment.
Figure 17:
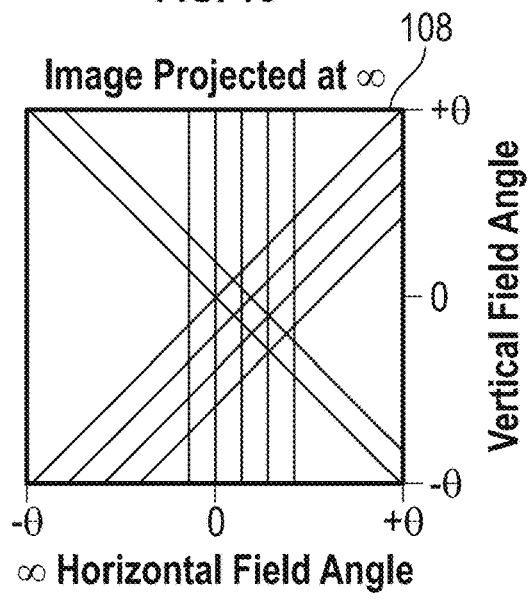
FIG. 17 shows the image projected at infinity in FIG. 16 as seen by the eye without the view port.
Figure 18:
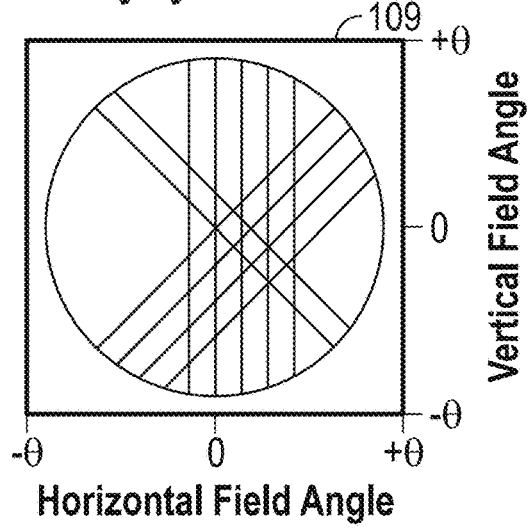
FIG. 18 shows the virtual image formed by the hyperfocal reflective view port as seen by the eye in FIG. 16.

In order to more adequately understand how to optimally position and distribute the hyperfocal view ports (HVP) 102 in the optical reflective relay systems described herein reference will now be made to the accompanying FIGS. 16 to 33. FIG. 16 illustrates a single hyperfocal reflective view port 102 placed at a position H, where the eye 201 is focused on an image projected at infinity. The eye pupil diameter P is typically between about 2 to 8 mm for humans depending on lighting conditions but may be above or below these values. The same image projected at infinity (directed to the eye without any HVP) as seen by the eye is shown in FIG. 17. In the simplest case of the single hyperfocal view port at an arbitrary focal distance H, a single image covering the full FOV (Field-of View) of the image, as shown in FIG. 18, which is the image projected at infinity as shown in FIG. 17 as seen by the eye when focused at H. The singe image shown in FIG. 18 corresponds to formed virtual image 109.

Figure 19:
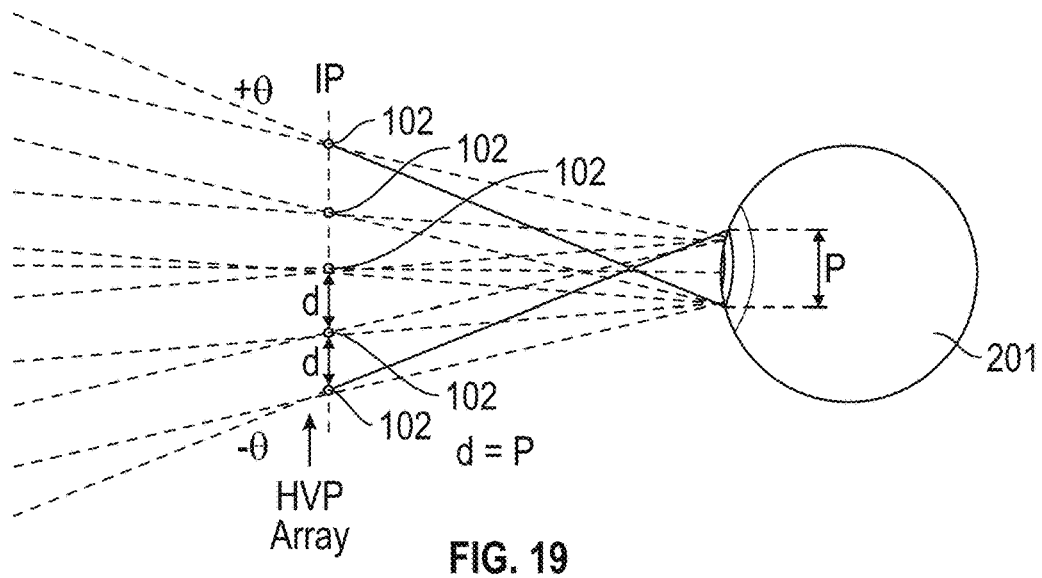
FIG. 19 illustrates a plurality of hyperfocal view port elements distributed according to an embodiment.
Figure 20:
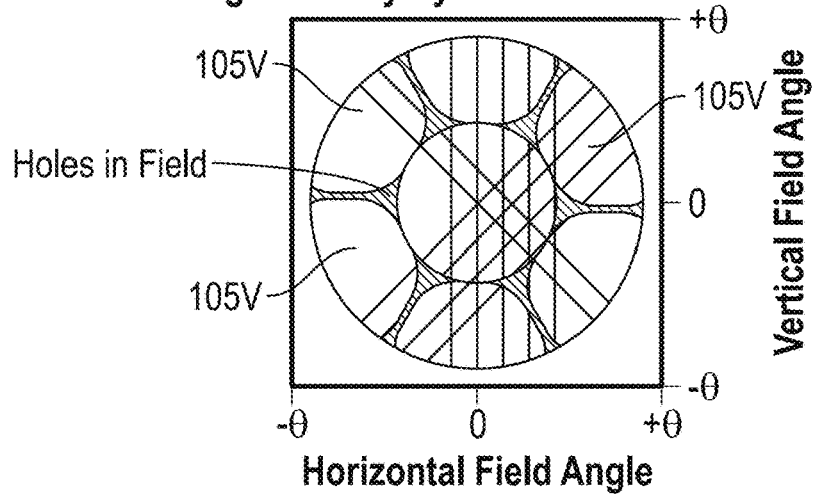
FIG. 20 illustrates the hyperfocused virtual image spot views as seen by the eye and formed by the hyperfocal view port elements of FIG. 19 according to an embodiment.

FIG. 19 illustrates multiple hyperfocal view port elements 102 distributed at a spacing equal to the pupil diameter P, re-directing the projected image 108 of FIG. 17 from the image plane. The image plane in FIG. 19 corresponds to the plane extending horizontally and vertically along the substrate of any one of the optical hyperfocal reflective system of the embodiments described herein (waveguide or free space comber or non-combiner) and over which the ports are distributed. The distance of the HVP is no longer at position H but further from the eye than focal distance H, geometrically a number of HVP elements 102 are required to from a HVP array that span the FOV of the image plane as shown in FIG. 19. If the spacing of the HVP elements is d for a pupil diameter P, then the image experiences under-sampling if d=P. This means that there is only ever one whole HVP element (made of two halves of successive HVP elements) for a given angle of incidence and results in slight holes in the field as shown by the shaded regions of formed image seen by the eye when focused at H as shown in FIG. 20.

Figure 21:
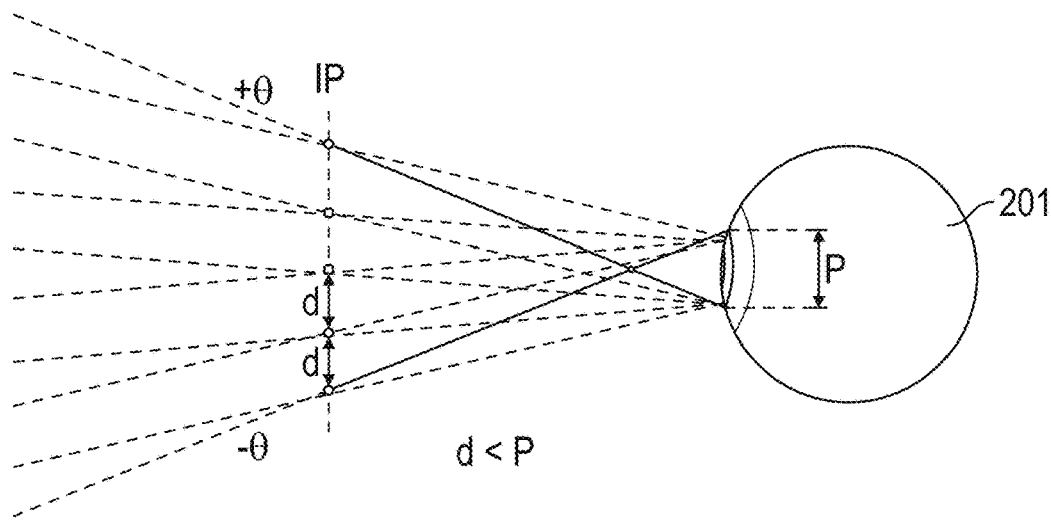
FIG. 21 illustrates multiple hyperfocal view port elements distributed according to an embodiment.
Figure 22:
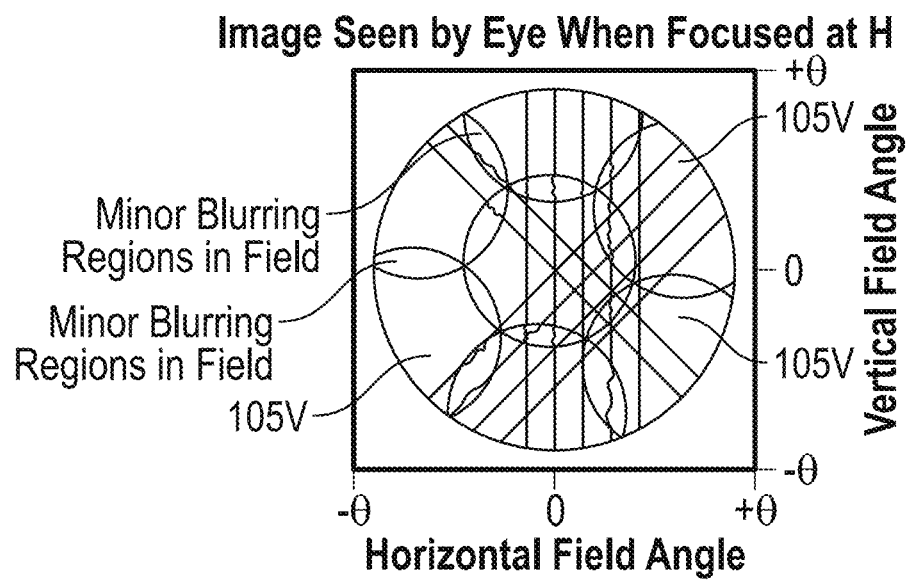
FIG. 22 illustrates the hyperfocused virtual image spot views formed by the hyperfocal reflective view port elements of FIG. 21 according to one embodiment.

In some embodiments of the optical hyperfocal reflective system, the holes in the image field are mitigated through by adopting spacing between HVP reflector spots of d<P, i.e. more than one whole HVP element per pupil diameter so as to provide over-sampling of the pupil with HVP reflectors. FIG. 21 illustrates multiple HVP elements distributed at a spacing d which is less than pupil diameter P, redirecting projected image of FIG. 17 from the image plane. As indicated in each of FIGS. 22 and 23, the image seen by the eye is provided with acceptable image quality as per the aforementioned definition of an acceptable sharp image. However, over sampling can introduce minor blur as indicated in FIG. 22, increasing with the number of HVP elements per pupil, but the impact of the blur is a matter of trial and error depending on reflector size and pupil size as will be explained in more detail below. Reinforced (brighter) regions in the field also exist as indicated in FIG. 23.

Figure 23:
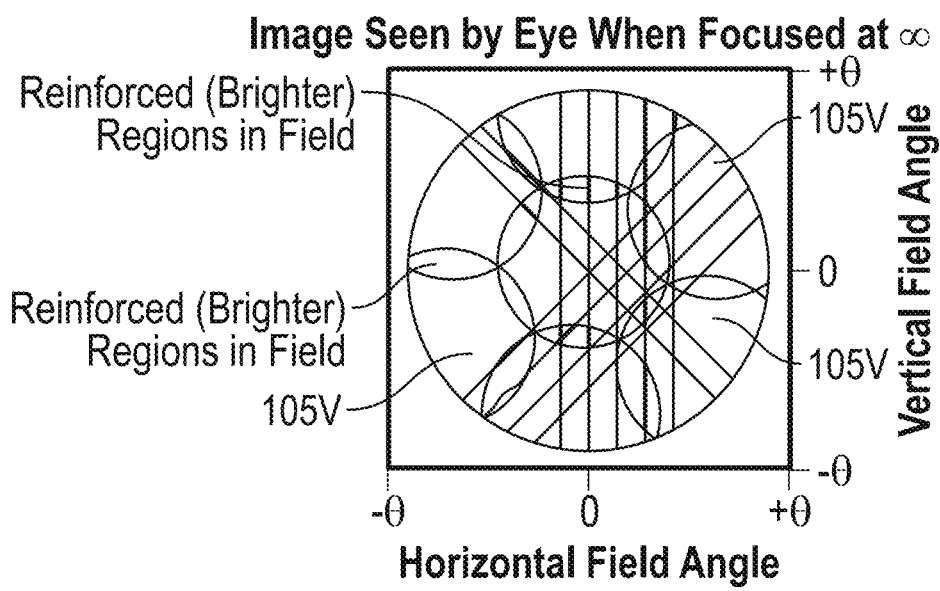
FIG. 23 illustrates the hyperfocused virtual image spot views formed by the hyperfocal reflective view port elements of FIG. 21 according to an embodiment.
Figure 24:
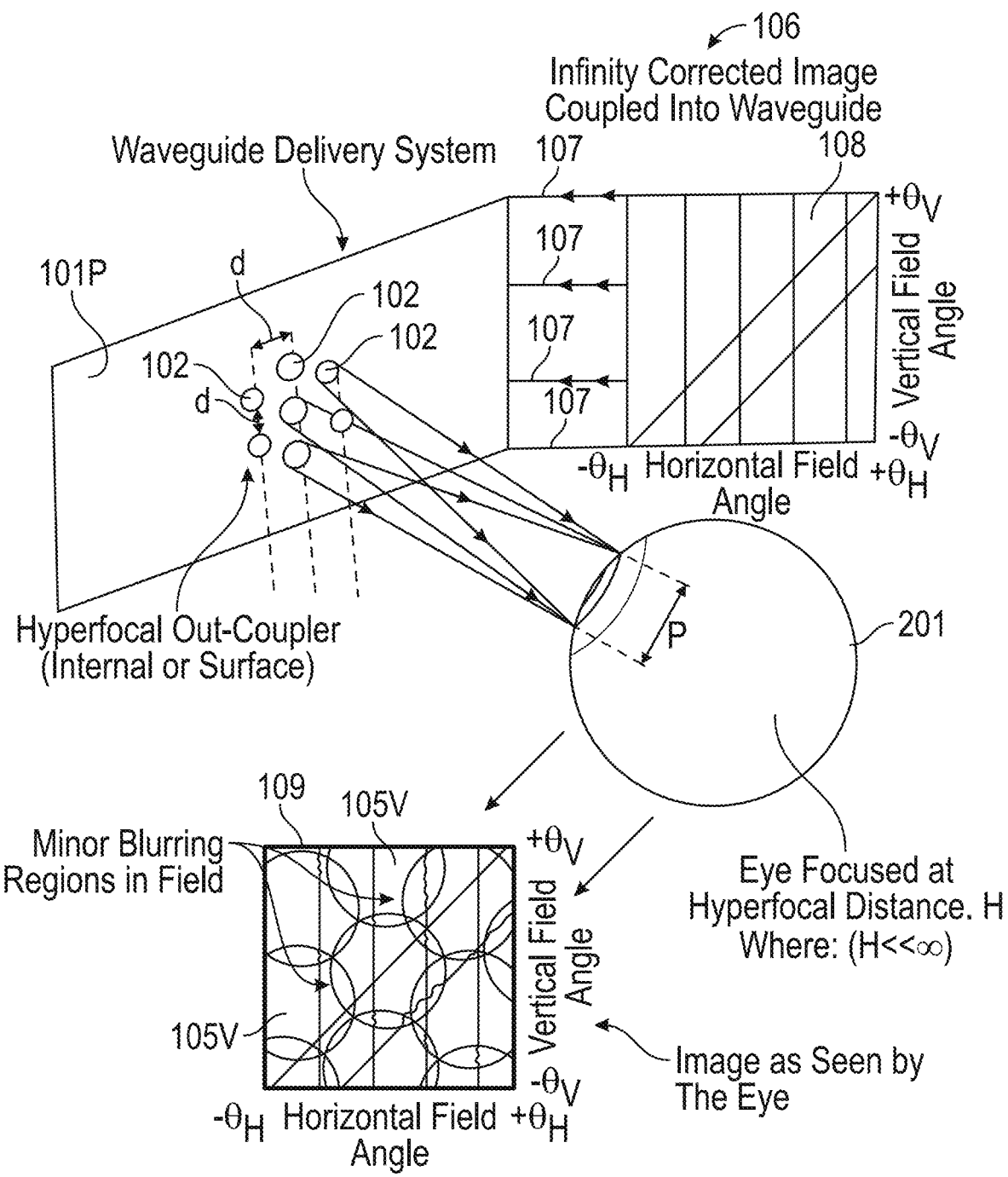
FIG. 24 illustrates an optical hyperfocal reflective system according to an embodiment.

FIG. 24 is a perspective schematic view the optical hyperfocal reflective system of FIG. 23 adopting the optical in which the spacing between HVP reflector spots is d<P and shows operation of the system when the eye is focused at a distance H<<∞ (infinity) and the image coupled into the waveguide is at infinity. For ease of illustration and explanation, viewports are shown as a non-limiting example in 1D distributed in the same vertical plane 101P of the hyperfocal output coupling portion of the optical waveguide and there are six HVP reflector spots. However, as indicated hereinbefore, in other embodiments, the view ports can be 2D and there may be many more HVPs which may be distributed in the same or in different vertical planes of the waveguide. The HVP reflector spots will have the same shape as the viewports but in the case of inclined 2D configurations will have a size adjusted to provide the 1D viewport size as explained already hereinbefore. The number of HVP reflector spots required will also depend on the amount of expansion of the exit pupil of the image generating device that the optical hyperfocal reflective system is required to perform to meet the specification of the particular augmented or virtual reality system.

As indicated in FIG. 24, which includes the virtual image 109 seen by the eye showing blur of overlapping circular field regions when the Hyperfocal View Ports 102 are spaced in a way that is optimum for the eye pupil size, there are regions of overlap in which hyperfocus can become degraded [slight blurring] due to over-sampling. This is because the circular viewports produce a circular field of view. To ensure there are no dark patches in the virtual image seen by the eye (and hence loss of information) there must be a minimum overlap in the field of view delivered by adjacent hyperfocal view ports 102.

According to some approaches, the HVPs, and so the corresponding HVP reflector spots, are arranged in the optical hyperfocal reflective system of one or more embodiments disclosed herein so that there is less interference between hyperfocus virtual image spots formed at the eye and degradation of the overall virtual image seen by the eye is mitigated. According to some embodiments, degradation of the overall virtual image formed by the hyperfocused virtual image spot views is mitigated by controlling the shape of the hyperfocal reflector spot so that the delivered fields of views from respective viewports tessellate.

Figure 25:
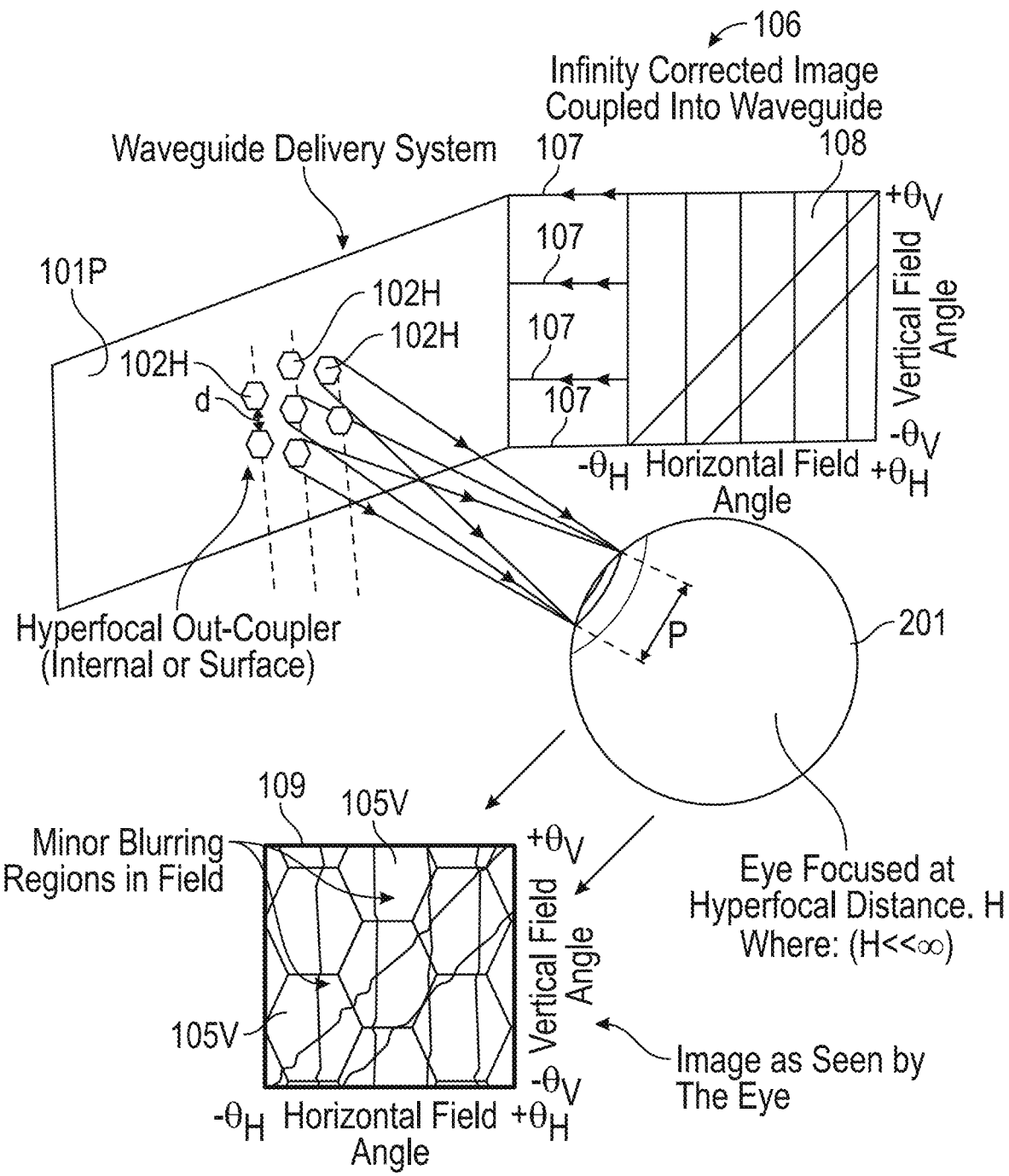
FIG. 25 illustrates an optical hyperfocal reflective system according to an embodiment.

According to some embodiments, the HVP elements are hexagonal viewports 102H. As can be seen in FIG. 25, which is a schematic of the system show in FIG. 24 but with the HVP elements shaped as hexagonal viewports 102H, rather than circular view ports, and arranged in the waveguide plane to form a tessellation of the hyperfocused virtual image spot views, hexagonal viewports reduces blur of overlapping hexagonal field regions of the virtual image 109 when the eye is focused at a distance H<<∞ (infinity), and the image coupled into the waveguide is at infinity. As can be seen from a comparison of what the eye sees in FIG. 24 when the system uses circular viewports and FIG. 25 when the system uses hexagonal viewports, and therefore corresponding shaped hyperfocal reflector spots, to form a tessellating pattern of hyperfocused virtual image spot views, blur due to overlapping field of views is reduced for the system of FIG. 25 and viewport separation is optimized for eye pupil size. By way of non-limiting example, in some approaches of the optical hyperfocal reflective systems of any of the embodiments disclosed herein, the working distance between the hyperfocal reflective spot and the eye target area for a human eye is typically between about 10 mm and 75 mm and the inter-reflector spot distance is less than 1 mm. In other non-limiting examples, the inter-reflector spot distance is greater than about 500 um. In yet some other examples, inter-reflector spot distance is between about 500 um and 8 mm. As indicated herein, for such a working distance, typical hyperfocal reflector spot aperture sizes are between about 100 to 1000 microns but not limited this size. Note that other working distances, hyperfocal reflector spot aperture sizes and inter-reflector spot distances are envisaged and will vary according to the type of display system being used and the type of optical lens detector system intended to view the hyperfocused spot image.

In some other embodiments, any shaped HVP reflective spots may be adopted that form hyperfocused virtual image spots in a tessellating pattern at the eye or eye target area so as to assist in mitigating degradation of the virtual image. In some embodiments, the HVP ports, and therefore the corresponding hyperfocal reflector spots, that are arranged to provide tessellating hyperfocused view spots, may have regular shapes and/or randomized shapes. In some embodiments, the HVP reflector spots forming the tessellating pattern at the eye are randomized shaped HVP spots (but still distributed geometrically) to address increased pupil size (=increased oversampling). Sampling refers to the number of hyperfocal reflector spots directing rays into the eye instantaneously.

According to some approaches, hyperfocal viewports that use wavelength reflective spots according to embodiments herein are adopted in the optical hyperfocal reflective system to mitigate the degradation of the virtual image seen by the eye. In some embodiments, the wavelength selective hyperfocal spots of the view ports are arranged in the optical hyperfocal reflective system to form a pattern of hyperfocused virtual image spots at the eye which tessellates whilst in other embodiments, the wavelength selective hyperfocal reflector spots are arranged such that there is no such tessellation pattern.

Converting the hyperfocal viewports from being broadband to being wavelength dependent reflective ports has some potential technical advantages. The first advantage is with respect to outside world transmission, that is, for optical transmission of light from the real world scene through the optical substrate of the optical hyperfocal reflective system, for the cases in which the optical hyperfocal reflective system is implemented as an optical combiner. FIG. 26 shows a typical emission spectrum of an image source such as an OLED, the emission spectrum of broadband natural sunlight and the reflectivity of a typical broadband reflector such as a silver mirror. As can be seen by FIG. 26, broadband reflectors by nature do not discriminate between outside world natural light and our AR image source light. In the case of broadband hyperfocal viewport reflector spots, the most basic measure of efficiency of our viewport system in delivering the AR image to the eye is determined by the ratio of total area of all viewports over total area of the optical hyperfocal reflective optical substrate (waveguide or visor). This would mean in order to reflect 10% of the light from the image generating source towards the eye, we would be blocking 10% of the outside world natural light from transmitting through the optical substrate to the eye. By adopting wavelength selective hyperfocal reflector spots in the hyperfocal view ports, more light from the outside world is able to pass through the optical substrate without reducing the efficiency of the reflected light from the AR image source.

Reduction in blocking of the natural light from the outside world by the view ports may be achieved in different ways. In some embodiments, this is achieved by adopting as each viewport reflector spot a wavelength selective reflector spot that covers the entire RGB emission spectrum of the AR image source. In some embodiments, reduction in natural light from the outside world is achieved by separating each viewport into three individual R, G or B sections of the AR image source emission spectrum and replicating the initial distribution for each the R, G and B hyperfocal reflector spots. By way of example, FIGS. 27 to 29 illustrate different configurations of hyperfocal reflective viewports according to some embodiments. FIG. 27 illustrates view ports having broadband hyperfocal reflector spots (such as spots having a silver mirror or dielectric coating), FIG. 28 illustrates view ports having wavelength selective hyperfocal reflector spots that reflect the total image source emission spectrum but pass other light, and FIG. 29 illustrates view ports having wavelength selective hyperfocal reflector spots some of which are configured to reflect only individual R sections of the image source emission spectrum, some of which are configure to reflect only G sections of the image source emission spectrum and some of which are configured to only reflect B sections of the image source emission spectrum, whilst allowing all other light to pass.

The view ports with broadband hyperfocal reflector spots in the layout of FIG. 27 completely block out the outside world natural light and reflect all of the AR image source light that contacts the reflector spots. The Viewports with wavelength selective hyperfocal reflector spots for total image source emission spectrum in the layout of FIG. 28 allow through more of the outside world natural light passing through the substrate if it falls outside the reflective wavelength range of the hyperfocal reflector spot, and within range, reflect an equal or similar percentage of the AR image source light as the broadband reflectors.

View ports with wavelength selective hyperfocal reflector spots for selection of individual R, G and B sections of the AR image source emission spectrum are shown in the layout of FIG. 29. Such a configuration divides the wavelength selective viewports into their RGB constituents and offsets each pattern. They allow through more of the outside world natural light passing through the substrate if it falls outside the reflective wavelength range of the particular R, G, B wavelength selective hyperfocal reflector spot, and within range, reflect a similar or equal percentage of the AR image source R, G, B light respectively, as the broadband reflectors.

Figure 30:
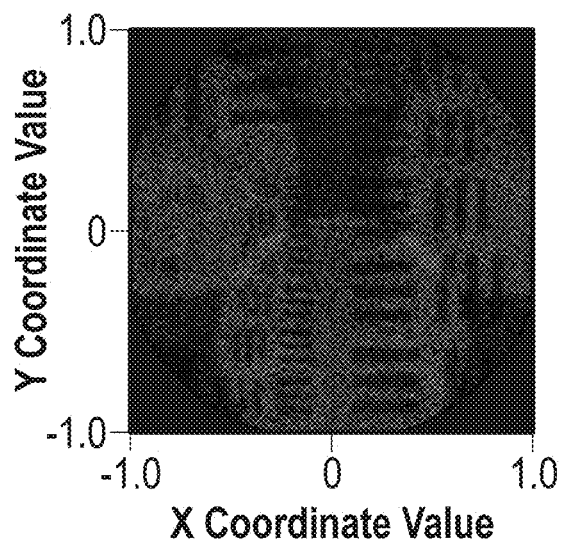
FIG. 30 illustrates hyperfocused spot images seen by a detector according to a computer program model according to an embodiment.
Figure 31:
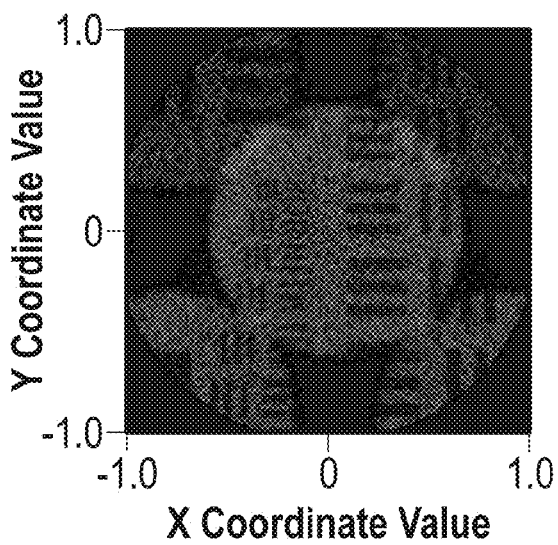
FIG. 31 illustrates hyperfocused spot images as seen by a detector according to a computer program model according to an embodiment.
Figure 32:
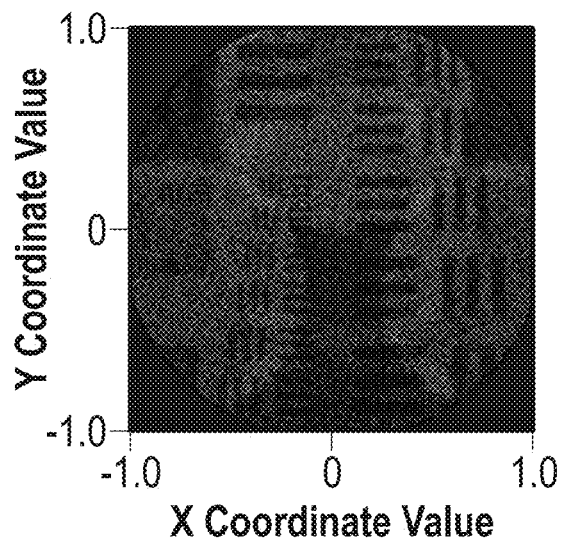
FIG. 32 illustrates hyperfocused spot images as seen by a detector according to a computer program model according to an embodiment.
Figure 33:
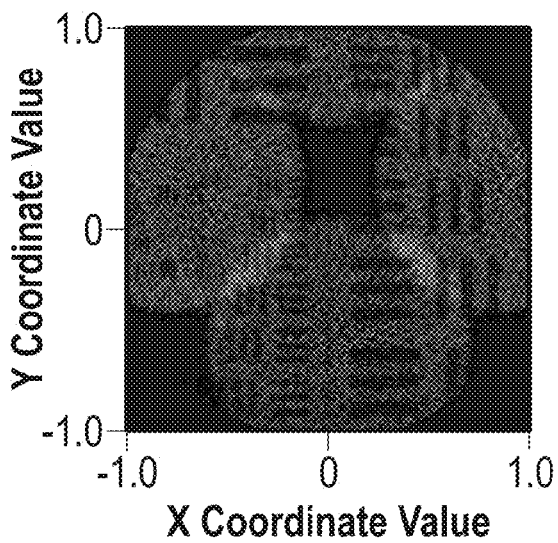
FIG. 33 illustrates hyperfocused spot images as seen by a detector according to a computer program model according to an embodiment.

Adopting view ports with wavelength selective reflector spots for individual R, G and B sections of the AR image source emission spectrum in the optical hyperfocal reflective systems according to some embodiments providing potentially beneficial effect when it comes to under sampling of the hyperfocal viewports by the eye. When viewing a display where the inter-viewport distance is too large for the eye pupil there will be a severe loss of information or dark patching effect. Such an effect is shown by way of example in FIGS. 31 and 33 which illustrate images seen by a detector determined according to a computer model. The computer model, which is, but not limited, to an optical design program of Zemax, LLC, models the propagation of rays in the optical hyperfocal reflective system and the views as seen at a detector. Examples of under sampling in a Hyperfocal reflective system with broadband reflective hyperfocal viewport element are shown in FIGS. 31 and 33 with the eye focused at 1 m and eye focused at infinity, respectively. Dark patching is position dependent so the two detectors have different views. FIGS. 30 and 32 illustrate images seen by the eye according to the computer model for the example of under sampling in a Hyperfocal viewport display with individual RGB selective hyperfocal viewports in the layout of FIG. 29 with the Eye focused at 1 m and the eye focused at infinity, respectively.

As can be seen from FIGS. 30 to 33, the images are in focus when the eye is focused at both 1 m and infinity, indicating the hyperfocus is present in both cases. When using the broadband hyperfocal reflector spots in the layout of FIG. 27, the result of under sampling a white image through the viewports is a complete loss of information in some regions of the display (see FIGS. 31 & 33). The same applies for the viewports with wavelength selective reflectors for total image source emission spectrum in the layout of FIG. 28 where the RGB reflections are from a single hyperfocal reflector spot. However, in the case of the separated RGB hyperfocal reflector spots in the layout of FIG. 29, there is a loss of color uniformity but information is maintained in the image (see FIGS. 30 & 32).

As will be explained below, in some other approaches, another way to mitigate degradation of the image seen by the eye is by adopting polarized hyperfocal reflector spots in the hyperfocal view ports of the optical hyperfocal reflective systems to actively control image quality.

In some approaches of the optical hyperfocal reflective systems, HVP reflector spots are polarized reflector spots. Polarized hyperfocal reflector spots may be wire grid or other polarizing material, arranged to reflect the polarization state of interest. In some embodiments, some of the polarizer hyperfocal reflector spots have first configurations and some of the polarizer hyperfocal reflector spots have second configurations different from the first configurations. The polarized HVP reflector spots may be implemented in the optical hyperfocal reflective systems (either as optical combiners or non-combiners) that have optical wave guide substrates or free space optical substrates such as but not limited those optical substrates shown in the figures.

Optical image input rays that are unpolarized are reflected from first polarization state selective polarizer hyperfocal reflector spots in first polarization states having first electric fields and reflected from second polarization state selective polarizer hyperfocal reflector spots with second polarization states having second electric fields. In some embodiments, the first polarization state may be orthogonal to the second polarization state or at an intermediate angle. The intermediate angle may be selected according to the position of the hyperfocal reflective spot along the optical substrate. In some embodiments, the first polarization states are horizontal (H) polarization states in which the first electric field is horizontal and the second polarization states are vertical (V) polarization states in which the second electric field is vertical. In some embodiments, the polarized hyperfocal reflector spots are distributed in an alternating pattern of first polarization state selective reflector spots and second polarization state selective reflector spots, such as but not limited to for example alternating Horizontal (H) polarization selective reflector spots and vertical (V) polarization selective reflector spots.

Figure 34:
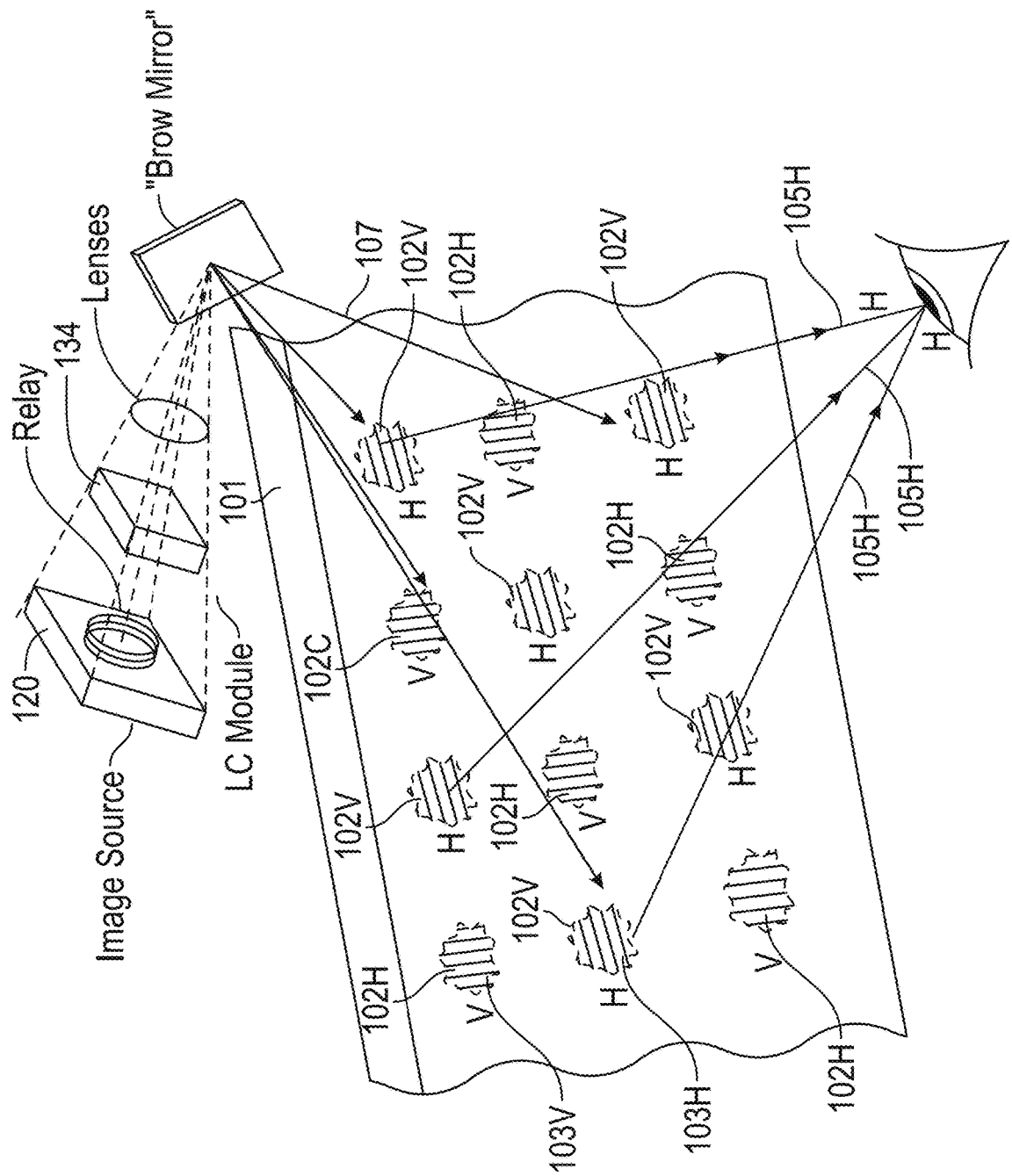
FIG. 34 illustrates an optical augmented reality display system according to an embodiment.

Referring to FIG. 34, an augmented reality display system is shown according on an embodiment in which the substrate is a freespace optical substrate (freespace optical combiner or non-combiner). Hyperfocal reflective view ports of the optical hyperfocal reflective system are polarization selective view ports 102H, 102V. In the embodiment shown, hyperfocal reflective view ports 102H have horizontal polarization selective reflector spots 103H in the form of horizontal wire grids configured to reflect horizontally polarized input rays 107 and pass vertically polarized input rays 107. Hyperfocal reflective view ports 102V have vertical polarization selective reflector spots 103V in the form of vertical wire grids configured to reflect vertically polarized input rays 107 and pass horizontally polarized input rays 107. Other types of polarizers may be employed in other embodiments. For ease of illustration, the wires and spacing of the grids are not shown to scale. In some embodiments, the spacing is in the nano meter range such as but not limited to 100-200 nm. When unpolarized light is incident on the polarizer, polarization with electric field parallel to wire grid is reflected and polarization with electric field perpendicular to the wire grid is transmitted. When optical image input rays 107 are unpolarized, optical display input rays 107 reflected from the polarizer hyperfocal reflector spots 103V are polarized with a vertical electric field and the hyperfocal reflector spots 103V pass horizontal electric field whereas optical image input rays 107 reflected from the polarizer hyperfocal reflector spots 103H are polarized with a horizontal electric field and the hyperfocal reflector spots 103H pass vertical electric field.

In the optical system of FIG. 34, the optical image input rays 107 are dynamically polarized. To this end, image 108 from an image generating device 120, in this case a projector, is varied in polarization state via a polarizing module 134, here a LC module. When the optical input image is in the horizontal H polarized state, only 103H hyperfocal reflector spots reflect the discrete spot beams 105H with an H polarization state and the 103V hyperfocal reflector spots do not reflect any of the H state optical input rays. When the image is in the vertical V polarized state, only 103V hyperfocal reflector spots reflect the discrete spot beams 105V with a V polarization state and the 103H hyperfocal reflector spots do not reflect any of the V state optical input rays. Optical image input rays 107 can be dynamically polarized either continually linearly between H and V, or between both H and V together and H and/or V, or circularly, or by varying degrees of elliptical state so that the image is directed to the eye in succession from either the H-state HVP elements, V-state HVP elements or from both simultaneously. Such a method overcomes oversampling issues if a higher number of HVP regions are desired. In some embodiments, some or all of the hyperfocal reflector spots configured with first polarization state may be configured with a polarization state other than the vertical polarization state and/or some or all of the hyperfocal reflector spots configured with a second polarization state may be configured with a polarization state other than the horizontal polarization state. The first polarization state may be orthogonal to the second polarization state or at an intermediate angle. The intermediate angle may be selected according to the position of the hyperfocal reflective spot along the optical substrate.

Figure 35:
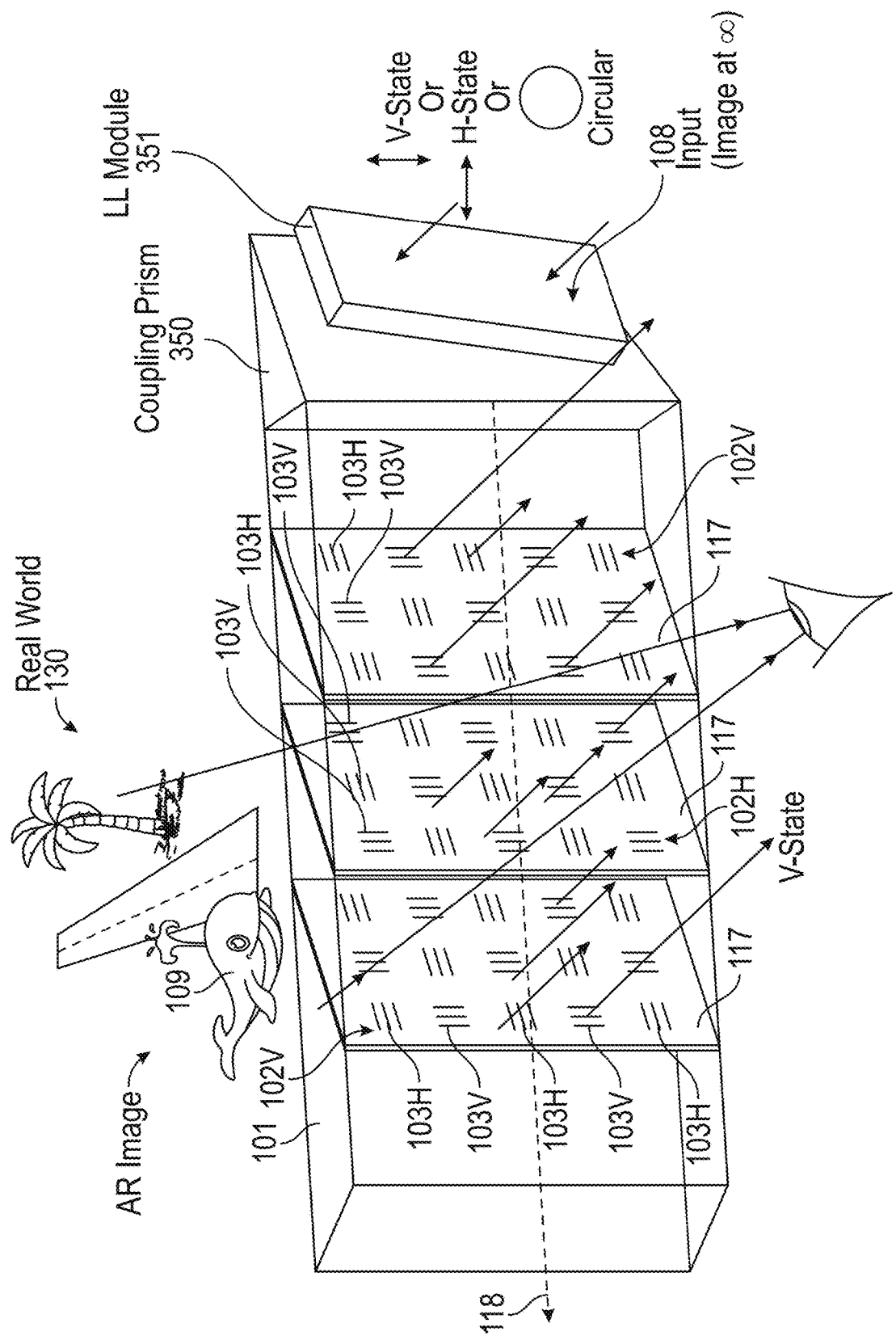
FIG. 35 illustrates an optical hyperfocal reflective system according to an embodiment.

A corresponding set up can be implemented for the optical hyperfocal reflective system in which the substrate is an optical wave guide rather than a free space substrate. By way of example, FIG. 35 illustrates a perspective view of such an optical hyperfocal reflective system in which the H polarized state hyperfocal reflector spots 103H and V polarized state hyperfocal reflector spots are alternatively distributed along the waveguide grouped together in common planes 117 that are spaced apart from one another. Optical image input rays 107 can be dynamically polarized either continually between H and V with circularly in between or by varying degrees of elliptical state so that the image is directed to the eye in succession from either the H-state HVP elements, V-state HVP elements or from both simultaneously. Such a method overcomes oversampling issues if a higher number of HVP regions are desired. In some embodiments, some or all of the hyperfocal reflector spots configured with first polarization state may be configured with a polarization state other than the vertical polarization state and/or some or all of the hyperfocal reflector spots configured with a second polarization state may be configured with a polarization state other than the horizontal polarization state. The first polarization state may be orthogonal to the second polarization state or at an intermediate angle. The intermediate angle may be selected according to the position of the hyperfocal reflective spot along the optical substrate.

As demonstrated for example by the embodiments of the optical systems of FIGS. 34 and 35, in some approaches, by varying polarization of the optical display input rays 107, the system is able to dynamically change the distribution of active hyperfocal reflector spots and inactive hyperfocal reflector spots across the pupil to account for different pupil sizes and positions. Active hyperfocal reflector spots are those spots that are effectively turned on, that is, they are the spots reflecting the optical input rays 107 because the optical input rays 107 are polarized according to the polarization selective state of those hyperfocal reflector spots. Inactive hyperfocal reflector spots are those spots that are effectively turned "off", that is, they are not reflecting the optical input rays 107 because the optical input rays input are not polarized according to the polarization selective state of those hyperfocal reflector spots.

In some embodiments in which the optical hyperfocal reflective system is implemented as an exit pupil expander, this dynamic changing of the distribution of reflecting hyperfocal reflector spots and non-reflecting hyperfocal reflector spots by changing polarization of the optical input rays can be adopted to control intensity across the waveguide along in the exit pupil expanding direction by varying the concentrations of first polarization state selective reflector spots and/or the concentrations of second polarization state selective reflector spots as a function of the spot positions along the waveguide. In some embodiments, the first polarization state selective reflector spots are horizontal (H) polarization state selective reflector spots and the second polarization state reflective spots are vertical (V) polarization state selective reflector spots.

Figure 36:
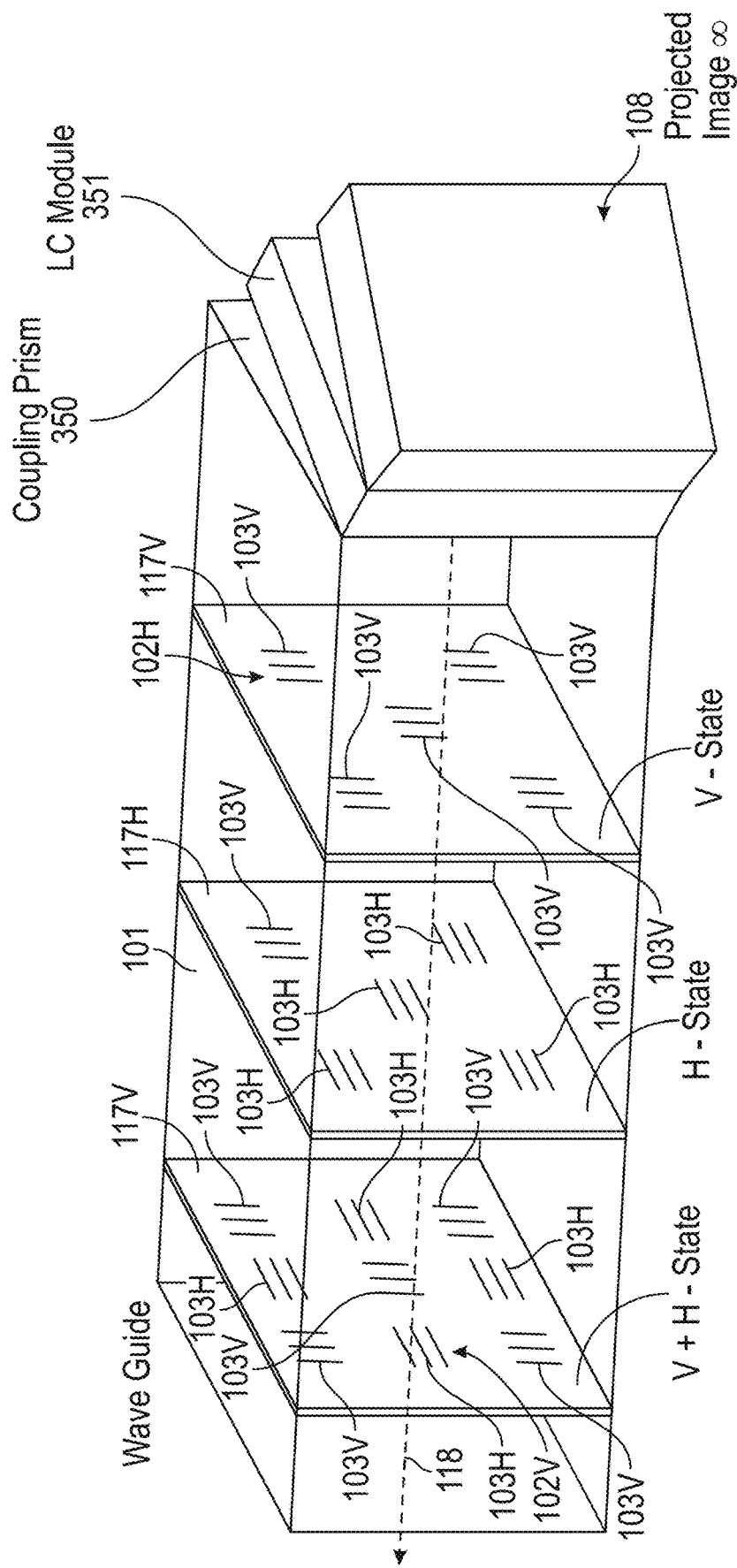
FIG. 36 illustrates an optical hyperfocal reflective system according to an embodiment.

By way of example, reference is made to FIG. 36 which illustrates an extreme case in which only hyperfocal reflector spots having V polarization state occupy an inclined common reflector plane 117V, only hyperfocal reflector spots having H polarization state occupy the next inclined common reflector plane 117H spaced further along the waveguide, and a combination of both hyperfocal reflector spots having V polarization state and hyperfocal reflector spots having H polarization state occupy a final inclined common reflector plane 117HV spaced yet further along the waveguide. By varying the optical input image polarization state, one can select each reflector of the H and V state, so light is not obscured by the preceding HVP elements (minimizing also secondary ray generation). Increasing duration at a particular polarization state allows to control (maximize) brightness at the particular HVP region—i.e. furthest region from projector would normally be darker due to propagation losses (including effect of preceding HVP elements), but would appear brighter if circularly polarized light was launched into the waveguide. In some embodiments, some or all of the hyperfocal reflector spots configured with first polarization state may be configured with a polarization state other than the vertical polarization state and/or some or all of the hyperfocal reflector spots configured with a second polarization state may be configured with a polarization state other than the horizontal polarization state. The first polarization state may be orthogonal to the second polarization state or at an intermediate angle. The intermediate angle may be selected according to the position of the hyperfocal reflective spot along the optical substrate.

As the aforementioned examples of polarization dependent hyperfocal view ports illustrate, polarization dependent reflective viewports allow for distributions of viewports to be varied based on image polarization that result in improved image quality.

In some approaches of optical hyperfocal reflective systems in which wavelength selective hyperfocal reflective viewports are adopted, the optical hyperfocal reflective systems may be configured as displays having a plurality of optical waveguides. In all such embodiments, the aperture size of the hyperfocal reflector spots is selected so that the reflected discrete virtual image spot beam 105 has a diameter D at the target area so as to achieve the hyperfocal focus of the virtual image spot beam at the eye or other lens-detector located in the target area in the manner explained hereinbefore. Each output coupling grating is made up of distinct Hyper-Focal Viewports, the dimensions of which may be the same as those of the partial or fully reflective viewports described herein with reference to other embodiments of systems using a single optical waveguide but accounting for the apparent spot to target optical path length differences of the first waveguide with respect to second waveguide.

Each waveguide includes the wavelength selective hyperfocal reflector spots in the form of diffraction optical elements to selectively reflect rays 107 of a specific wavelength or bands of wavelengths as the discrete spot beams 105. In some of other embodiments, wavelength selective hyperfocal reflector spots other than diffraction optical elements may be used. The hyperfocal reflective spots may be partially reflective spots, fully reflective spots or a combination of both.

The groups of diffraction optical element reflector spots in each wave guide are configured generally in the same manner as diffraction hyperfocal reflector spots of other waveguide embodiments described herein. However, in order to maximize the angular bandwidth of the diffractive waveguide display, whilst also minimizing the cross-talk between different colors (whereby a ray for one color is diffracted incorrectly by a grating with a pitch intended for another color), the diffraction wave guide display comprises a plurality of waveguides in which different specific wavelengths or wavelength bands or colors of the optical input image are selectively reflected by diffraction optical element hyperfocal reflector spots in different optical wave guides. In some embodiments, the plurality of waveguides are sandwiched together or placed in close proximity with one another in a sandwich configuration.

In some embodiments, respective waveguides of the plurality of waveguides include respective groups of diffraction optical element hyperfocal reflector spots being configured to selectively reflect optical image input rays of respective specific color(s) or band(s) of wavelengths. In some embodiments, the specific wavelength of color(s) or band(s) of wavelengths of the optical image input rays selectively reflected by one group of hyperfocal reflector spots in one waveguide of the plurality of waveguides is different from specific color(s) or band(s) of wavelengths of the optical image input rays selectively reflected by another group of hyperfocal reflector spots in another of the waveguides. In some embodiments, one or more of the plurality waveguides includes a plurality of different groups of hyperfocal reflector spots. In some embodiments, the specific color(s) or band(s) of wavelengths of the optical image input rays selectively reflected by one group of hyperfocal reflector spots in the waveguide of the plurality of waveguides is different from specific color(s) or band(s) of wavelengths of the optical image input rays selectively reflected by another group of the hyperfocal reflector spots in the same waveguide.

In the some approaches in which the optical hyperfocal reflective system is configured as the diffractive optical display, the system has two waveguides. The optical input image 106 is a polychromatic image. In such embodiments, polychromatic image is composed of three different colors (first, second and third colors) and the colors of the optical input image 106 are split between the two waveguides. The diffractive input coupler of the first optical waveguide is configured to selectively diffract some of the optical image input rays of first and second colors whilst pass the optical image input rays of the third color and pass at least some of the optical input image rays of the second color to the second optical waveguide. The diffractive input coupler of the second optical waveguide is configured to selectively diffract at least some of the optical image input rays of the third color and second color that have passed through the first diffractive input coupler.

Figure 37:
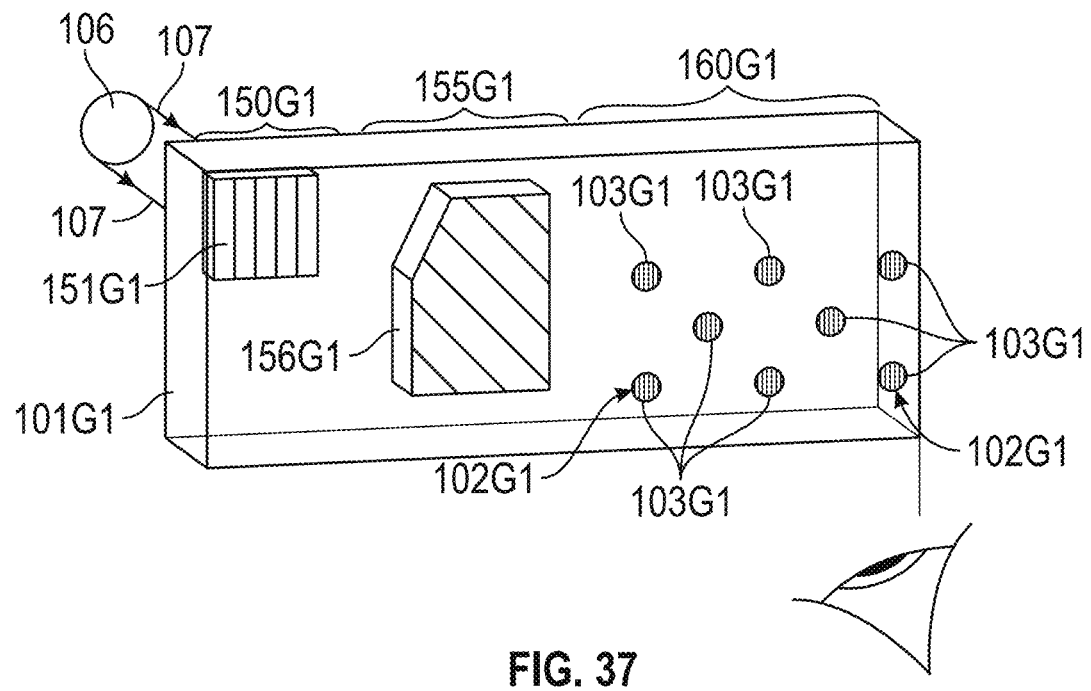
FIG. 37 is a perspective view of an optical hyperfocal reflective system according to an embodiment.
Figure 38:
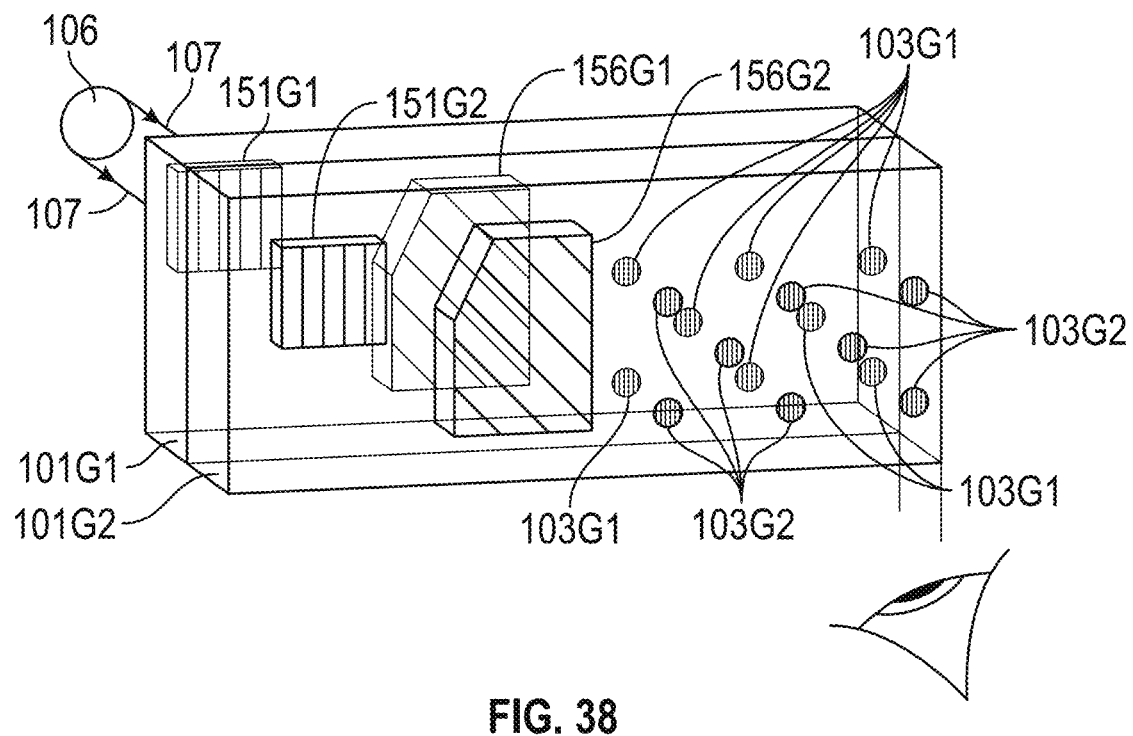
FIG. 38 is a perspective view of an optical hyperfocal reflective system including the system of FIG. 37 according to an embodiment.
Figure 39:
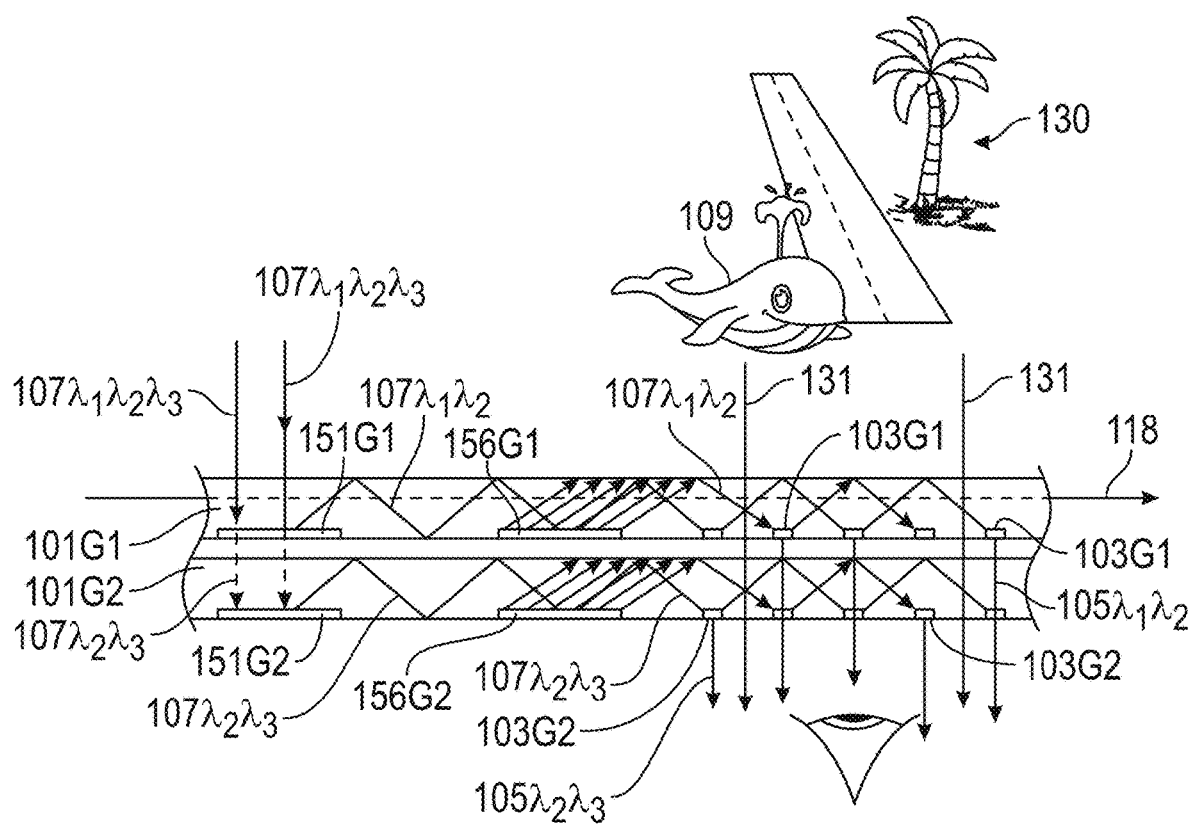
FIG. 39 is a top plan view of the system of FIG. 38.

By way of example, FIGS. 37 to 39 illustrate an optical hyperfocal reflective system configured as a diffractive waveguide display having a plurality of optical waveguides according to one embodiment. The diffractive input coupler of the first waveguide is optimized to diffract rays optical input rays 107 with wavelengths λ1 and λ2, whilst the second waveguide is optimized for diffracting optical input rays 107 with wavelengths λ2 and λ3. Typically, λ1=Blue, λ2=Green and λ3=Red. In other embodiments λ1, λ2, and λ3, may correspond to different colors respectively. In some embodiments, λ1, λ2, and λ3, may represent Blue Green and Red in a different order. For example, in some embodiments, λ1=Red, λ2=Green and λ3=Blue. By way of non-limiting example λ1=450 nm, λ2=532 nm and λ3=640 nm for an image source such as an organic light emitting diode (OLED) (see for example FIG. 26 showing a typical emission spectrum of an OLED). In some embodiments, at least some of λ1, λ2, and λ3 are different from one another and correspond to any wavelengths of light. The diffraction gratings in the waveguides are configured to selectively diffract light with certain wavelengths. In one non-limiting example, for selectively diffracting any one or combination of blue, green, red light, input diffraction grating pitch is selected accordingly in the order of about 300 nm to 500 nm spacing. Selected pitching depends upon FOV and type of substrate material (for critical angle guiding condition).

Referring to the exemplary embodiment of FIGS. 37 to 39 in more detail, FIG. 37 is a perspective view of one of the optical waveguides taken in isolation, that is, a first optical waveguide substrate 101G1. Each optical waveguide substrate is any optical waveguide substrate suitable for augmented reality or virtual reality displays such as optical waveguide substrate 101 of any of the embodiments disclosed herein. Optical waveguide substrate 101G1 includes a first optical input coupling portion 150G1 and first output coupling portion 160G1. First optical input coupling portion 150G1 and first optical coupling portion 160G1 are spaced part from one another along the first waveguide substrate 101G1 in the exit pupil expanding direction 118. First optical input coupling portion 150G1 is optically coupled to first optical output coupling portion 160G1 via an additional first pupil expanding region 155G1. In some embodiments, the additional first pupil expanding region may be omitted.

First optical input coupling portion 150G1 comprises a first optical input diffraction grating 151G1 configured to selectively diffract, and thereby internally reflect, into the first waveguide 101G1 optical input rays 107 of a specific first wavelength λ1, and a portion of the optical input rays 107 with specific second wavelength λ2, along first optical waveguide substrate in the pupil expanding direction 118 (see FIG. 39). First optical input diffraction grating 151G1 is further configured to pass therethrough at least some of the optical input rays 107 with specific wavelength λ2 that have not been diffracted into the first waveguide 101G1, and also pass optical input rays 107 with a third specific wavelength λ3 therethrough out of the face of the first optical substrate rather than internally reflect them. First input diffraction grating 151G1 has a grating configuration and pitch to selectively reflect the optical input waves 107 with specific or a band of wavelengths λ1, λ2, along the optical waveguide substrate 101G1 in the pupil expanding direction 118 and to transmit other wavelengths therethrough.

First additional pupil expanding region 155G1 is a first extension diffraction grating 156G1 disposed in between first optical input coupling portion 150G1 and first optical output coupling portion 160G1. In other embodiments, first additional pupil expanding region 155G1 may be another type of pupil expanding component suitable for expanding in the pupil expanding direction 118 the optical input rays of specific wavelength(s) selectively internally reflected by first optical input coupling region 150G1 and propagating along first optical waveguide. First extension diffraction grating 151G1 is configured to selectively diffract optical input rays 107 of specific wavelength(s) internally along first optical waveguide 101G1 to expand the exit pupil of the image generating system in 2 dimensions in the expanding direction 118. In the example shown in FIGS. 37 to 39, first extension diffraction grating 151G1 has a grating configuration and pitch to selectively diffract the received reflected first optical input rays 107 with wavelengths λ1, λ2, further along the first optical waveguide substrate in the pupil expanding direction 118.

First optical output coupling 160G1 comprises a plurality of first hyperfocal reflector spots 103G1 of first hyperfocal view ports 102G1 in the form of diffraction optical elements disposed in the first optical waveguide 101G1. The first diffraction optical element reflector spots 103G1 are diffraction gratings embedded in the surface of the first optical waveguide substrate. In some other embodiments, the diffraction gratings are embedded further in the volume of the substrate 101G1 or disposed on the surface. First diffraction grating hyperfocal reflector spots 103G1 are configured to selectively reflect optical input rays 102 with the specific first wavelength λ1 and specific second wavelength λ2 as discrete spot beams composed of rays of first and second specific wavelengths 105λ1 and λ2 towards the eye lens or eye target area. In this example, first diffraction grating hyperfocal reflector spots 103G1 have grating configurations and grating pitch to selectively reflect the first optical input waves 107 with the first specific wavelength λ1 and second specific wavelength λ2, as the discrete spot beams 105 λ1, λ2 composed of rays of the first and second specific wavelengths, towards the eye or other optical detector target. First diffraction grating hyperfocal reflector spots 103G1 are arranged in a first pattern along the first output coupling portion of the first waveguide substrate. Examples of diffraction grating pitch and materials for expansion and selectively reflecting different colors in optical waveguides can be found in U.S. Pat. No. 9,946,068 the contents of which is incorporated herein by reference.

A second optical waveguide substrate 101G2, which is similar to optical waveguide substrate 101G1, is arranged adjacent with first optical waveguide 101G1 in a side by side or sandwich configuration. The front face of first optical waveguide substrate 101 faces the rear face of the second optical waveguide substrate 101. First optical waveguide 101G1 is arranged parallel or substantially parallel with the second optical waveguide 102G2. A gap is disposed between first optical waveguide 101G1 and second optical waveguide 101G2. In some other embodiments, first optical waveguide 101G1 may be in direct contact with second optical waveguide 101G2 without any gap therebetween.

Elements included in the second optical waveguide substrate 101G2 generally correspond to those elements in first optical waveguide 101G1 identified by the same reference numeral numbers but the reference numerals identifying elements in the second substrate end with "G2" rather than "G1". However, the configurations of the second optical input portion 105G2, second additional pupil expanding region 155G2 and the second output coupling portion 105G2 differ from those of the first optical input portion 105G1, first additional pupil expanding region 155G1 and the first output coupling portion 105G1, respectively, in that they are configured to selectively reflect optical input rays of the specific second wavelength λ2 and a specific third wavelength λ 3. First wavelength λ 1, second wavelength λ 2 and third wavelength λ 3 are different wavelengths. In the example of FIGS. 37 to 39, λ 1 corresponds to the color blue, λ 2 corresponds to the color green and λ3 corresponds to the color red. Second optical input grating 151G1 has a grating configuration and grating pitch to selectively reflect the optical input rays 107 of wavelengths λ 2 and λ 3 along the second optical substrate towards the second extension diffraction grating 155G2. The second extension diffraction grating 155G2 has a grating configuration and pitch to selectively reflect the received optical input rays of wavelengths λ 2 and λ 3 further along second optical substrate 101G2 towards second output coupling portion 160G2. Furthermore, second optical output coupling 160G2 comprises a plurality of second hyperfocal reflector spots 103G2 of second hyperfocal view ports 102G2 in the form of diffraction optical elements distributed in second optical waveguide 101G2 along the pupil expanding direction 118. The hyperfocal reflective diffraction optical element spots 103G2 in this embodiment are second diffraction gratings configured to selectively reflect optical input rays of second and third wavelengths λ 2, λ 3, respectively, as discrete spot beams 105 composed of rays of second and third wavelengths 105λ2 and λ3 towards the eye lens or eye target area. In this example, second diffraction grating hyperfocal reflector spots 103G2 have grating configurations grating pitch to selectively reflect wavelengths λ2 and λ3 corresponding to Green light and Red light respectively.

Second diffraction grating hyperfocal reflector spots 103G2 are arranged in a second pattern along the second output coupling portion of the second waveguide substrate. In this embodiment, the second pattern of second diffraction grating hyperfocal reflector spots 103G2 is different from the first pattern of first diffraction grating hyperfocal reflector spots 103G2. Other patterns of first diffraction grating hyperfocal reflector spots and/or second diffraction grating hyperfocal reflector spots are envisaged which may be regular or irregular.

First and second hyperfocal reflector spots 103 G1 and 103G2 are spaced along the exit pupil expanding direction 118 so that the discrete reflected spot beams 105 have an angular direction relative to eye lens 205 or eye target area that is necessary to capture the full field of view of the display in the manner already explained hereinbefore with reference to FIGS. 7 to 9B. The aperture size of the hyperfocal reflector spots 103G1 and 103G2 is selected such that the discrete spot beams have a diameter D at the target area of the eye or other lens detector so as to achieve the hyperfocused view of the virtual image spot in the manner explained hereinbefore.

First hyperfocal reflector spots 103G1 of first output coupling portion 160G1 of first optical waveguide substrate 101G1 are staggered or otherwise distributed in the exit pupil expanding direction 18 relative to second hyperfocal reflector spots 103G2 in second output coupling portion 160G2 of second optical wave substrate 101G2 so that the hyperfocused spot images as viewed at the eye target area, or other optical detector target area, formed by discrete spot beams 105λ1λ2 reflected from first hyperfocal reflector spots 103G1 do not overlap hyperfocused spot images formed by discrete spot beams 105λ2λ3 reflected from second hyperfocal reflector spots 103G2. In the same manner as the hyperfocused spot images for a single waveguide (see examples of FIGS. 21 to 33), this provides benefits with respect to image quality and field of view. For example, it allows the field of view and/or quality of the overall viewed image to increase compared to arrangements which result in the hyperfocused spot images overlapping.

In some other embodiments, there may be more or less wavelength selective hyperfocal reflector spots 103G1, 103G2 than shown in FIGS. 37 to 39. In some other embodiments, the patterns, size, and shape, of wavelength selective spots 103G1, 103G2 of each group may be different to the patterns shown. In other embodiments, each specific wavelength may be different to those indicated. Furthermore, in some embodiments, first hyperfocal reflector spots 103G1 and second hyperfocal reflector spots 103G2 are shaped as hexagonal spots or other shapes that may be regular, irregular or a combination of both, and are arranged relative to each other such that the hyperfocused spot images formed by first hyperfocal reflector spots 103G1 and second hyperfocal reflector spots 103G2 taken in combination form a tessellation of hyperfocused spot images at the eye target area in a similar manner to hyperfocal reflective spots in a single optical waveguide (see for examples FIGS. 21 to 33 and corresponding description on shapes of spots and tessellation of hyperfocused spot images).

In some approaches in which the optical hyperfocal reflective system configured as the diffractive optical display, the system has at least three optical waveguides. Each waveguide is designed to support only one color of three different colors, and as such is a simpler grating design than when using only two optical waveguides. The optical input image 106 is a polychromatic image. In this embodiment, polychromatic image is composed of three different colors (first, second and third colors such as blue, green, red, respectively) and the colors of the optical input image 106 are split between the three waveguides. The diffraction gratings in the waveguides are configured to selectively diffract light with certain wavelengths. In one non-limiting example, for selectively diffracting any one or combination of blue, green and red light, input diffraction grating pitch is selected accordingly in the order of about 300 nm to 500 nm spacing. Selected pitching depends upon FOV and type of substrate material (for critical angle guiding condition).

The first diffractive input coupler associated with the first optical waveguide substrate is configured to diffract some of the optical image input in the first color whilst pass the optical image in the second and third colors to the second optical waveguide. The second diffractive input coupler associated with the second optical waveguide substrate is configured to diffract some of the optical image input in the second color whilst pass the optical image in the third color to the third optical waveguide. First, second and third pupil extension gratings of first, second and third optical waveguide substrates, respectively, selectively reflect the optical image in the first, second and third colors internally along the substrates. First hyperfocal reflective spots of the first waveguide substrate are configured to selectively reflect discrete spot beams composed of rays of the first wavelength. Second hyperfocal reflective spots of the second waveguide substrate are configured to selectively reflect discrete spot beams composed of rays of the second wavelength. Third hyperfocal reflective spots of the third waveguide substrate are configured to selectively reflect discrete spot beams composed of rays of the third wavelength.

Figure 40:
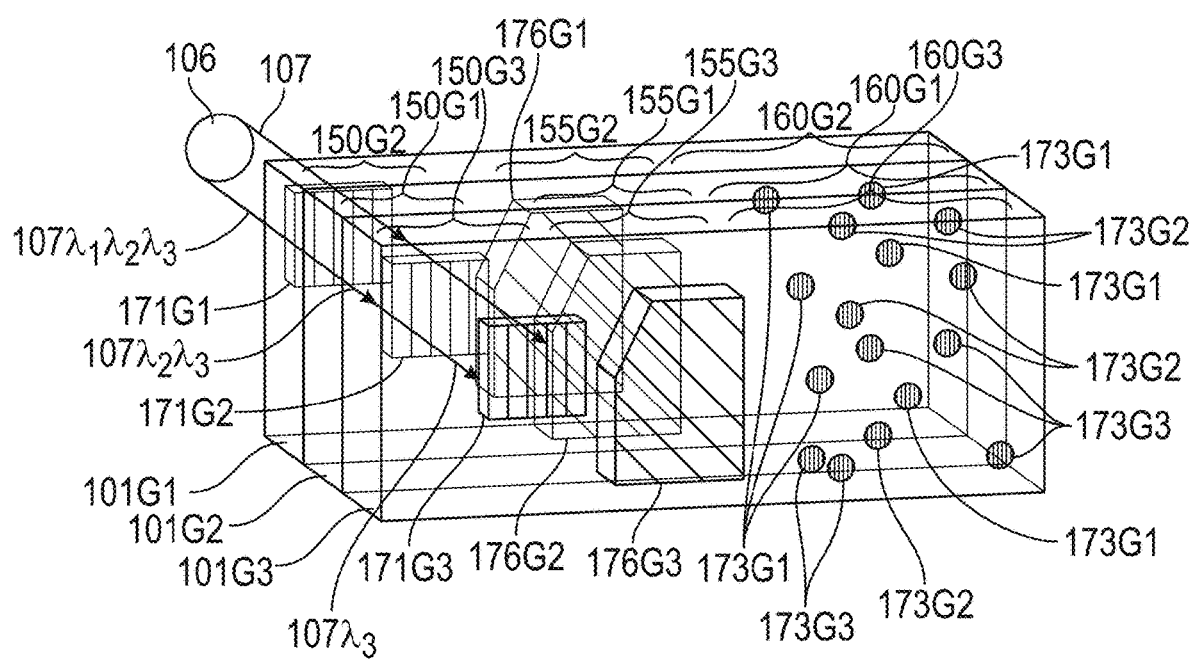
FIG. 40 is a perspective view of an optical hyperfocal reflective system according to an embodiment.
Figure 41:
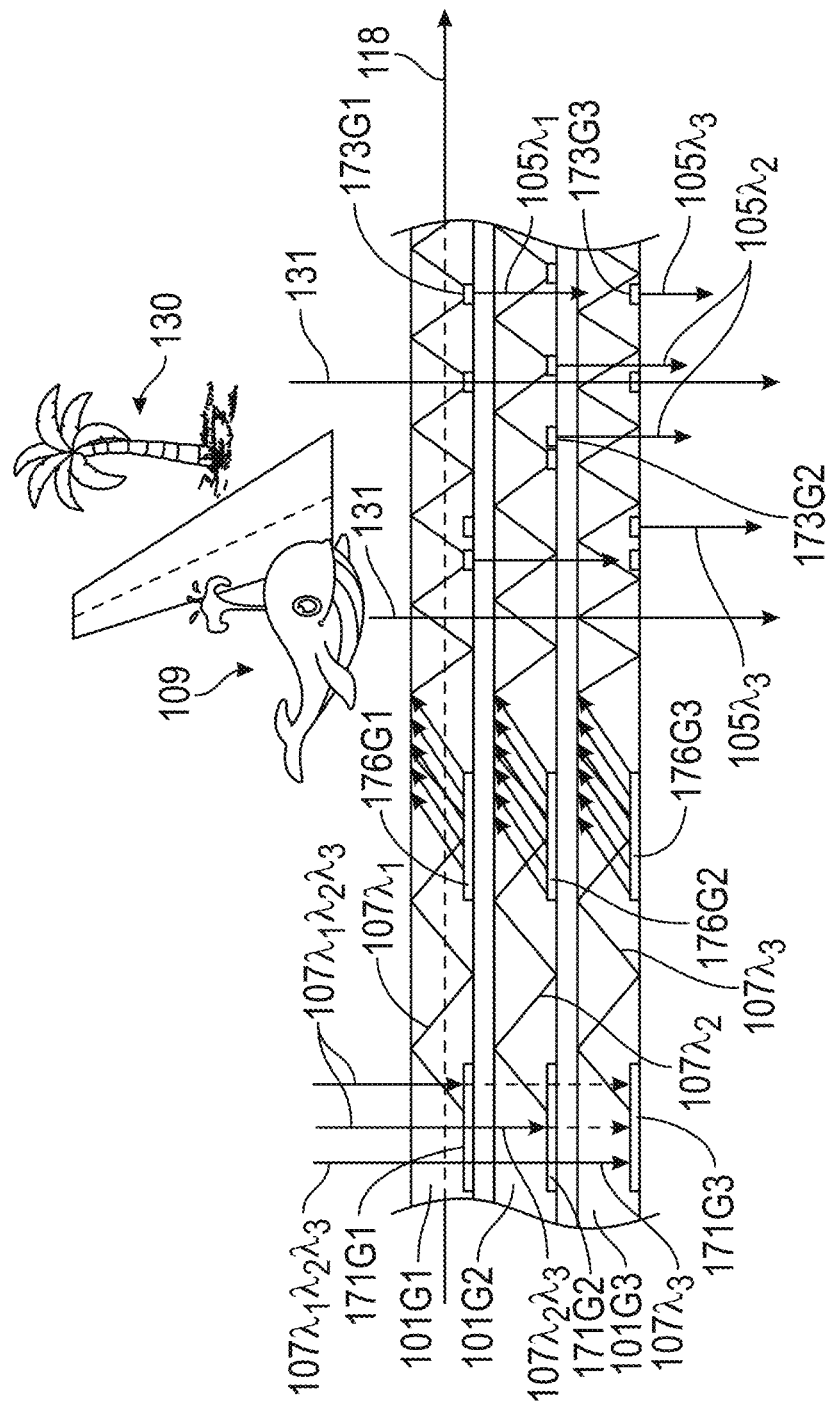
FIG. 41 is a top plan view of the system of FIG. 40.

By way of example of such an optical hyperfocal reflective system having three optical waveguides, reference is made to FIGS. 40 and 41 which illustrate a diffractive waveguide display having three optical waveguides according to one embodiment. First diffractive input coupler 171G1 in the first waveguide substrate 101G1 is configured to selectively diffract optical input rays 107 with wavelengths λ1 internally in the exit pupil expanding direction 118, and to pass optical rays 107 λ2 and λ3 to second optical waveguide 102G2. The second waveguide 101G2 has a second diffraction input coupler 171G2 that is positioned relative to the first diffraction optical coupler 171G1 such that the optical rays 107 λ2 and λ3 passing through first diffraction optical coupler 171G1 are received by second diffraction optical coupler 171G2 of second optical waveguide 101G2. Second diffractive input coupler 171G2 is configured to diffract the received optical input rays 107 with wavelengths λ2, and to pass the received optical rays 107 λ3 to third optical waveguide 103G2. Third waveguide 101G3 has a third diffraction input coupler 173G2 that is positioned relative to first and second diffraction optical couplers 173G1 and 173G2 such that optical rays 107 λ3 passing through first and second diffraction optical couplers are received by third diffraction optical coupler 173G3 of third optical waveguide 101G3. First, second and third diffraction extension gratings 176G1, 176G2 and 176G3 that selectively diffract first, second and third wavelengths, respectively, are disposed in first, second and third optical waveguides 101G1, 101G2, 101G3, respectively, further to expand the optical input image generating system exit pupil in the direction 18.

First, second and third hyperfocal reflector spots 173G1, 173G2 and 173G3 are distributed in the first, second and third output coupling portions 160G1, 160G2 and 160G3, respectively of first, second and third optical waveguides. The hyperfocal reflective spots may be partially reflective spots, fully reflective spots or a combination of both. First hyperfocal reflector spots 173G1 are configured to selectively reflect rays 107 wavelength of λ1 as discrete spot beams 105λ1 towards the eye lens or eye target area. First hyperfocal reflector spots 173G1 are distributed in a first pattern in first output coupling portion 160G1 of first optical substrate 101G1. Second hyperfocal reflector spots 173G2 are configured to selectively reflect rays 107 wavelength of λ2 as discrete spot beams 105λ2 towards the eye lens or eye target area. Second hyperfocal reflector spots 173G2 are distributed in a second pattern in second output coupling portion 160G2 of second optical substrate 101G2. Third hyperfocal reflector spots 103G3 are configured to selectively reflect rays 107 wavelength of λ 3 as discrete spot beams 105λ3 towards the eye lens or eye target area. Third hyperfocal reflector spots 103G3 are distributed in a third pattern in third output coupling portion 160G3 of third optical substrate 101G3.

In this manner, the three optical wave guides optimized for diffracting optical input rays 107 with different wavelengths λ1, λ2, and λ3, respectively. Typically, λ1=Blue, λ2=Green and λ3=Red. In other embodiments λ1, λ2, and λ3, may correspond to different colors respectively. In some embodiments, λ1, λ2, and λ3, may represent. Blue Green and Red in a different order. For example, in some embodiments, λ1=Red, λ2=Green and λ3=Blue. By way of non-limiting example λ1=450 nm, λ2=532 nm and λ3=640 nm for an image source such as an organic light emitting diode (OLED) (see for example FIG. 26 showing a typical emission spectrum of an OLED). In some embodiments, at least some of λ1, λ2, and λ3 are different one another and correspond to any wavelengths of light.

First, second and third hyperfocal reflector spots 173 G1, 173G2, 173G3 are configured so that the discrete reflected spot beams 105 have angular directions relative to eye lens 205 or eye target area that are necessary to capture the full field of view of the display in the manner already explained hereinbefore with reference to FIGS. 7 to 9B. The aperture size of the hyperfocal reflector spots is selected to project the discrete spot beams onto the eye or other lens detector with a diameter D so as to achieve the hyperfocus of the virtual image spot view in the manner explained hereinbefore.

The first hyperfocal reflector spots 173G1, second hyperfocal reflector spots 173G2 and third hyperfocal reflector spots 173G3 are staggered or otherwise distributed relative to each other in the exit pupil expanding direction 118 so that the hyperfocused spot images as viewed at the eye target area, or other optical detector target area, formed by the discrete spot beams 105 λ1, 105 λ2, 105 λ3 reflected from the first, second and third hyperfocal reflector spots 173G1, 173G2 and 173G3, respectively, do not overlap one another. In the same manner as the hyperfocused spot images for a single waveguide (see examples of FIGS. 21 to 33), this provides benefits with respect to image quality and field of view. For example, it allows the field of view and/or quality of the overall viewed image to increase compared to arrangements which result in the hyperfocused spot images overlapping.

In some other embodiments, there may be more or less wavelength selective hyperfocal reflector spots than shown in FIGS. 40 and 41. In some other embodiments, the patterns, size, and shape, of wavelength selective spots of each group may be different to the patterns shown. In other embodiments, each specific wavelength may be different to those indicated. Furthermore, in some embodiments, hyperfocal reflector spots are shaped as hexagonal spots or other shapes that may be regular, irregular or a combination of both, and are arranged relative to each other such that the hyperfocused spot images formed by first hyperfocal reflector spots 173G1, second hyperfocal reflector spots 173G2 and third hyperfocal reflector spots 173G3 taken in combination form a tessellation of hyperfocused spot images at the eye target area in a similar manner to hyperfocal reflective spots in a single optical waveguide (see for example FIGS. 21 to 33 and corresponding description on shapes of spots and forming tessellation of hyperfocused image spots).

As illustrated with reference to different exemplary embodiments of the optical hyperfocal reflective systems having more than one optical waveguide substrate, the arrangement of the output couplers from the different waveguides can be arranged such that the formed hyperfocused spot images are not overlapping, as with the wavelength selective reflective viewports for a single optical wave guide substrate described herein before. In the same manner, this allows the FOV of the output to be increase.

As can be seen by way of the aforementioned example of a diffractive display having a plurality of optical waveguides, each output coupling grating is made up of distinct Hyper-Focal Viewports, the dimensions of which may be the same as those of the partial or fully reflective viewports described herein with reference to other embodiments of systems using a single optical waveguide but accounting for the apparent spot to target optical path length differences of the first waveguide with respect to second waveguide.

In some other approaches, optical hyperfocal reflective systems using more than three optical waveguides are envisaged for selectively reflecting discrete spot beams of more than three different wavelengths.

In yet some other approaches, the optical hyperfocal reflective systems having a plurality of optical waveguides according to embodiments disclosed herein have hyperfocal reflector spots additionally configured as different polarizing reflector spots such as but not limited to those of the embodiments of FIGS. 35 and 36 and the systems include LC modules or other modules for dynamically switching polarization of the optical input image into respective optical waveguides as desired to achieve the benefits discussed already herein with reference to a single optical waveguide.

The aforementioned optical display systems of the embodiments illustrate that by using hyperfocal reflective viewports, the systems allow for a range from infinity down to H (the hyperfocal distance) over which the eye can comfortably accommodate an image that is initially at infinity without loss of resolution. Moreover, the systems use convergence to drive the accommodation of the eye lens by allowing the lens to focus at its most comfortable position and maintain an acceptably sharp image as per our previous definition.

Reference will now be made to some controls systems according to some aspects of the present technology for optimizing the hyperfocused human eye view of the virtual image of the optical hyperfocal reflective system in the display.

According to some aspects, eye tracking display image editing systems and methods are provided in which convergence is used to trick the brain to believe that a computer-generated object is in focus whatever eye gaze in real world, through eye-tracking, allowing the hyperfocal range of the view-port to support the appropriate accommodation. In one embodiment, the system is configured to apply a selective blur to out-of-range objects in the same appearance as a see-through real-world scene.

Figure 42:
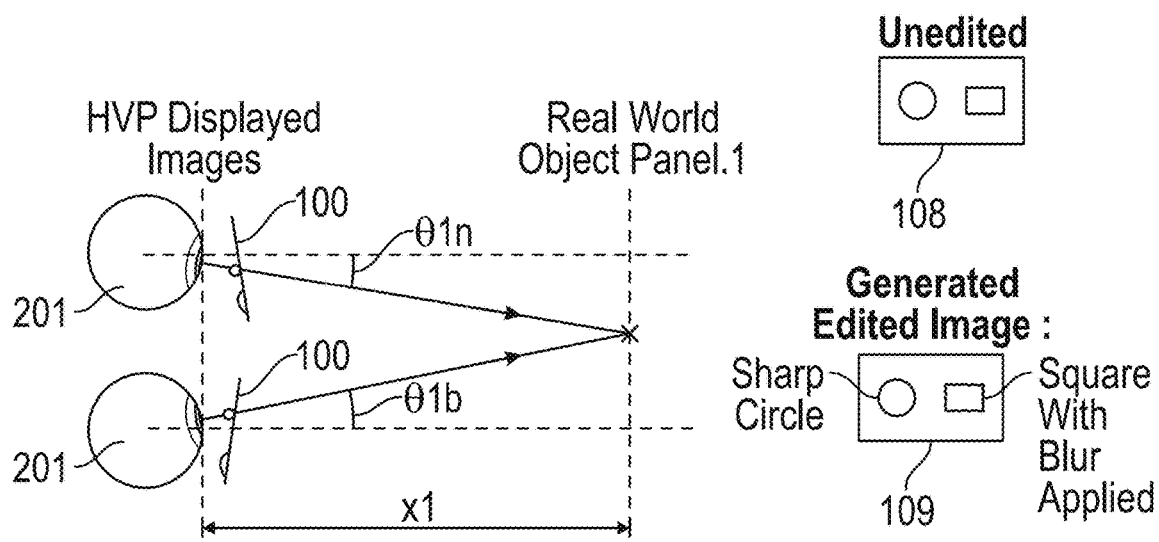
FIG. 42 shows the gaze direction of eyes observing a first real world object plane through an optical hyperfocal reflective system and a computer generated edit display image according to an embodiment.
Figure 43:
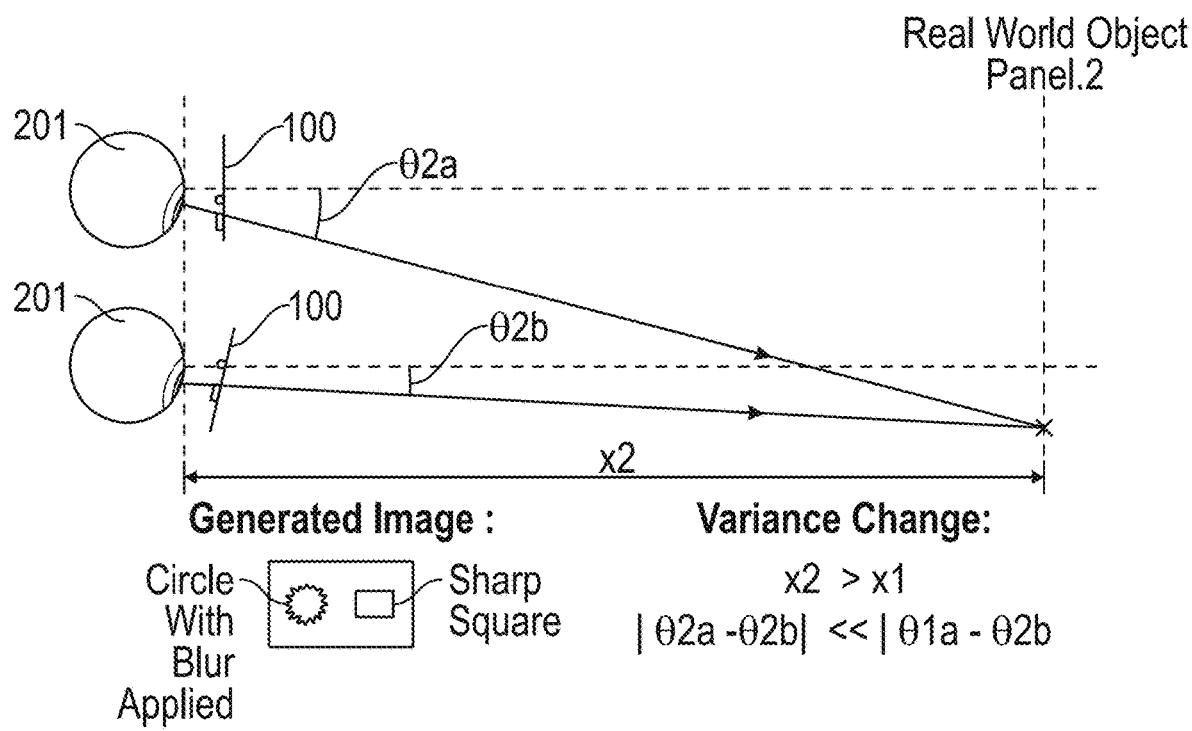
FIG. 43 shows the gaze direction of eyes observing a second real world object plane through an optical hyperfocal reflective system and a computer generated edit display image according to an embodiment.

By way of non-limiting example reference is made to FIG. 42 and FIG. 43 in which optical hyperfocal reflective systems are configured as optical combiners in the manner explained according embodiments described herein. The human eyes are observing a real world scene superimposed on the hyperfocused virtual display image. The real world scene includes real world objects that are in different planes spaced form the observer's eyes. In this non-limiting example, the real world scene includes an object plane 1 and a real world object plane 2. Real world object plane 1 disposed at a X1 distance from the eye target area plane and the real object plane 2 is disposed in plane 2 further than plane 1, that is X2 distance from the eye target area or eye plane (see FIGS. 42 and 43). The null optical axis of each eye when the eye is centered directly, that is, when the eye gaze angle is at zero is also shown in FIGS. 42 and 43.

In FIG. 42 the eyes are gazing at the real object in the plane 1, with the hyperfocused virtual image superimposed thereon, that is, plane 1 is a distance X1 from the eye target area or eyes. The gaze direction for each eye is expressed as gaze angle with respect to the eye optical axis when the eye is centered directly at the real world scene and superimposed virtual display image. Gaze angles 81a and 81b correspond to the gaze angles of left and right eyes respectively looking at plane 1 which is closer than plane 2. Gaze direction can be measured and expressed in different ways such as line of sight of the eye or visible axis of the eye for example that may be influenced by eye movement, head movement and/or other body movements. The methods and systems of the eye tracking and image editing embodiments disclosed herein are not limited to any particular way of measuring or expressing gaze direction or angle. Any type of measurement that is representative of the gaze direction of each eye may be employed.

In FIG. 43 the eyes are gazing in the direction of the real world scene object plane 2, with the hyperfocused virtual display image superimposed thereon, that is distance X2 from the plane of the eye target area or eyes. Gaze angles 82a and 82b correspond to the gaze angles of left and right eyes respectively looking at plane 2 that is further away from the eyes than plane 1. By tracking the eyes and determining the gaze direction, the real world object plane that the eyes at looking at is determined. Objects in the display image that are intended to appear in the hyperfocused virtual image closer or further away from the real world object plane that the eye is looking at are identified. One or more of the objects in the display image that is identified as being intended to be further or closer to the eye than the real world object plane that the eye is gazing can be edited so that the display image object is blurred or otherwise altered to give the impression that the those display objects identified are out of focus relative to the real world object plane when the hyperfocused virtual display image is superimposed with the real world scene.

By way of non-limiting example, an original unedited display image includes a square object and circle object. For the case of FIG. 42 in which the real world object plane is near, resulting in larger vergence angles on the eye, the original image is edited so that the display generated image on the display of a circle intended to be at distance x1, and square at distance x2. Since both images will appear to be in focus, eye tracking is used to monitor the gaze of the eyes so that if looking at plane x1, digital blurring is applied to the square, (and in general, to any object that is not at plane x1). When the eye focuses further out to the object plane x2, which coincides with the location of the square—digital blurring is applied instead to the circle (and in general, to any object that is not at plane x2).

Figure 44:
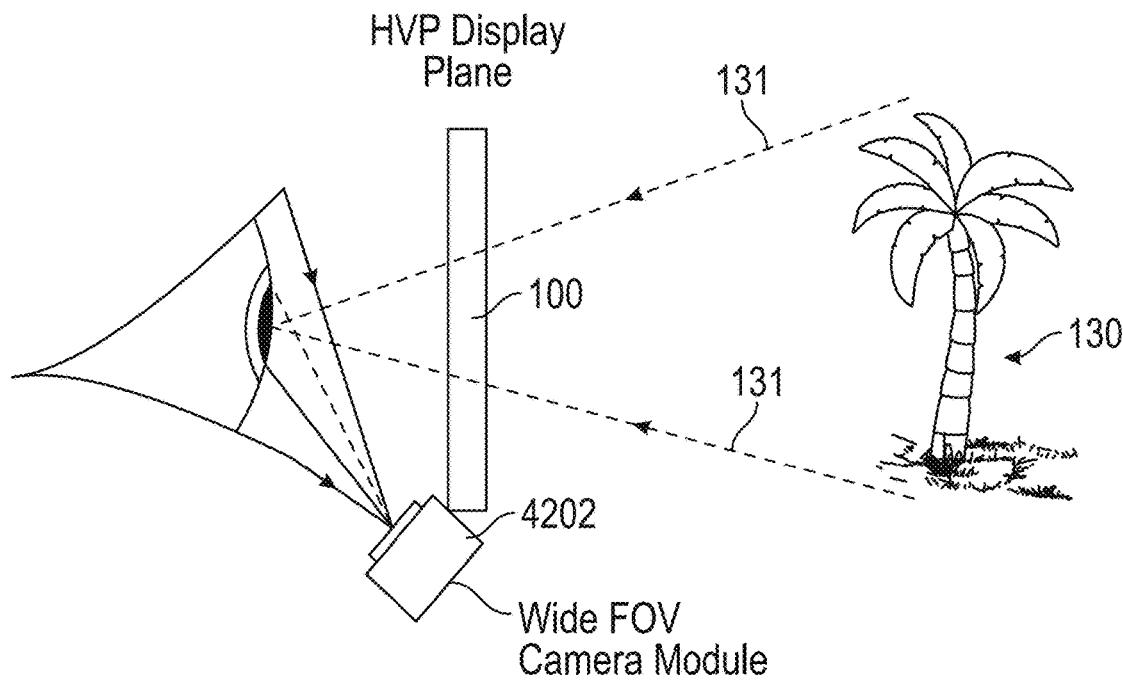
FIG. 44 illustrates an eye tracking camera module configured in a direct view configuration tracking an eye observing a real world scene through an optical hyperfocal reflective system according to an embodiment.
Figure 45:
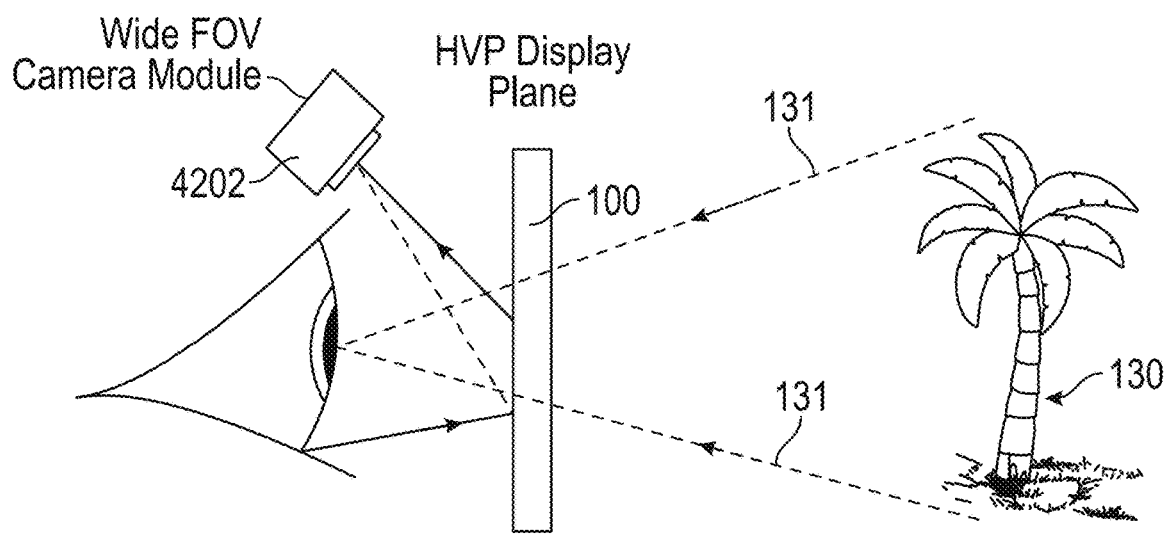
FIG. 45 illustrates an eye tracking camera module configured in an indirect view configuration tracking an eye observing a real world scene through an optical hyperfocal reflective system according to an embodiment.

Eye tracking can be performed either by direct-view on indirect-view. In the former case, a mini wide-viewing angle camera module is positioned near the display to look directly at the eye. By way of example, FIG. 44 illustrates an eye tracking camera module configured in a direct view configuration tracking an eye observing a real world scene through an optical hyperfocal reflective system according to an embodiment. With indirect viewing, the display or another immediate surface may be incorporated with a reflective holographic or diffractive layer in the NIR region (number of companies such as 3M have developed similar, working on holographic films) that allows the image of the eye to be reflected to the mini wide-viewing-angle camera module. By way of example, FIG. 45 illustrates an eye tracking camera module configured in an indirect view configuration tracking an eye observing a real world scene through an optical hyperfocal reflective system according to an embodiment;

In both cases illumination can be provided by the display surface, either in visible or NIR wavelength regions.

Figure 46:
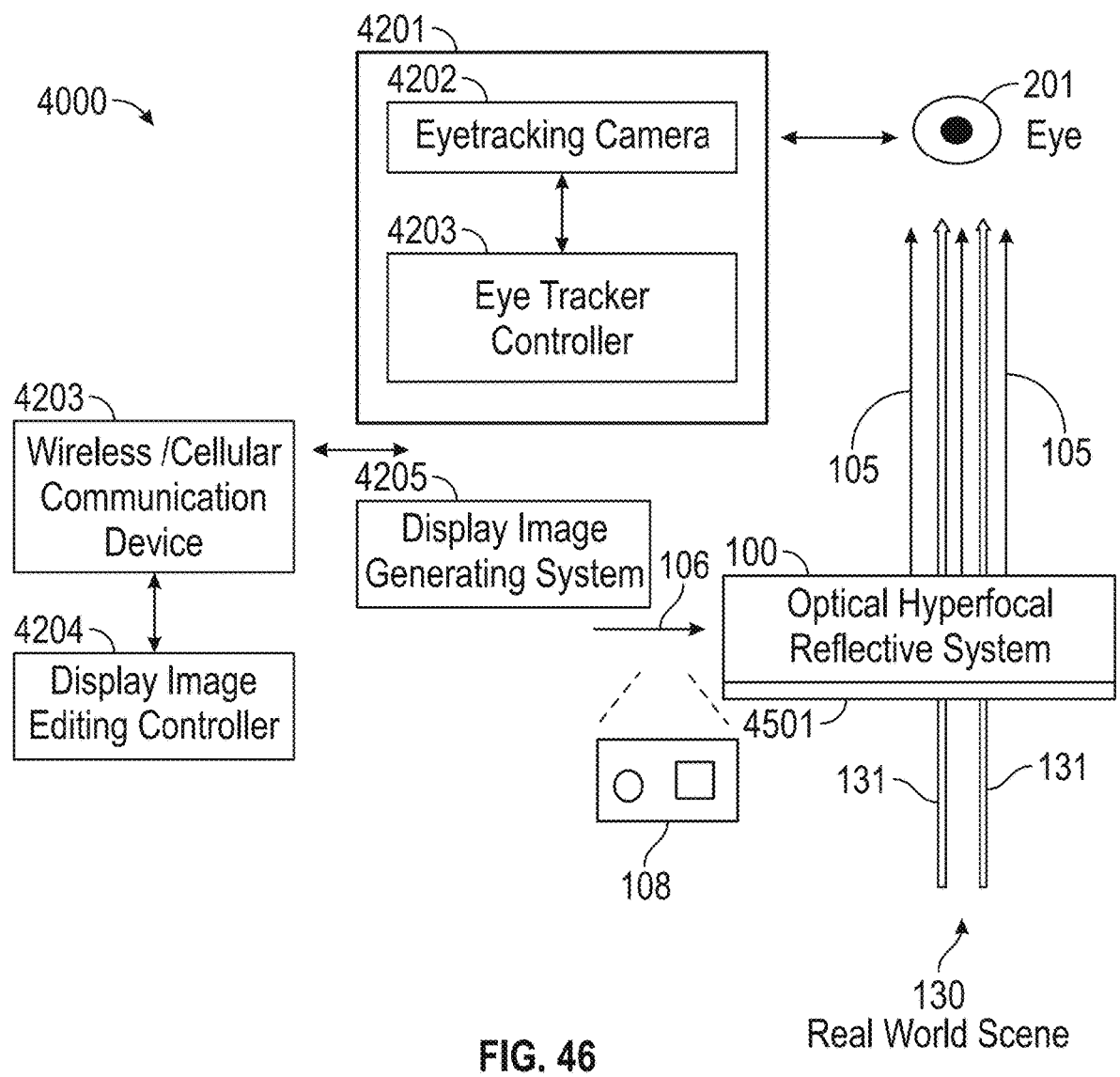
FIG. 46 is a block diagram of various control systems for optimizing the hyperfocused human eye view of the virtual image of an optical hyperfocal reflective system according to an embodiment.

FIG. 46 is a block diagram of various control systems for optimizing the hyperfocused human eye view of the virtual image of an optical hyperfocal reflective system according to an embodiment. The optical hyperfocal reflective system is any one of the optical hyperfocal reflective systems of the embodiments set forth herein of the present technology. As shown in FIG. 46, control system 4000 includes the eye tracking display image editing system comprising the eye tracking system 4201 operably connected to a display image editing system 4204. Display image editing system or controller 4204 or a portion thereof may be located remotely from the display and implemented by means of a computer processing machine such as but not limited to the exemplary computer machine of FIG. 49. In some other embodiments, display image editing system 4204 is located locally at the head mounted display or other display and can comprise integrated or other electrical circuitry configured to perform similar functions to the computing machine. If remotely located, the display image editing system is operably connected to the eye tracking system via a wireless or cellular module 4203.

Eye tracking system 4201 includes eye tracking camera 4202 and associated components including any tracking processor or controller 4203. The tracking processor or a portion thereof may be located remotely from the display and implemented by means of a computer processing machine such as but not limited to the exemplary computer machine of FIG. 49. The eye tracking camera is operably coupled to the eye tracking processor either locally or remotely via the wireless/cellular module. In some other embodiments, the eye tracking processor is located locally at the head mounted display or other display and can comprise integrated or other electrical circuitry configured to perform similar functions to the computing machine. If remotely located, the tracking processor is operably connected to the eye tracking camera 4202 via a wireless or cellular module 4203. A display image processor may be incorporated in the display image generating system 4205 itself or a separate processor operatively coupled to the display image generating system. The display image generating system is optically coupled to the optical hyperfocal reflective system.

The control system in FIG. 46, also includes a luminance control system for controlling the amount of outside world luminance that reaches the eye of the observer of the optical hyperfocal reflective system. The luminance control system has an electro-darkening filter 4501 operably connected to eye tracking system which may be the same eye tracking system 4201 for monitoring gaze direction or which may be another separate eye tracking system. The eye tracking system is configured to monitor eye pupil size. The electro-darkening filter 4501 is configurable according to a feedback control from the eye tracking system to control the amount of outside world luminance reaching the eye and therefore eye pupil size according to the outside-world luminance. The electro-darkening filter (known as electrochromic filters/panels) is therefore able to control the outside-world luminance within the system, and thus pupil size. In this manner, the number of hyperfocal viewports that are being observed by the eye simultaneously can be controlled by the system. In some embodiments, the electro-darkening filter system is configured to control the maximum number of hyperfocal viewports that are being observed by the eye simultaneously ensuring acceptably sharp images.

Figure 47:
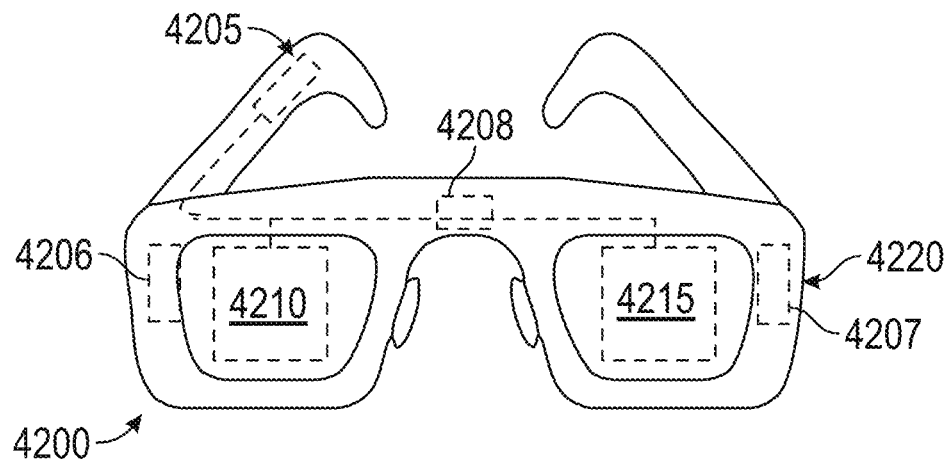
FIG. 47 is a simplified illustration of head mounted display glasses including optical hyperfocal reflective systems according to an embodiment.

In some other embodiments, the electro-darkening filter system is included in the control system without the display image editing system. In some other embodiments, the display image editing system is included in the control system without the electro-darkening filter In some aspects, one or more of any of optical hyperfocal reflective systems of the embodiments disclosed herein are incorporated in head mounted displays. In some embodiments, a pair of the optical hyperfocal reflective systems are included in glasses or other form factor augmented reality head mounted displays. FIG. 47 shows a front view of a pair of the head mounted display glasses according to one embodiment. Goggle type head mounted display or other type of glasses has a left eye optical hyperfocal reflective system 4215 and a right eye optical hyperfocal reflective system 4210. The display image generating system is included in the head mounted display. The optical hyperfocal reflective system may be any one of the optical hyperfocal reflective systems of the embodiments described herein with or without the electro-darkening filter. The optical display image generating system may include a processing module 4205 generating computer formed images for binocular view and an optical image projector 4206, 4207 and associated optical coupling for each eye. The optical display image generating system maybe any one of the display image generating systems of the embodiments disclosed herein where appropriate for the type of optical hyperfocal reflective system being used. An opto-mechanical frame 4220 holds the optical parts securely and in the correct geometric alignment. In some embodiments, the formed images are for monocular view and only one of the optical hyperfocal reflective system and associated display image generating system is included in the head mounted display. The eye tracking system and luminance control systems are also included (see 4208). The eye tracking system and luminance control system maybe any one of the eye tracking system and luminance control systems of the embodiments described herein or another type of system. In some embodiments the eye tracking system is omitted. In some embodiments, the electro-darkening filter and luminance control system is omitted.

Figure 48:
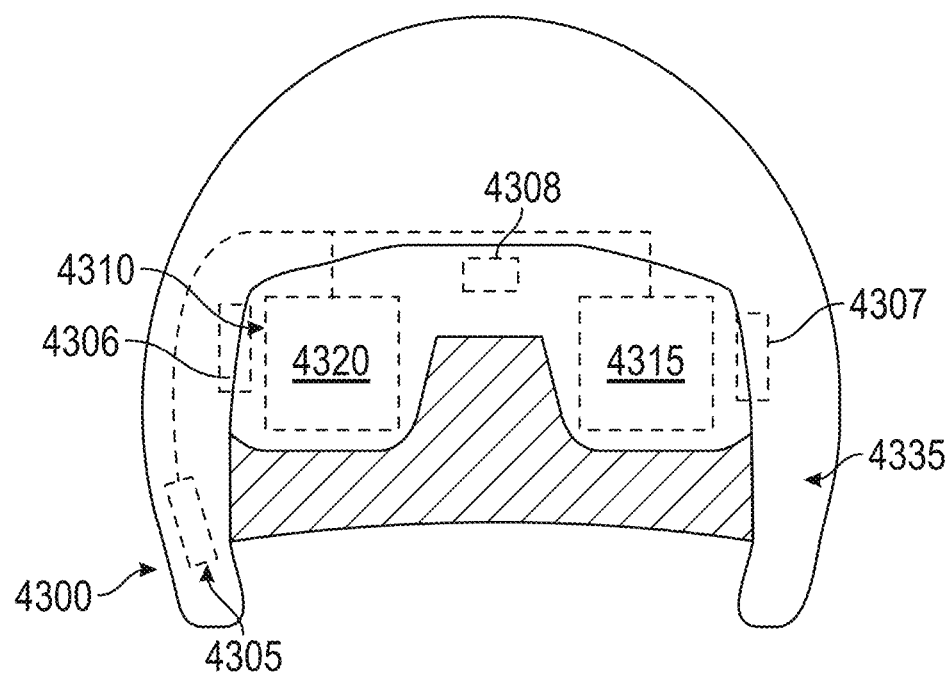
FIG. 48 is a simplified illustration of a head mounted display visor including optical hyperfocal reflective systems according to an embodiment.

In some embodiments, the head mounted display in which one or more of the optical combiners is incorporated is a helmet form factor augmented reality head mounted display. FIG. 48 shows a front view of a head mounted display helmet according to one embodiment. Helmet head mounted display has a processing module 4305 generating computer formed images for binocular view. A left eye optical hyperfocal reflective system 4315 and display image generating system 4307 and a right eye optical hyperfocal reflective system 4320 and display image generating system 4306 are included in the head mounted display. The optical hyperfocal reflective system in each system may be any one of the optical hyperfocal reflective systems of the embodiments described herein with or without the electro darkening filter. The display image generating system maybe any one of the display image generating systems of the embodiments disclosed herein where appropriate for the type of optical hyperfocal reflective system being used. Optical image projector and optical coupling may for example form part of the display image generating system. An opto-mechanical sub frame 4300 holds the optical parts securely and in the correct geometric alignment. Opto-mechanical sub frame is supported by a mechanically robust shell of the helmet. The eye tracking system and luminance control systems are also included (see 4308). The eye tracking system and luminance control system maybe any one of the eye tracking system and luminance control systems of the embodiments described herein or another type of system. In some embodiments, the eye tracking system is omitted. In some embodiments, the electro-darkening filter and luminance control system is omitted.

In other embodiments, the head mounted displays shown in FIGS. 47 and 48 may include other optical and electronic components such as but not limited to a depth sensor camera, color camera, microphone, speakers, input/output ports and battery.

In some embodiments, the formed images are for monocular view and only one of the optical hyperfocal reflective system and display image generating system is included in the head mounted display.

Figure 49:
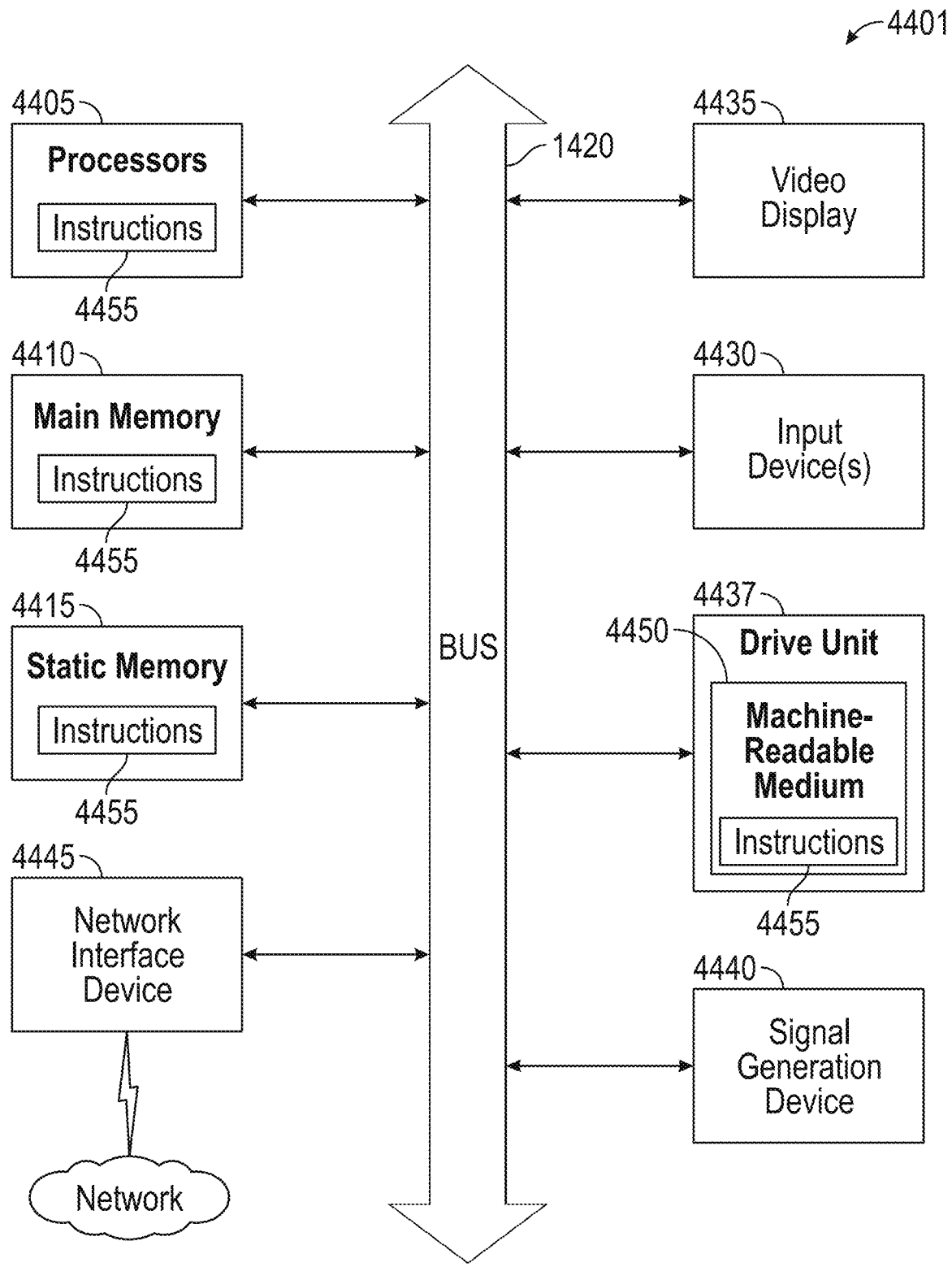
FIG. 49 is a diagrammatic representation of an exemplary machine in the form of a computer system for use in augmented and/or virtual reality displays.

FIG. 49 is a diagrammatic representation of an embodiment of a machine in the form of a computer system 4401, within which a set of instructions for causing the machine to perform any one or more of the methodologies discussed herein, including computer-implemented method steps used in performing any one or combination of display image generation, eye tracking, display image editing, luminance control, and other processes, which may be executed and which may serve as the computing system of an augmented or virtual reality display incorporating in any one of the optical hyperfocal reflective systems disclosed herein. In various example embodiments, the machine operates as a standalone device, may be connected (e.g., networked) to other machines or integrated in the head mounted display or head up display itself. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 4401 is includes a processor or multiple processors 4405 (e.g., a central processing unit (CPU), a graphics processing unit (GPU), or both), and a main memory 4410 and static memory 4415, which communicate with each other via a bus 4420. The computer system 4401 may further include a video display 4435 (e.g., a liquid crystal display (LCD)). The computer system 4401 may also include an alpha-numeric input device(s) 4430 (e.g., a keyboard), a cursor control device (e.g., a mouse), a voice recognition or biometric verification unit (not shown), a drive unit 4437 (also referred to as disk drive unit), a signal generation device 4440 (e.g., a speaker), and a network interface device 4445. The computer system 4401 may further include a data encryption module (not shown) to encrypt data.

The drive unit 4437 includes a computer or machine-readable medium 4450 on which is stored one or more sets of instructions and data structures (e.g., instructions 4455) embodying or utilizing any one or more of the methodologies or functions described herein. The instructions 4455 may also reside, completely or at least partially, within the main memory 4410 and/or within the processors 4405 during execution thereof by the computer system 4401. The main memory 4410 and the processors 4405 may also constitute machine-readable media.

The instructions 4455 may further be transmitted or received over a network via the network interface device 4445 utilizing any one of a number of well-known transfer protocols (e.g., Hyper Text Transfer Protocol (HTTP)). While the machine-readable medium 4450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 4401 are required and thus portions of the computer system 4401 can be removed if not needed, such as Input/Output (I/O) devices (e.g., input device(s) 4430). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The computing machine may be implemented locally with and/or remotely from the eye tracking system and display image generating system. In some embodiments, the computing system serves as the eye tracking display image editing system and is located remotely. The eye tracking system and image generating display system are configured to wirelessly communicate with the computing system. In some embodiments, the remote computing system also provides some of the functionality for the purpose of generating computer images that would otherwise be performed by the image display generating system. In some embodiments at least a portion of the eye tracking display image editing system is a computing machine implemented locally on the head mounted display, such as in the form of one or more modules on the head mounted display.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present technology. In this regard, the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

It will be appreciated that various of the above-disclosed and other features and functions, or alternatives thereof, may be desirably combined into many other different systems or applications such as head up type displays. Various presently unforeseen or unanticipated alternatives, modifications, variations, or improvements therein may be subsequently made by those skilled in the art which are also intended to be encompassed by the following claims. For example, the head mounted display sets may be visors, goggles or headband structures and are not limited to the particular types shown in the Figures. Likewise the shape of the optical combiner substrates may be any shape that is capable of guiding and combining images in the manner described hereinbefore.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. An optical hyperfocal reflective system comprising:
    at least one optical substrate;
    an optical input coupling portion configured to input couple a collimated display image to the optical substrate; and
    an optical hyperfocal output coupling portion integrated with said optical substrate;
    wherein said optical output coupling portion includes at least one hyperfocal reflective view port;
        wherein said hyperfocal reflective view port comprises at least one discrete optical hyperfocal reflector spot integrated with said optical substrate;
        wherein said discrete optical hyperfocal reflector spot is at least partially reflective and configured to reflectively project on to a target area located at predetermined working distance from said hyperfocal reflective view port a discrete portion of the optical input coupled display image rays as a discrete optical spot beam of rays that form a discrete virtual display image portion,
    wherein the discrete optical hyperfocal reflector spot is sized to form the discrete optical spot beam with a diameter at the target area such that the view of the discrete virtual display image portion, as seen by a lens-detector system locatable at the target area, is hyperfocused.

2. The optical system of claim 1, wherein said optical hyperfocal output coupling portion includes a plurality of said hyperfocal reflective view ports integrated with said optical substrate, and wherein the optical hyperfocal reflector spots are distributed spaced apart from one another in a pattern extending along said optical hyperfocal coupling portion and form a plurality of the virtual display image portion hyperfocused views which collectively substantially correspond to the display image or a portion thereof.

3. The optical system of claim 2, wherein said target area is a target area for a human eye and wherein said hyperfocused view of the virtual display portion observable by the human eye locatable at the target area is hyperfocused.

4. The optical system of claim 2, wherein said optical substrate is partially or substantially transparent to optical rays of a real world image received through a face of the optical substrate facing away from said eye target area.

5. The optical system of claim 2, wherein at least some of said optical hyperfocal reflector spots are embedded in said optical substrate.

6. The optical system of claim 2, wherein at least some of said optical reflector spots are disposed on a face of the optical substrate.

7. The optical system of claim 2, wherein each of said optical hyperfocal reflector spots has an aperture diameter of between about 100 and 1000 microns.

8. The optical system of claim 2, wherein each of said discrete spot beams has a diameter at the target area of between 100 and 1000 microns.

9. The optical system of claim 2, wherein each or some of said optical hyperfocal reflector spots of said plurality of hyperfocal view ports are spaced apart by an inter-reflector distance, wherein said inter-reflector distance is between about 500 um to 8 mm.

10. The optical system of claim 2, wherein the shape and pattern of said optical hyperfocal reflector spots is selected such that the virtual display image views formed by said plurality of hyperfocal view ports tessellate.

11. The optical system of claim 10,
    wherein said plurality of hyperfocal reflective view ports comprise a plurality of red light hyperfocal reflective view ports, a plurality of green light hyperfocal reflective view ports and a plurality of blue light hyperfocal reflective view ports,
    wherein the optical hyperfocal reflector spot of each of said plurality of red light hyperfocal view ports is configured to selectively reflect the input coupled collimated display image rays having a specific or band of wavelengths of red light and to substantially pass light having other wavelengths,
    wherein the optical hyperfocal reflector spot of each of said plurality of green light hyperfocal view ports is configured to selectively reflect the input coupled collimated display image rays having a specific or band of wavelengths of green light and to substantially pass light having other wavelengths, and
    wherein the optical hyperfocal reflector spot of each of said plurality of blue light hyperfocal view ports is configured to selectively reflect the input coupled collimated display image rays having a specific or band of wavelengths of blue light and to substantially pass light having other wavelengths.

12. The optical system of claim 11, wherein each reflector spot of each of said plurality of said hyperfocal view ports is configured to substantially pass the optical rays of the real world image having the other wavelengths of light that are not reflected by the reflector spot and allow them to reach said eye target area superimposed on said display image rays having the specific or band of wavelengths selective reflected by the reflector spot.

13. The optical system of claim 2, wherein each or some of said optical hyperfocal reflector spots are wavelength selective reflector spots.

14. The optical system of claim 13, wherein said optical substrate is partially or substantially transparent to optical rays of a real world image received through a face of the optical substrate facing away from said eye target area.

15. The optical system of claim 14, wherein said pattern of hyperfocal reflector spots comprises alternating red light hyperfocal reflector spots, blue light hyperfocal reflector spots and green light hyperfocal reflector spots.

16. The optical system of claim 2, wherein each of said hyperfocal spots comprises at least one reflective coating.

17. The optical system of claim 2, wherein each of said hyperfocal reflector spots comprises a diffraction optical element.

18. The optical system of claim 2, wherein each of said hyperfocal reflector spots comprises a polarisation selective reflector spot.

19. The optical system of claim 18, wherein said first polarisation state is orthogonal to said second polarisation state or at an intermediate angle selected according to the position of the hyperfocal reflective spot along the optical substrate.

20. The optical system of claim 2, where said plurality of hyperfocal reflector spots comprise first polarisation state selective reflector spots and second polarisation state selective reflector spots, said first polarisation state being different from said second polarisation state.

* * * * *